United States Patent [19]

Larson et al.

[11] Patent Number: 4,833,468
[45] Date of Patent: May 23, 1989

[54] LAYERED NETWORK

[75] Inventors: Brian R. Larson, Inver Grove Heights; Donald B. Bennett, Burnsville; Steven A. Murphy, Coon Rapids, all of Minn.

[73] Assignee: Unisys Corporation, Blue Bell, Pa.

[21] Appl. No.: 108,514

[22] Filed: Oct. 14, 1987

[51] Int. Cl.$^4$ .................. H04Q 1/00; H04Q 11/04
[52] U.S. Cl. .................. 340/825.800; 370/58; 370/63
[58] Field of Search .............. 340/825.8, 825.79, 826, 340/827; 370/58, 63, 68.1, 79

[56] References Cited

U.S. PATENT DOCUMENTS

| | | | |
|---|---|---|---|
| 4,004,103 | 1/1977 | Liu et al. | 379/274 |
| 4,022,982 | 5/1977 | Hemdal | 370/54 |
| 4,566,007 | 1/1986 | Richards | 340/826 |
| 4,587,649 | 5/1986 | Maddern | 370/38 |
| 4,654,842 | 3/1987 | Coraluppi | 370/58 |
| 4,656,622 | 4/1987 | Lea | 370/60 |
| 4,752,777 | 6/1988 | Franaszek | 340/825.8 |

OTHER PUBLICATIONS

Mason G. M., Gingher G. C., Nakamura S., "A Sampler of Circuit Switching Networks", IEEE, Jun. 1979, pp. 145-161.
Wu C. and Feng T., "The Reverse-Exchange Interconnection Network", IEEE, Sep., 1980, pp. 539-549.
Plister G. F. and Norton V. A., "Hot Spot", Contention and Combining in Multistage Interconnection Networks, IEEE 1985, pp. 790-797.
Sams J. G., "Node Processor for Distributed System Control", IBM Technical Disclosure Bulletin, vol. 23, No. 5, Oct., 1980, pp. 1811-1812.
Marsicek R. R., MdDermott T. S., Modlin W. D., Sams J. G., Stricklin E. E., "Distributed Data Processing System", IBM Technical Disclosure Bulletin, vol. 23, No. 5, Oct., 1980, pp. 1805-1806.
Lang T., "Interconnections Between Processors and Memory Modules Using the Shuffle-Exchange Network", IEEE Transactions on Computers, vol. C-25, No. 5, May, 1976, pp. 496-503.

Primary Examiner—Donald J. Yusko
Attorney, Agent, or Firm—Glenn W. Bowen

[57] ABSTRACT

A Layered Network system may provide varying cost from order NlogN low-cost networks, to completely-routing, fully-Layered networks with cots of order Nlog $^3$N. Layered networks are composed of switches and point-to-point connections between them. These networks establish connections from requestors to responders by relaying "requests" through the switches. Each switch has built-in control logic to route requests and responses. The switch setting is determined using the comparison of the request with the request's current location in the network, and with locally competing requests. To provide distributed routing without a centralized controller, each switch routes the requests using only the information contained in the requests that switch handles. The switch setting is remembered in order to route the responses on the same paths as the associated requests, but in the reverse direction.

14 Claims, 55 Drawing Sheets

PRIOR ART

BASELINE NETWORK

PRIOR ART

REVERSE BANYAN NETWORK

TWO-PLANED LAYERED NETWORK ($N=32, p=2, b=2$)

SWITCH CHIP BLOCK DIAGRAM

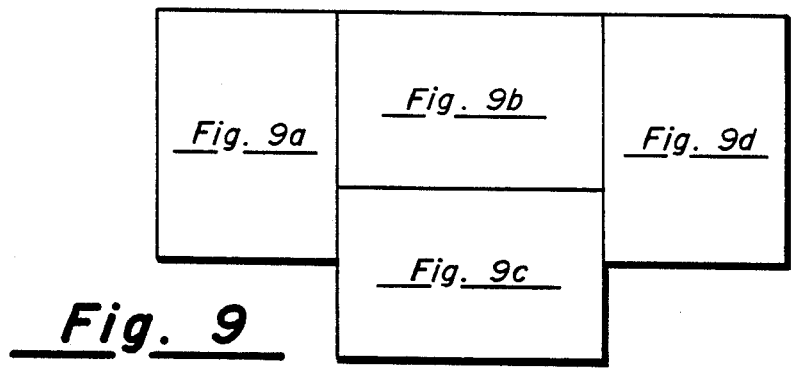
Fig. 9
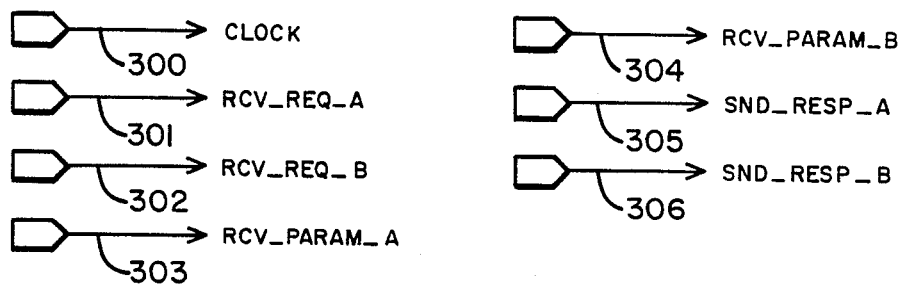
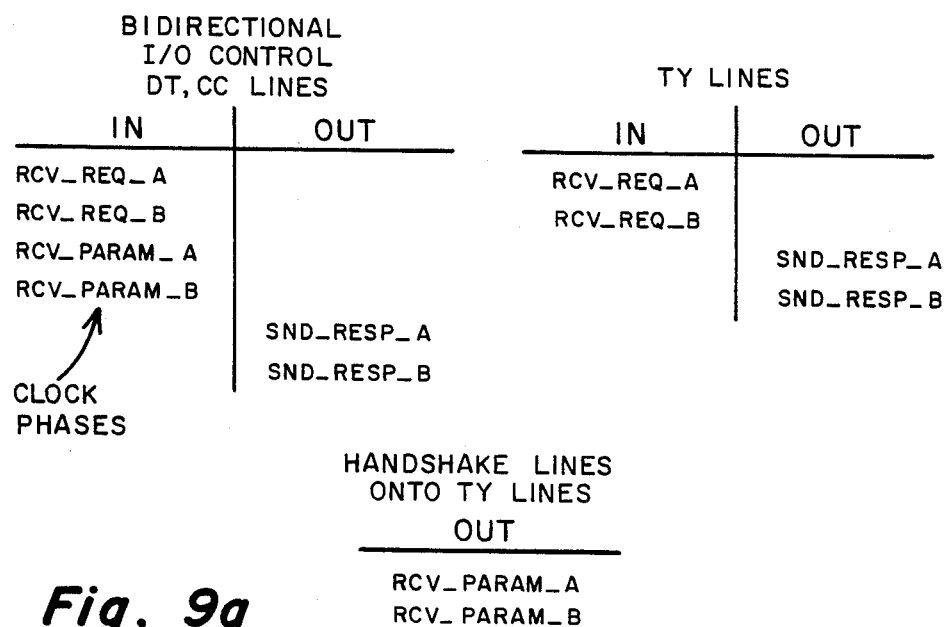
Fig. 9a

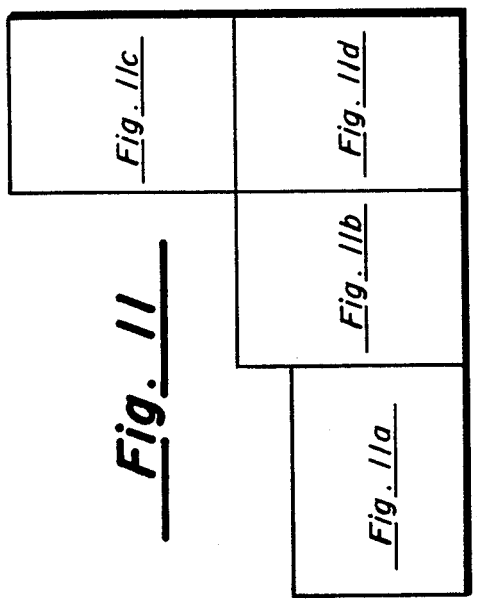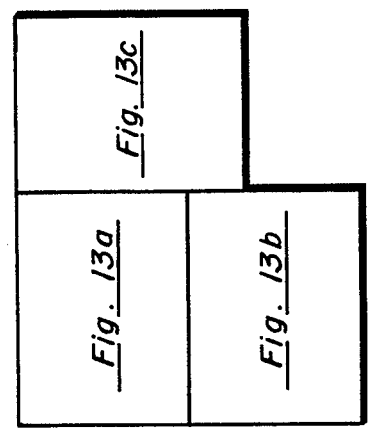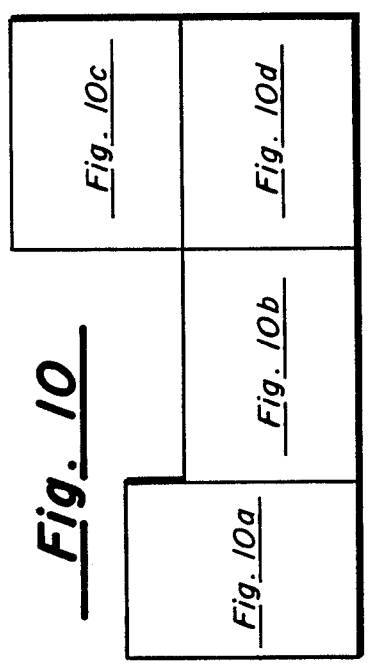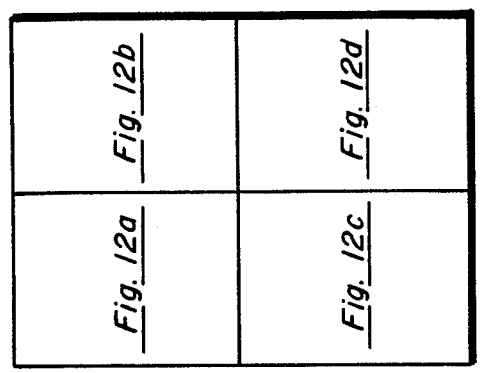

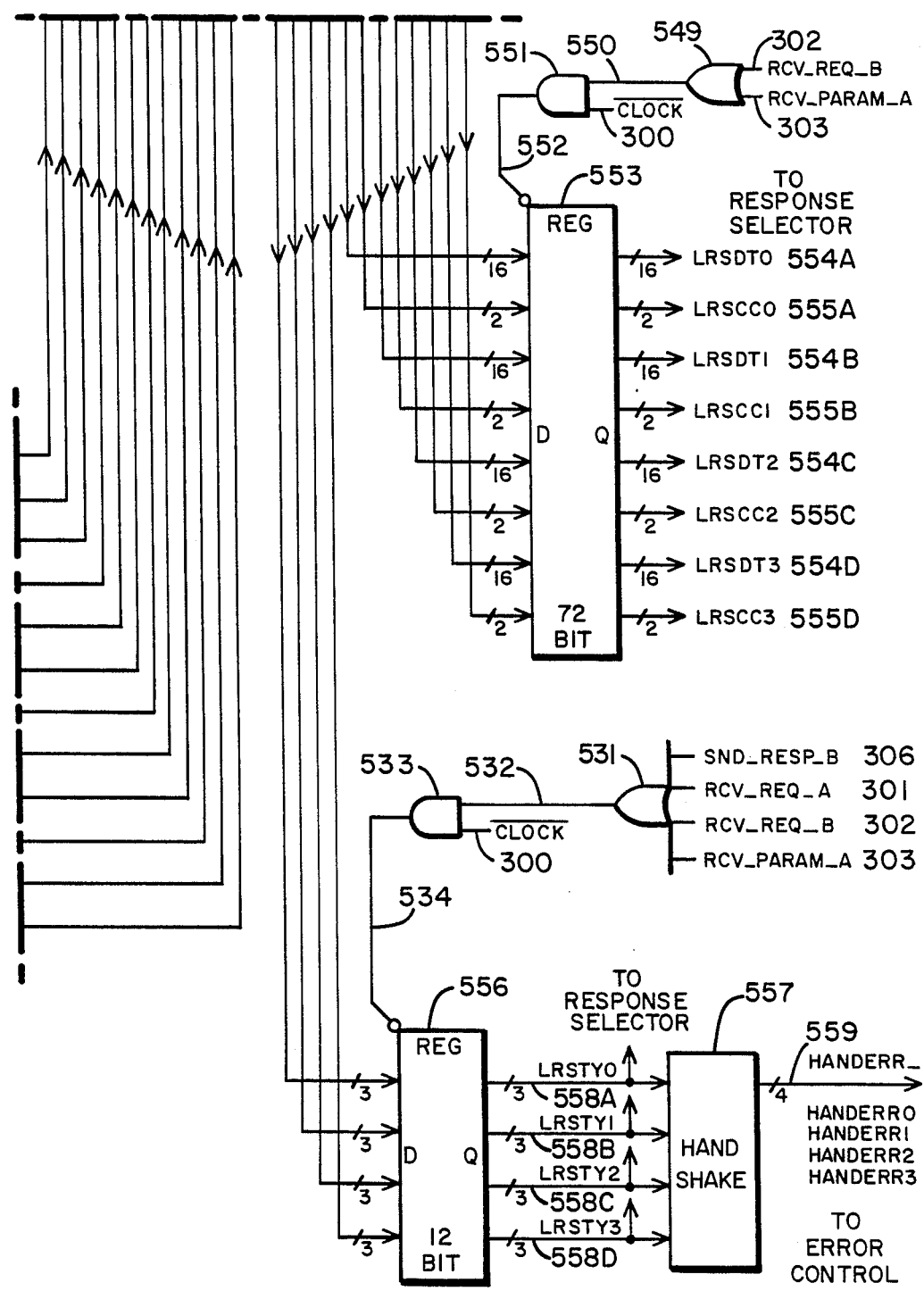
Fig. 11d  RIGHT HAND BUFFER

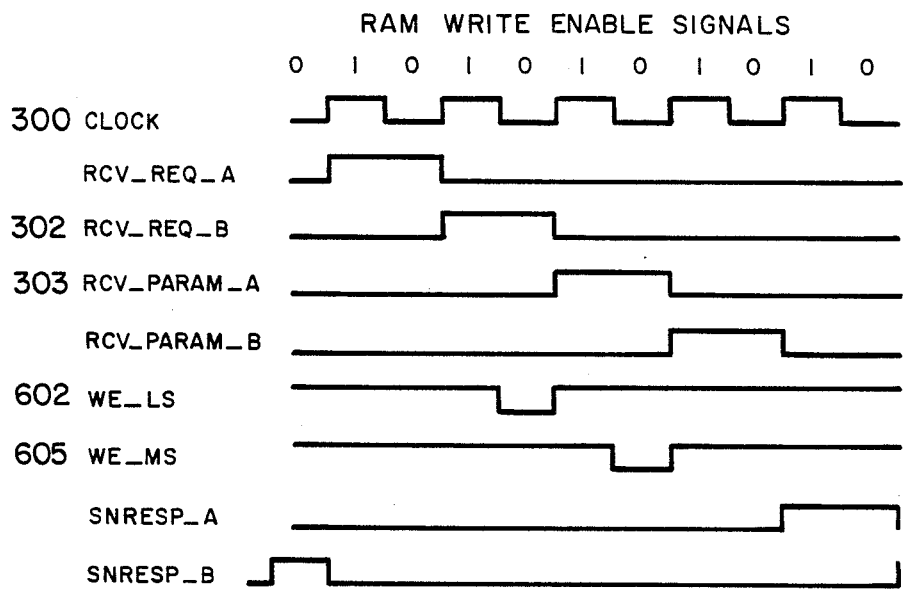
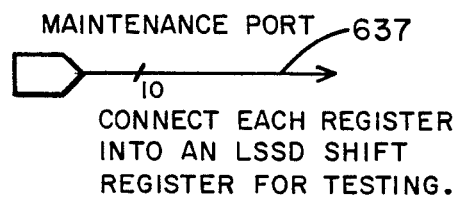
CONNECT EACH REGISTER INTO AN LSSD SHIFT REGISTER FOR TESTING.
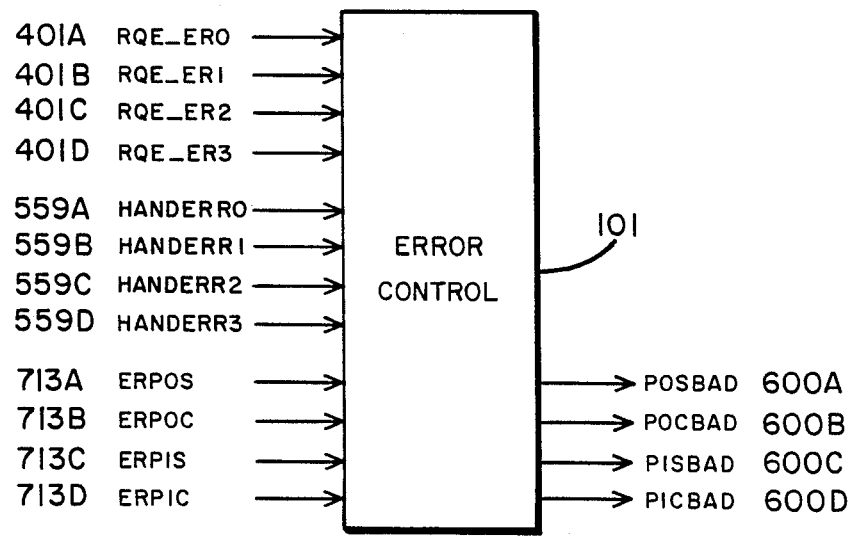
*Fig. 12d*

RESPONSE SELECTOR

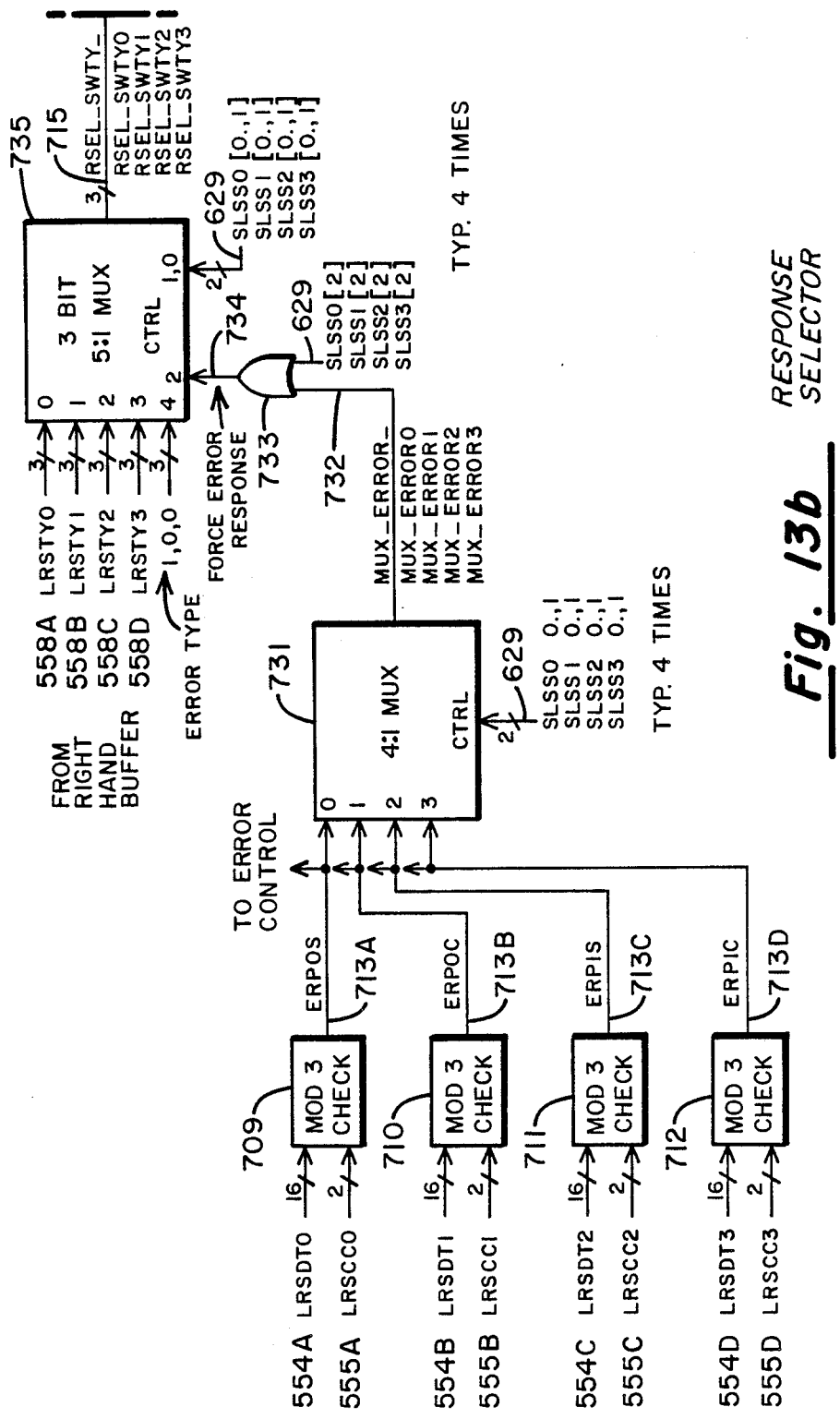
Fig. 13b  RESPONSE SELECTOR

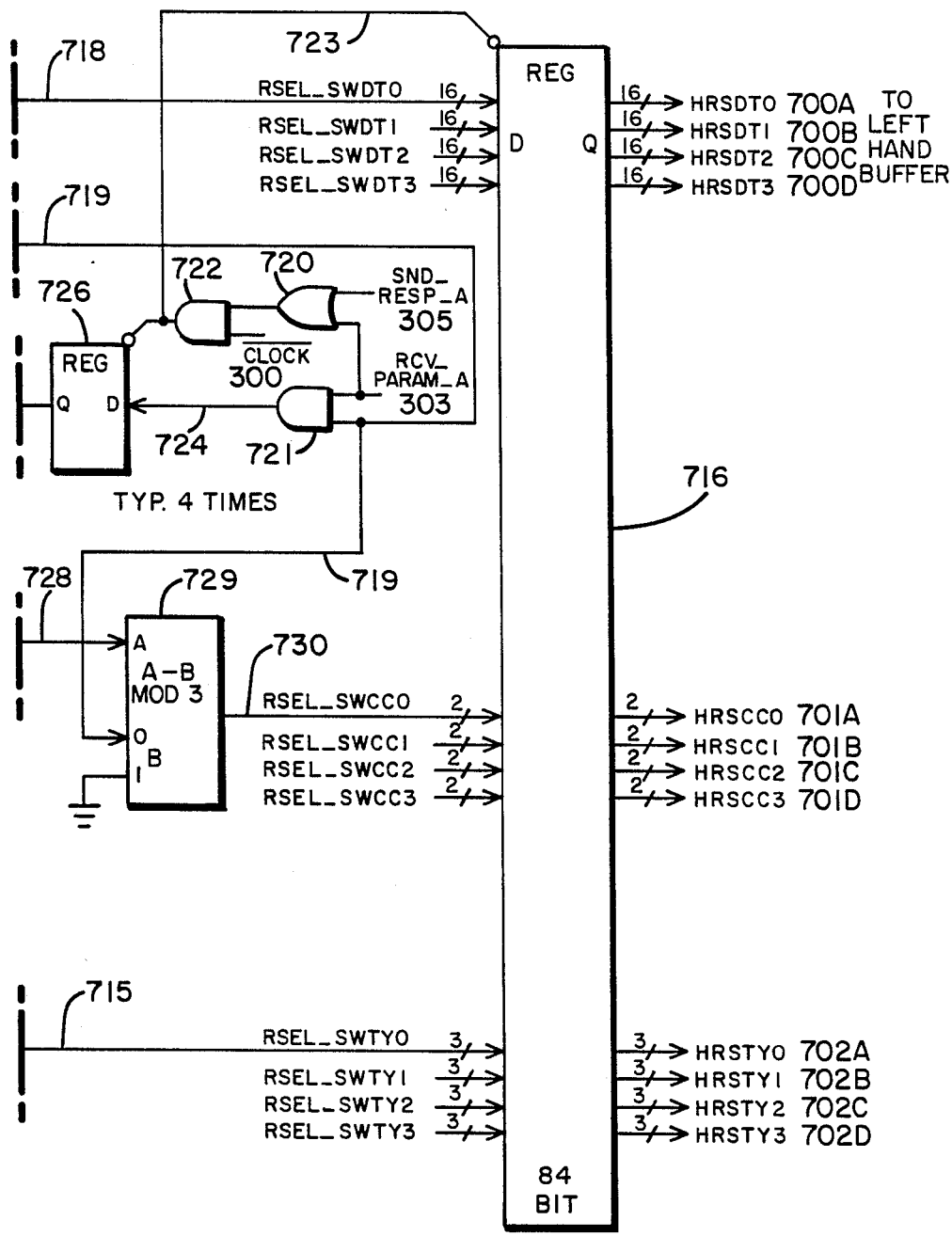
Fig. 13c   RESPONSE SELECTOR

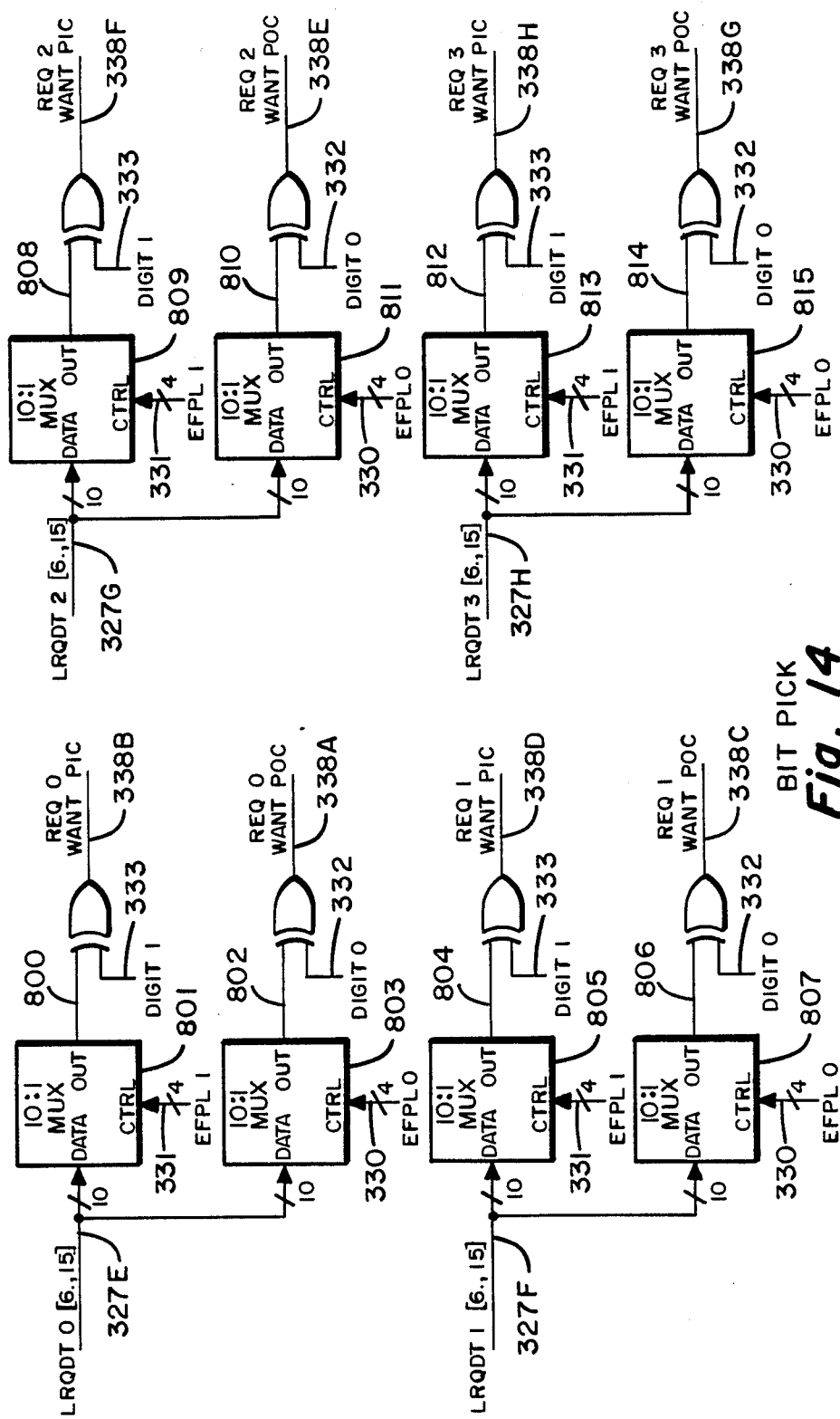

REQUEST EVALUATION MOD 3 CHECK

RESPONSE SELECTOR MOD 3 CHECK

REQUEST EVALUATION
TYPE DECODING:
FETCH_ADD, SWAP

REQUEST EVALUATION
SUSPEND CHECK

FORCE ZERO ADD
SWITCH SETTING

NEW CONTROLLING REQUEST
REQUEST EVALUATION

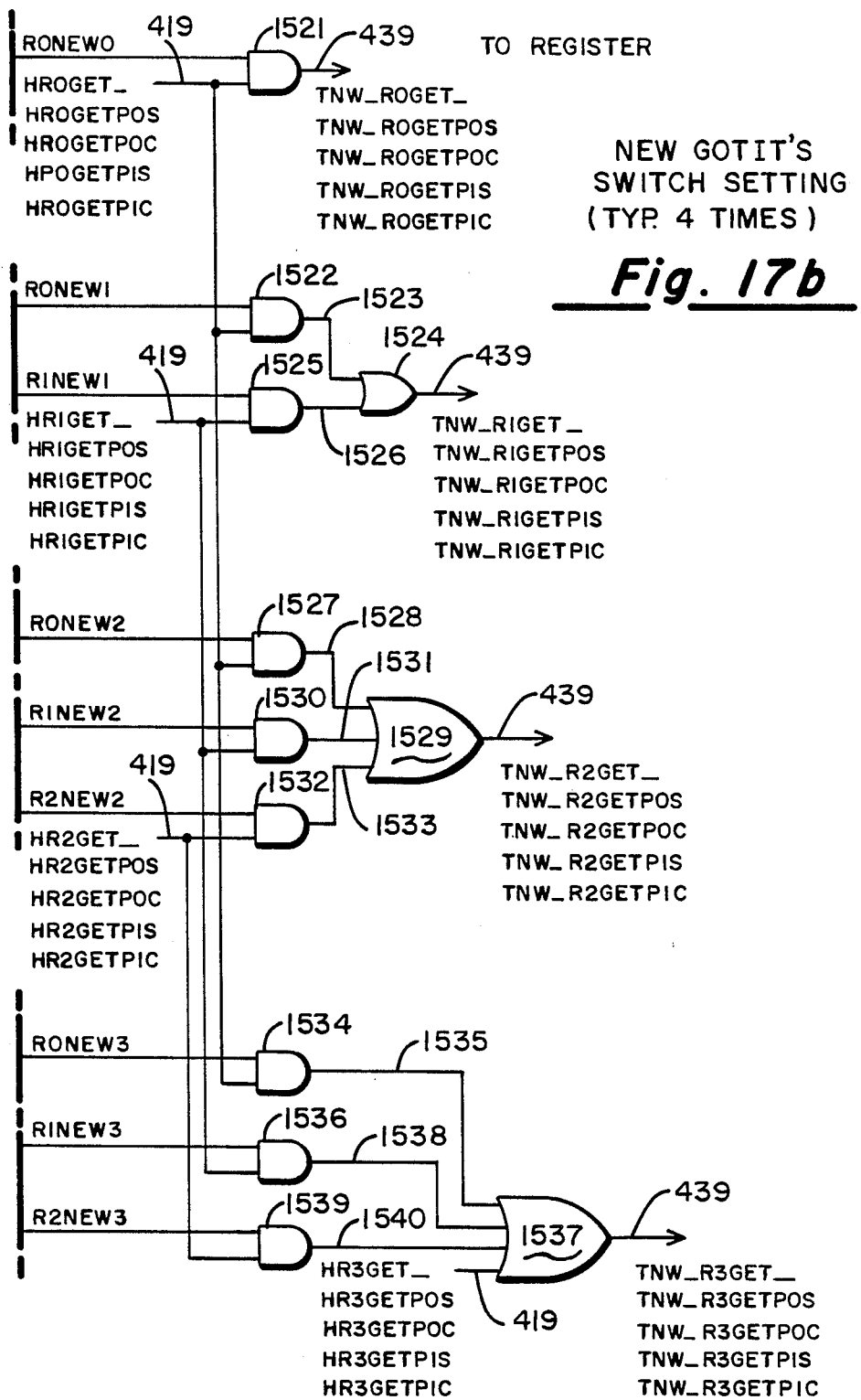
Fig. 17b  NEW GOTIT'S SWITCH SETTING (TYP. 4 TIMES)

| Fig. 18a | Fig. 18b | Fig. 18c | Fig. 18d |
Fig. 18 CLAIM MATRIX
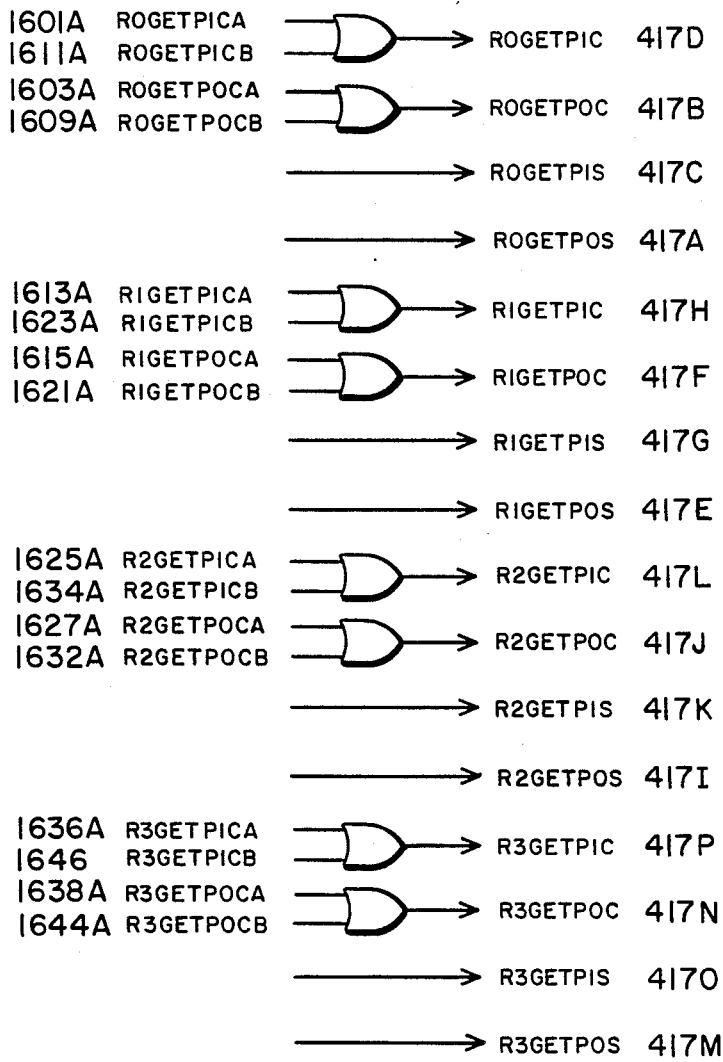
Fig. 18a CLAIM MATRIX

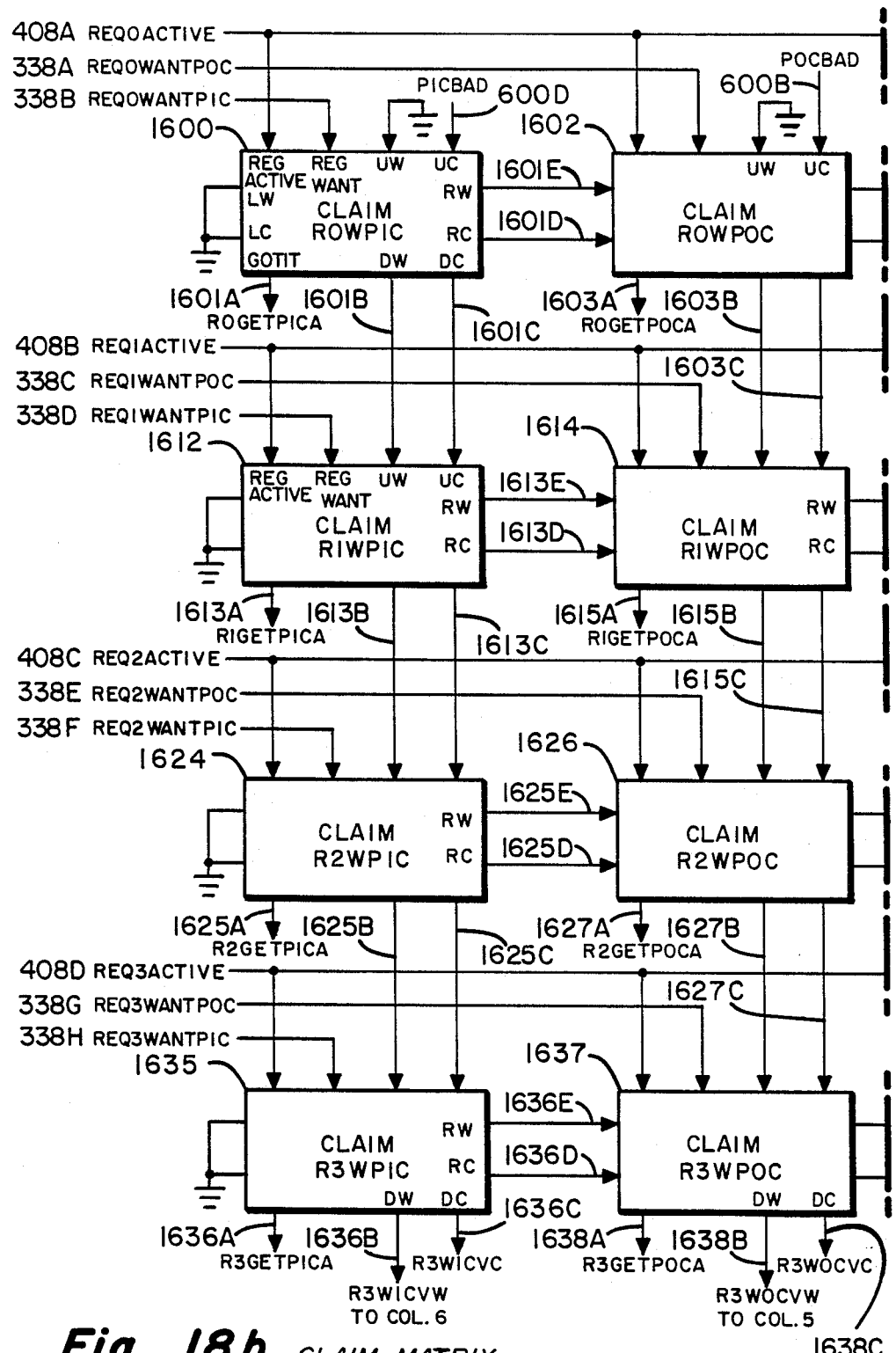
Fig. 18b  CLAIM MATRIX

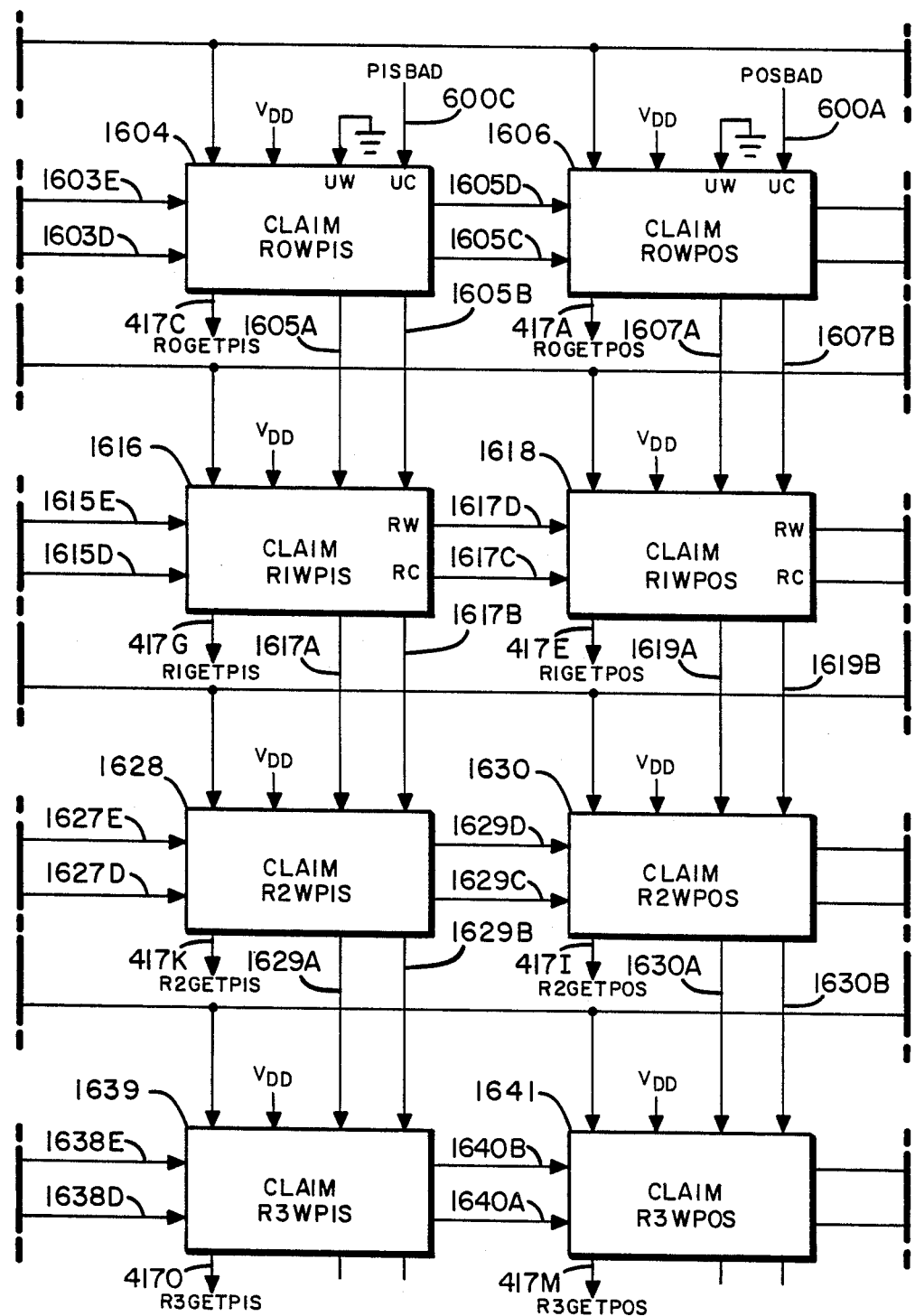
Fig. 18c  CLAIM MATRIX

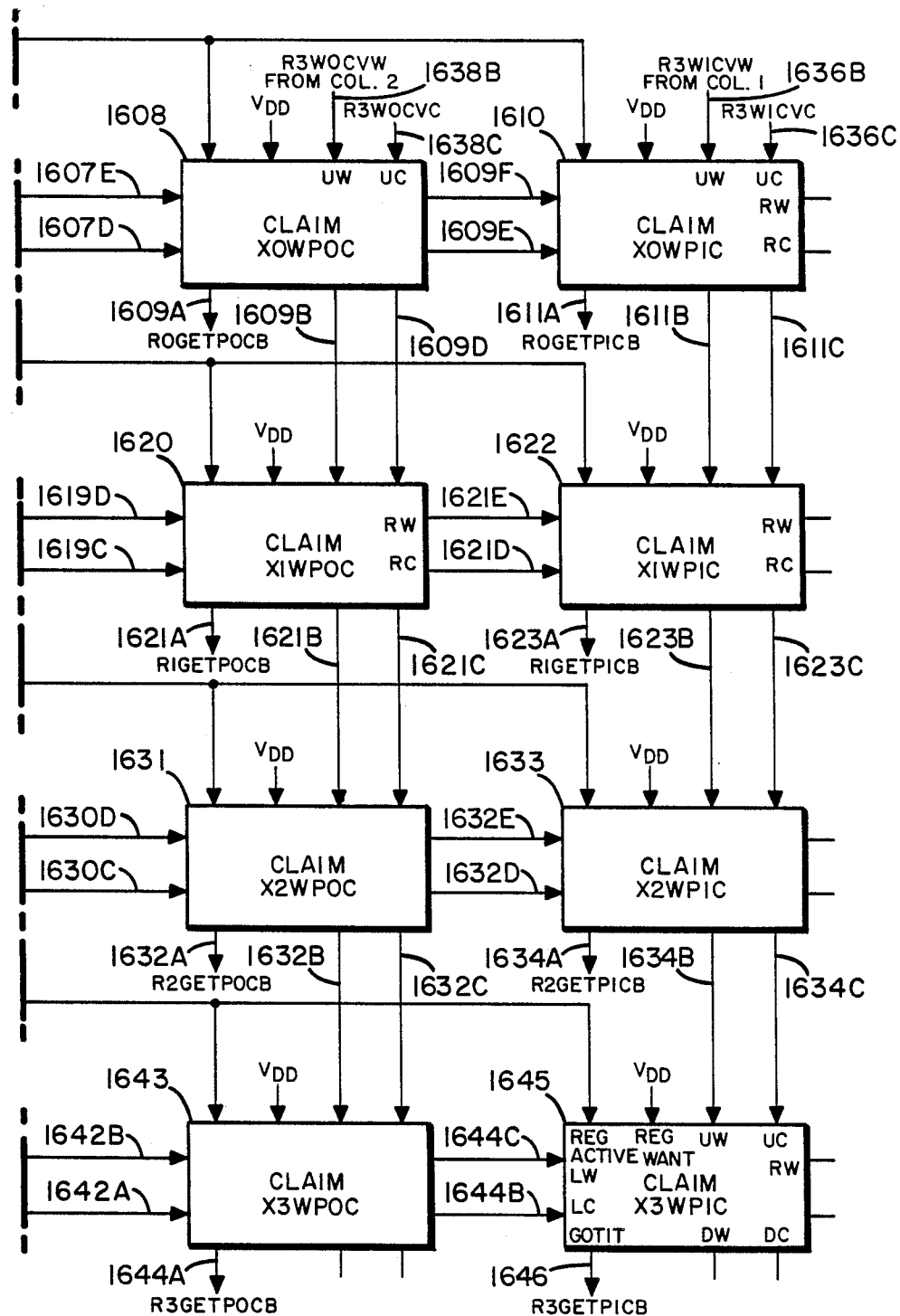
Fig. 18d CLAIM MATRIX

RESPONSE SELECTOR SWITCH SETTING (TYP 4 TIMES)

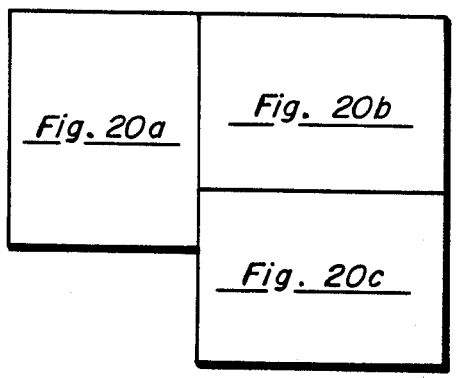

Fig. 20

|  |  |  | ⏚ →  | THF0ADD0 505A |
| --- | --- | --- | --- | --- |
|  | 434A | SNR0FA1 | → | THF0ADD1 505B |
|  | 434B | SNR0FA2 | → | THF0ADD2 505C |
|  | 434C | SNR0FA3 | → | THF0ADD3 505D |
|  | 435A | SNR0SW1 | → | THF1ADD0 505E |
|  |  |  | ⏚ → | THF1ADD1 505F |
|  | 434D | SNR1FA2 | → | THF1ADD2 505G |
|  | 434E | SNR1FA3 | → | THF1ADD3 505H |
|  | 435A | S̄N̄R̄0̄S̄W̄1̄ |  |  |
|  | 435B | SNR0SW2 | →[AND]→ | THF2ADD0 505I |
|  |  | SNR1SW2 | → | THF2ADD1 505J |
|  |  |  | ⏚ → | THF2ADD2 505K |
| STORED | 434F | SNR2FA3 | → | THF2ADD3 505L |
| RESPONSE | 435A | S̄N̄R̄0̄S̄W̄1̄ |  |  |
| PARAMETER | 435B | S̄N̄R̄0̄S̄W̄2̄ |  |  |
| SELECTIVE | 435C | SNR0SW3 | →[AND]→ | THF3ADD0 505M |
| ADDER | 435D | S̄N̄R̄1̄S̄W̄2̄ |  |  |
| SWITCH | 435E | SNR1SW3 | →[AND]→ | THF3ADD1 505N |
| SETTING | 435F | SNR2SW3 | → | THF3ADD2 505O |
|  |  |  | ⏚ → | THF3ADD3 505P |

Fig. 20a

SELECTIVE ADDER SWITCH SETTING (TYP. 4 TIMES)

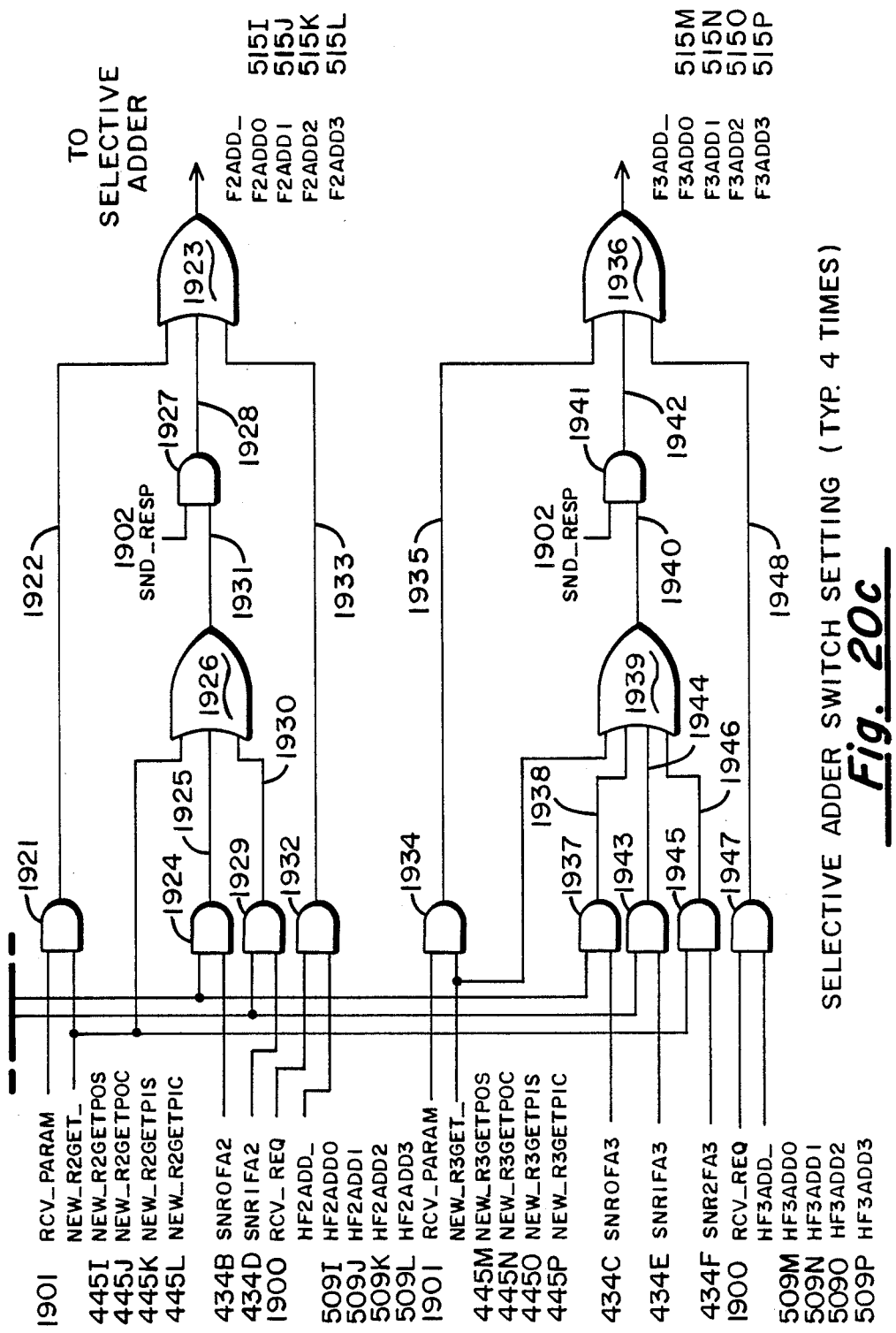
Fig. 20c SELECTIVE ADDER SWITCH SETTING (TYP. 4 TIMES)

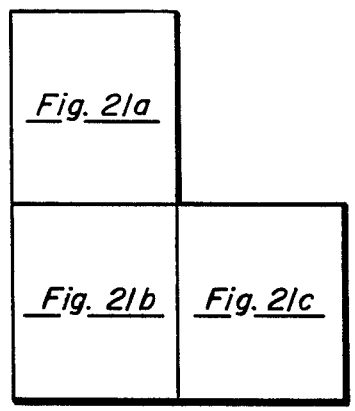
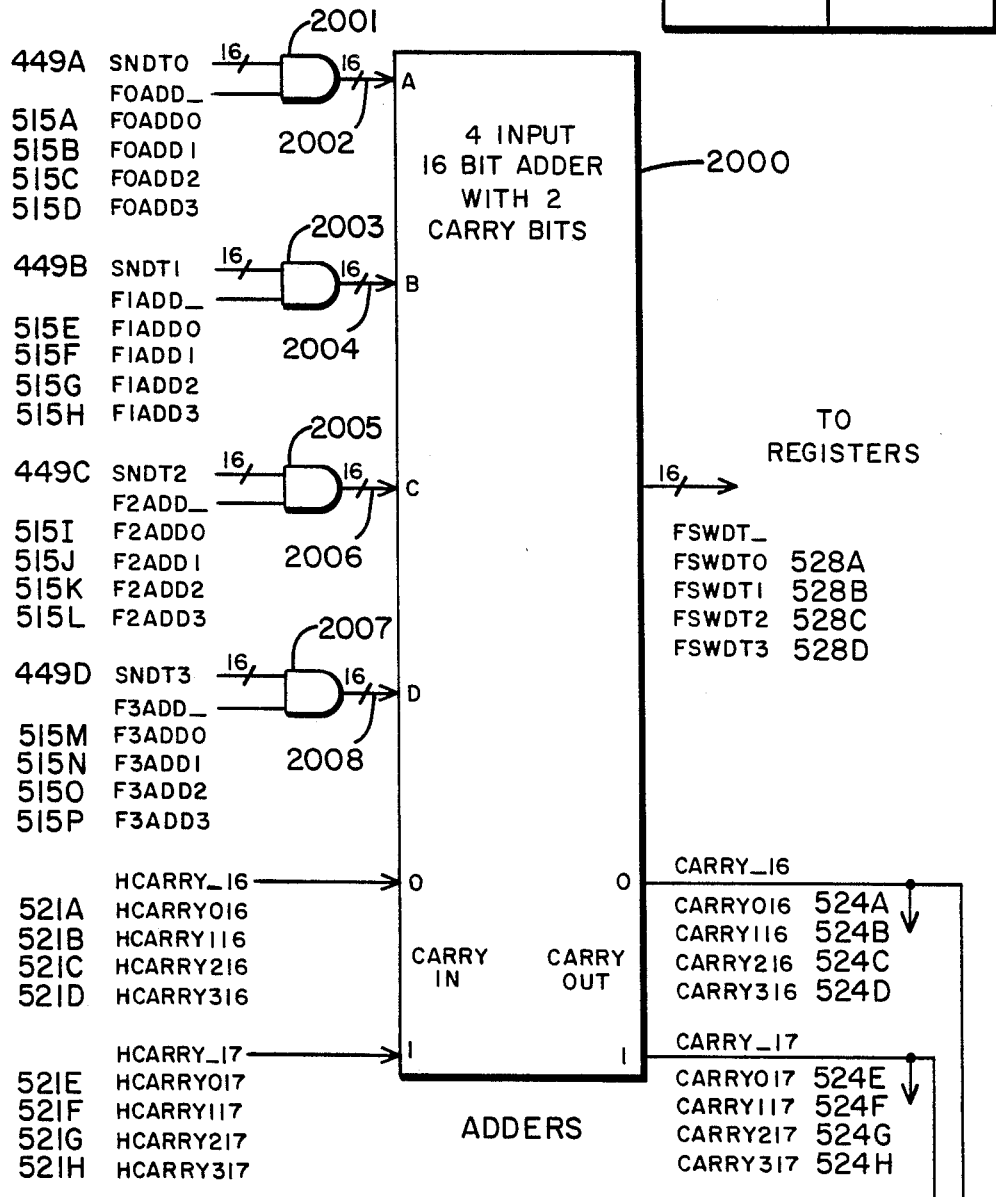
Fig. 21
Fig. 21a — SELECTIVE ADDERS (TYP. 4 TIMES)

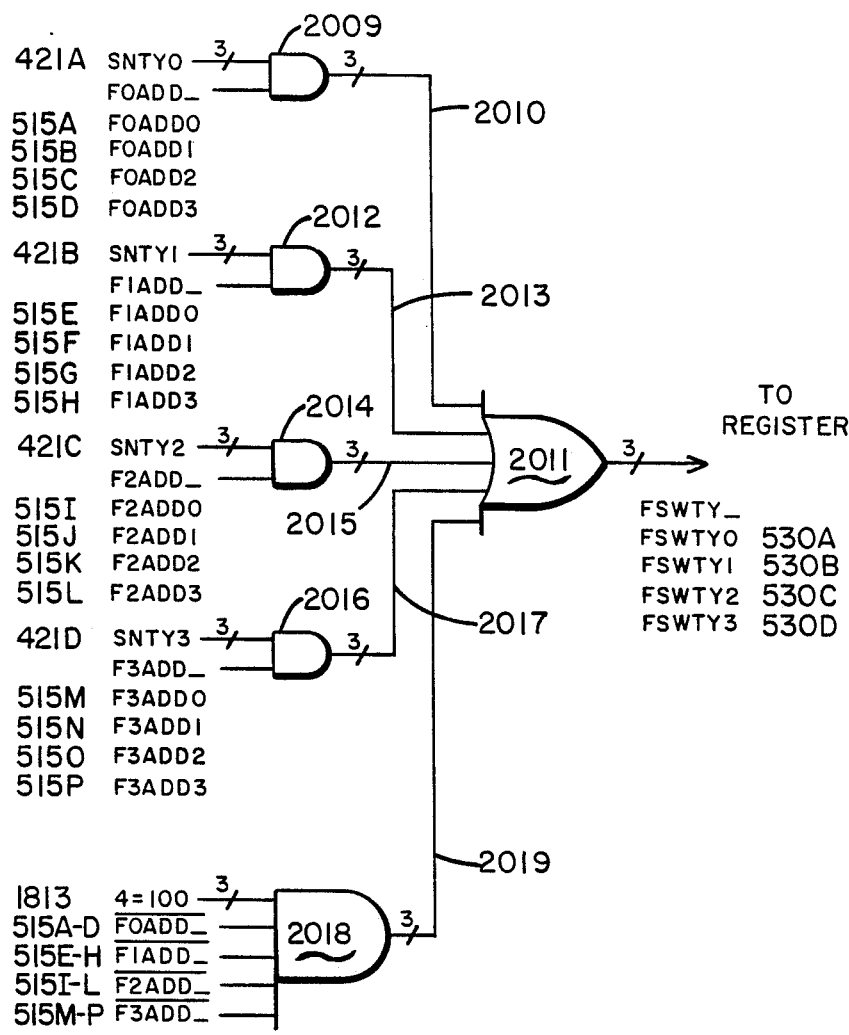
Fig. 21b SELECTIVE ADDERS (TYP. 4 TIMES)

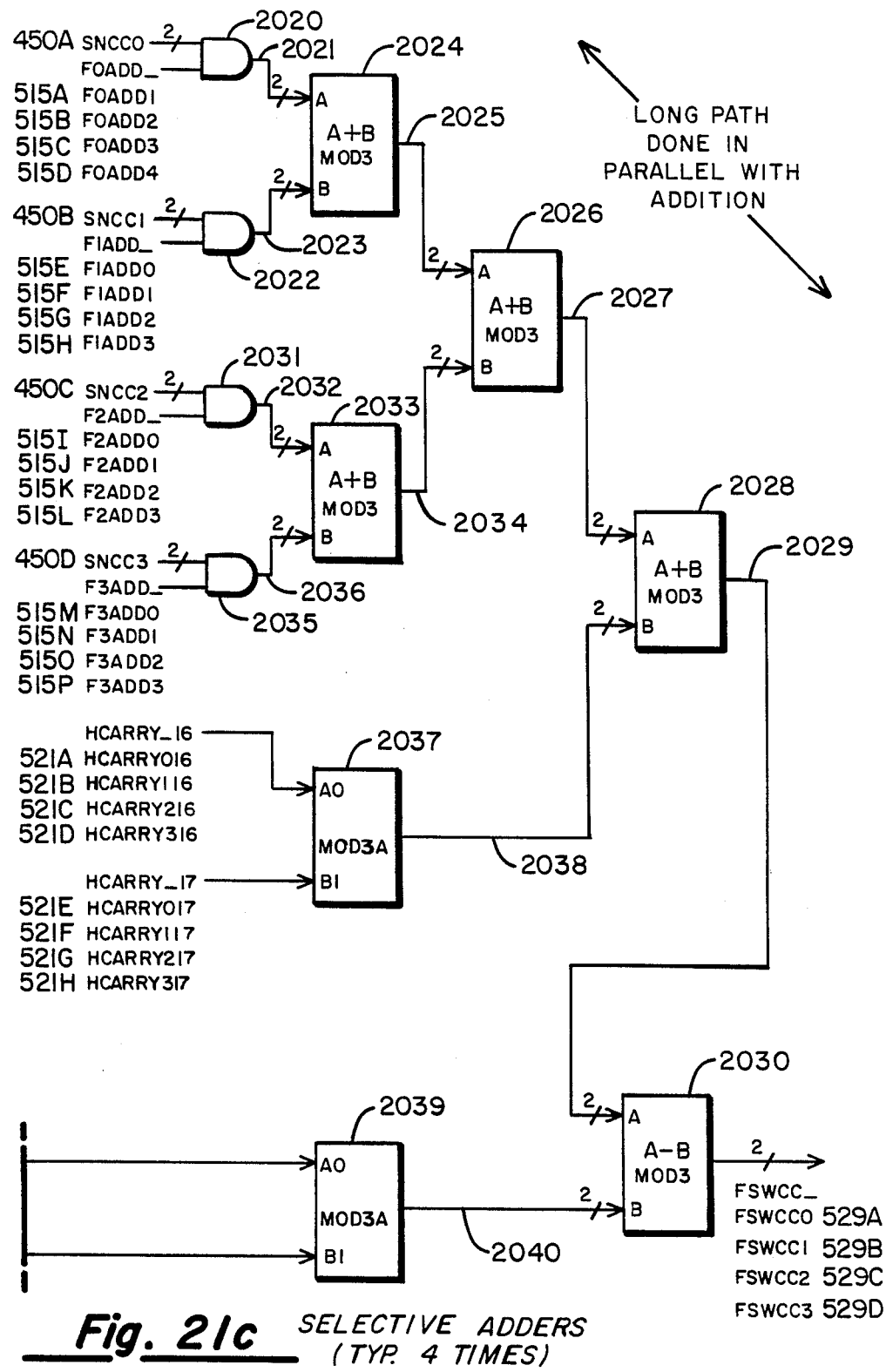
Fig. 21c SELECTIVE ADDERS (TYP. 4 TIMES)

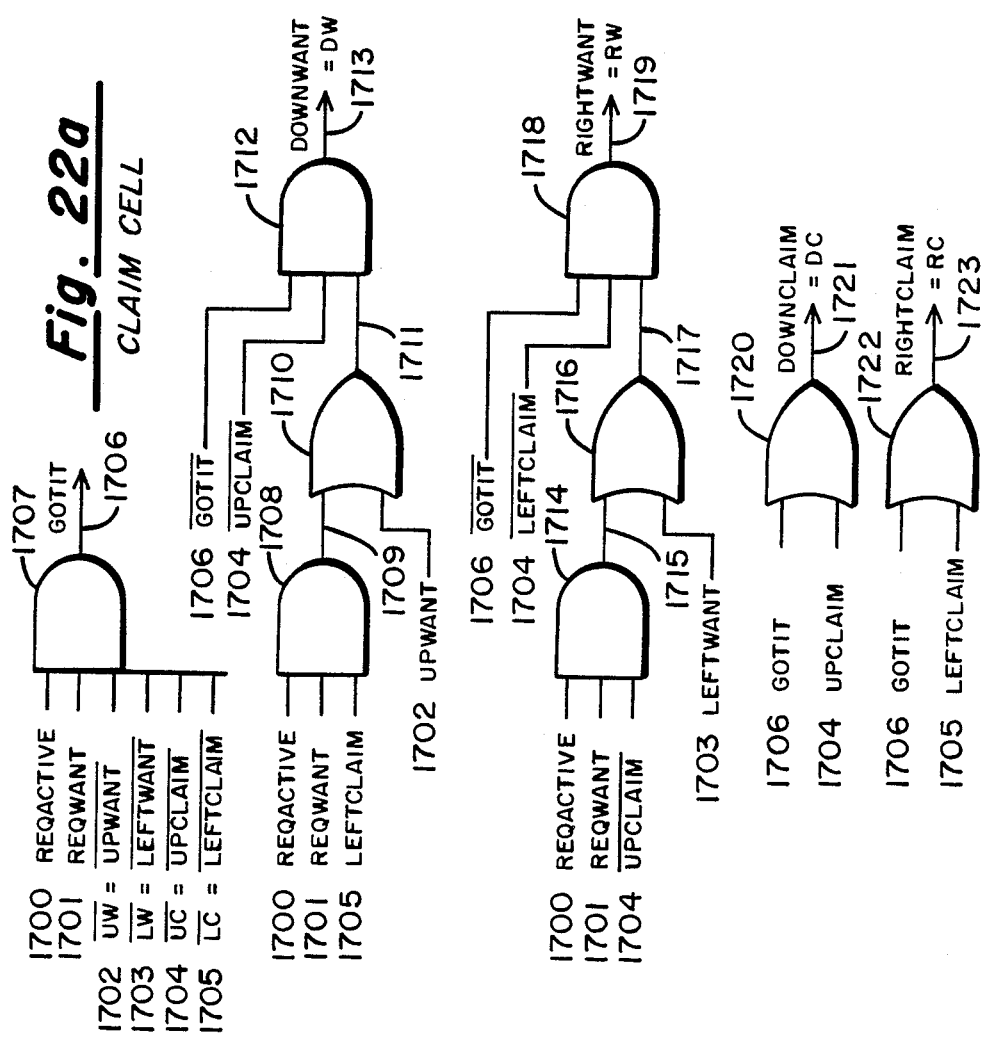

REQUEST EVALUATION MERGE CHECK

REQUEST EVALUATION MERGE CHECK

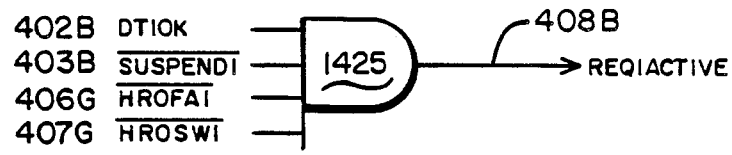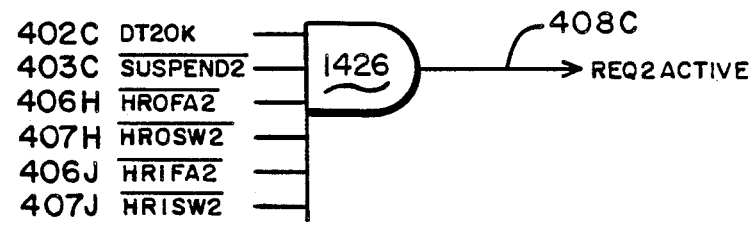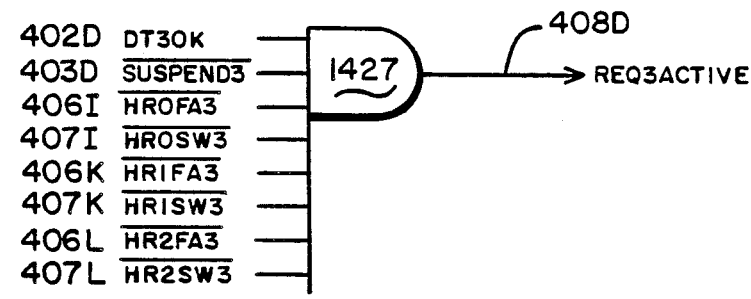
REQUEST EVALUATION
REQUEST_ACTIVE SIGNALS
*Fig. 23c*

A-B MOD3

THIS CELL IS THE SAME AS
A+B MOD3 EXCEPT SWAP
B0 & B1 INPUTS.
IN MOD3 -1 = 2 & -2 = 1

LEFT HAND BUFFER HANDSHAKE
(TYP. 4 TIMES)

RIGHT HAND BUFFER HANDSHAKE
(TYP. 4 TIMES)

LAYERED NETWORK

BACKGROUND OF THE INVENTION

The data processing capability of systems composed of many processors, each operating on one piece of a problem concurrently, is currently strained even for massively powerful computers. One of the major stumbling blocks to effective utilization of the processors is communication between processors.

A significant limitation of systems that are composed of many individual digital computers is the large amount of communication required. Existing interconnection networks are too costly, too slow, or allow only a small subset of the desired connection patterns. The Layered network of the present invention spans the full range from very cheap, blocking networks to robust, complete routing networks. The system designer may select an appropriate member of the Layered class based on the system's requirements.

Classical interconnection networks (baseline, Banyan, etc.) use distributed routing schemes to avoid the problems associated with centralized network control. The classical networks establish a connection by setting each switch by one of the bits in the "request." The request is merely the number of the processor to which the connection should be made. With an N processor baseline network, each of the $\log_2 N$ bits is used to set one of the $\log_2 N$ switches of size 2 by 2 in its path. Unfortunately, one complete connection prohibits the existence of many others. Thus, "blocking" occurs when two requests arrive simultaneously at a switch and both need to use the same terminal. Layered networks may choose from more than one digit to route and therefore route connections that would normally be blocked.

The tutorial "Interconnection Networks for Parallel and Distributed Processing", edited by Wu and Feng, published in 1984 by the IEEE Computer Society contains a collection of papers which represented the state-of-the-art in interconnection networks. Among these papers is "A Sampler of Circuit Switching Networks" (Computer, June 1979) that reviews several networks including the Cantor network. This paper gives a simple proof that the Cantor network is non-blocking, (i.e., a path can be found from any unused input to any unused output), but notes that routing algorithms can route at best one path at a time. [See p. 154, Pippenger]

The crossbar switch (see p. 146 of Wu and Feng) can be routed in a fast non-blocking manner, but its cost rises rapidly with the number of processors to be connected. Wu and Feng show in their paper, "The Reverse Exchange Interconnection Network" (IEEE Trans Computer, September 1980), the functional relationship between many of the studied interconnection networks including: Baseline, Omega, Flip, Banyan, and others. They also identify the small subset of all possible permutations that those networks can perform. The topological transformations taught by Wu and Feng may be used in conjunction with the topology of the present invention and within the scope of the invention to provide alternate embodiments.

Unlike the Cantor network, Baseline networks have fast routing algorithms, but they are blocking. Wu and Feng also discuss the Benes network. The Benes network can be constructed by cascading two "baseline type" networks. The Benes network can implement all N factorial (N!) permutations. Furthermore, the routing algorithms that allow all permutations, much less combinations, require centralized matrix manipulation. To summarize, existing networks either are too costly (crossbar), lack an efficient routing algorithm (Cantor, Benes), or fail to implement all permutations and combinations (Baseline).

The crossbar switch (FIG. 1) has been used in many prior interconnection systems for its high speed, repetitive construction, and full interconnect capability. A crossbar is basically a unidirectional device in which the outputs "listen" to the inputs. Each output can listen to any desired input without conflict. The crossbasr's totally non-blocking property and distributed control serves as an ideal standard. However, the crossbar exhibits on the order of $O(N^2)$ cost growth and does not allow special broadcast operations where different listeners receive different values from the same input. (The notation $O(N^2)$ means "on the order of" or, in other words, a value proportional to $N^2$, where "N" is the number of processing nodes connected to the network.) For example, "Fetch-And-Op" operations are useful in large multiprocessing systems.

These limitations have led investigators to multistage interconnection networks topologically equivalent to Baseline networks, such as the Omega network shown in FIG. 2. The reverse Banyan network of FIG. 3 most closely resembles the Layered network of the present invention from among the classical, Baseline-equivalent networks. Although such networks have distributed routing algorithms, good cost and access delay growth, and support fetch-and-op operations, the blocking property inherent in such networks imposes uncertain delay that is detrimental to the performance of tightly coupled processes. The Cantor network of FIG. 4 is advantageous because of its $O(N \log^2 N)$ cost growth and its easily proven non-blocking property. However, setting of the switches for such a network is relatively slow and not adequately distributed.

Five measures of performance of desirable networks are: full interconnection, distributed routing algorithm, minimal access time, low cost growth, and support for special broadcast operations (such as fetch-and-op). The new class of Layered interconnection networks of the present invention satisfies these criteria and can provide all $N^N$ interconnection patterns with $O(N \log^3 N)$ cost growth.

A new class of multistage interconnection networks, dubbed "Layered" Networks, for exchange of data between processors in a concurrent computer system are introduced by the present invention. Layered Networks provide an alternative to highly-blocking classical networks equivalent to the Baseline network. Layered Networks support a much richer set of connnections than classical networks. A subclass of Layered Networks, "binary, fully-Layered" networks, is shown to implement all connections possible with a crossbar using the distributed switch setting algorithm, but with much slower cost growth when scaled up to systems with more processors.

SUMMARY OF THE INVENTION

The network of this invention (termed a Layered Network) comprises a class of multi-stage interconnection networks. The invention provides for communication paths between digital computers or other electronic devices, and a structure of identical switches and a distributed method of determining the switch settings.

A significant limitation that is imposed on systems that are composed of many individual digital computers is the large amount of communication required. Existing interconnection networks are too costly, too slow, or allow only a small subset of the desired connection patterns. The Layered network class spans the full range from very cheap, blocking networks to robust, completely routing networks. A system designer may select an appropriate member of the Layered Network class based on the particular system's requirements.

It is an object of this invention to provide a class of novel interconnection networks and methods of control.

It is another object of this invention to provide a broad range of allowed interconnections.

It is another object of this invention to allow for trade-offs of the cost of the chosen network versus the number of allowed interconnections.

It is another object of this invention to allow for all possible permutations and combinations of connections to be accomplished in order of $\log_2 N$ stages of switches and time.

It is another object of this invention to allow merging of fetch-and-op commands in such a way that although processed concurrently, the results of the command will be returned as if the commands had occurred in some sequential order.

It is another object of this invention to allow a single switch implementation to be used to interconnect various numbers of processors.

It is another object of this invention to permit queueing of access requests within the switches of the network when service had been denied.

It is another object of this invention to report to requestors that an access request had been denied.

It is another object of this invention to permit retry of access requests that had been denied to report to requestors that an error has occurred and to permit retry of access requests that received an error.

It is another object of this invention to report to requestors that an error has occurred.

It is another object of this invention to permit retry of access requests that received an error.

It is another object of this invention to allow different communication formats, including, but not limited to, bi-directional, hardwired, telephone-type connection; pipelined, multiplexed, unidirectional result returning; or distinct, but related request sending and result returning.

It is a further object of this invention to allow specially defined commands to be communicated, including, but not limited to, block transfers of data; full-/empty conditional reads and writes; privileged modes; or tags identifying the requestor.

BRIEF DESCRIPTION OF THE DRAWINGS

Various features and advantages of the invention will be best understood by reference to the following detailed description of the invention and accompanying drawings wherein:

FIGS. 9, 9a–9d, 10, 10a–10d, 11, 11a–11d, 12, 12a–12d, 13, 13a–13c, 14, 15a–15c, 16a–16d, 17, 17a–17c, 18, 18a–18d, 19a–19c, 20, 20a–20c, 21, 21a–21c, 22a–22b, 23a–23c, 24a, 24b, 25, 26a and 26b are detailed block diagrams of an implementation of the switching circuit of FIG. 8.

DESCRIPTION OF THE INVENTION

The Layered Networks of the present invention are constructed with a multitude of switches with point-to-point connections between them. The network establishes connections from requestors to responders by relaying "requests" through the switches. Each switch has built-in control logic to route requests and responses. The switch setting is determined using the comparison of the request with the request's current location in the network. Each switch routes the requests using only the information contained in the requests and switch routes to provide distributed routing without a centralized controller. The switch setting is remembered to route the responses on the same paths as the associated request, but in the reverse direction.

Layered Networks are constructed such that a switch can route a signal to another switch that has the same switch-number except for a single b-ary digit in the next stage. A request contains a b-ary number identifying the desired response port. The switch compares the request with the switch-number. If the b-ary digit compared is the same, the request is routed straight, otherwise the request is routed to another switch that matches the digit in the request. At the end of the network, the request should have reached the switch in the $\log_b N^{th}$ stage whose switch number exactly matches the request. In the disclosed embodiment binary digits are employed.

Classical interconnection networks (baseline-equivalent) use distributed routing schemes to avoid the problems associated with centralized network control. The classical networks establish a connection by setting each switch by one of the bits in the "request." The request is merely the number of the processor to which the connection should be made. With an N processor Baseline network, each of $\log_2 N$ bits is used to set one of the $\log_2 N$ switches of size 2 by 2 in its path. Unfortunately, one complete connection prohibits the existence of many others. Thus, "blocking" occurs when two requests at a switch both need to use the same terminal. Layered Networks, on the other hand, may choose from more than one connection and can route requests and responses that are blocked by the classical, baseline-equivalent networks.

Figure 5:
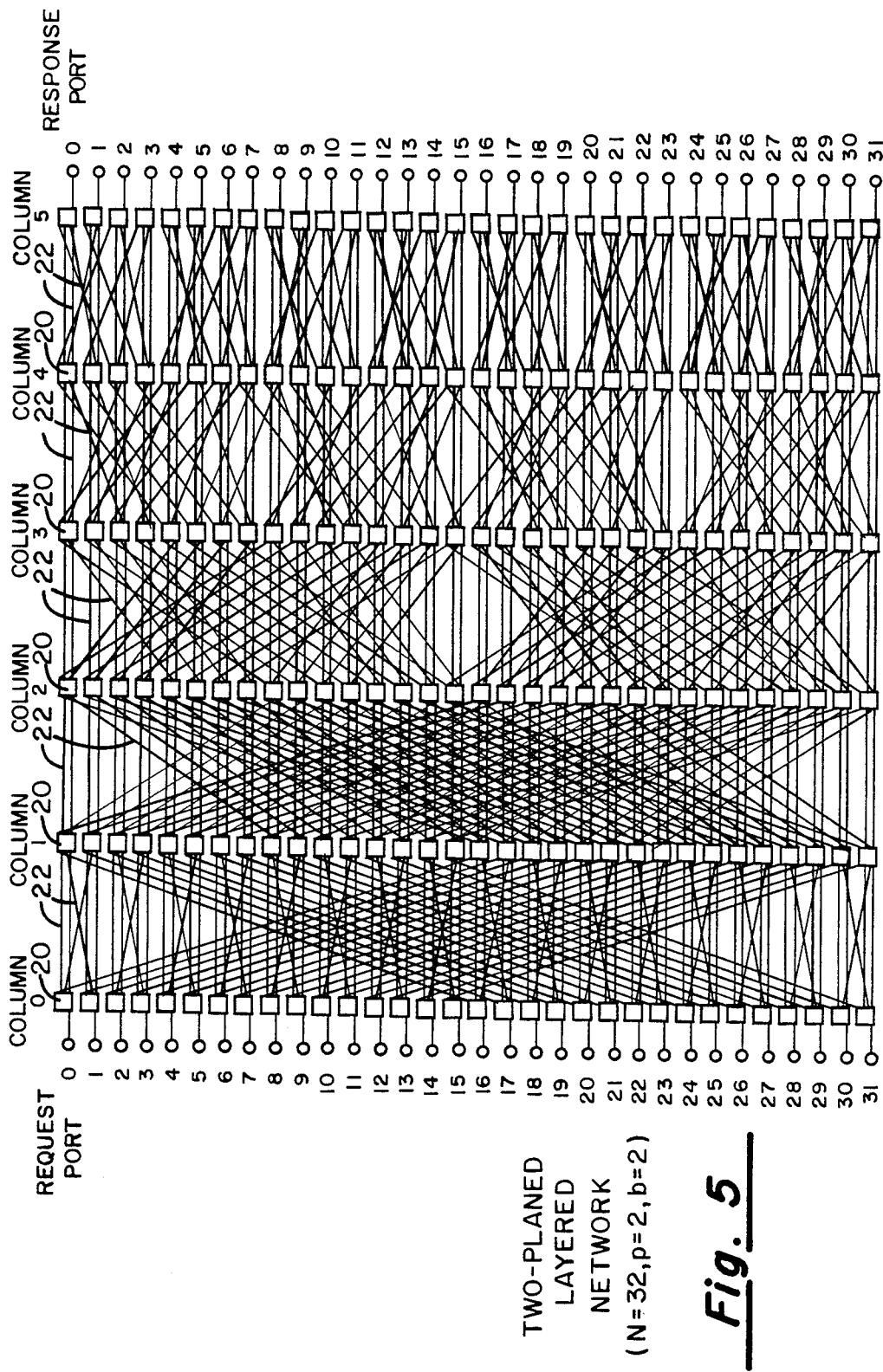
FIG. 5 is a block diagram of a two layered network constructed in accordance with the present invention.
Figure 6:
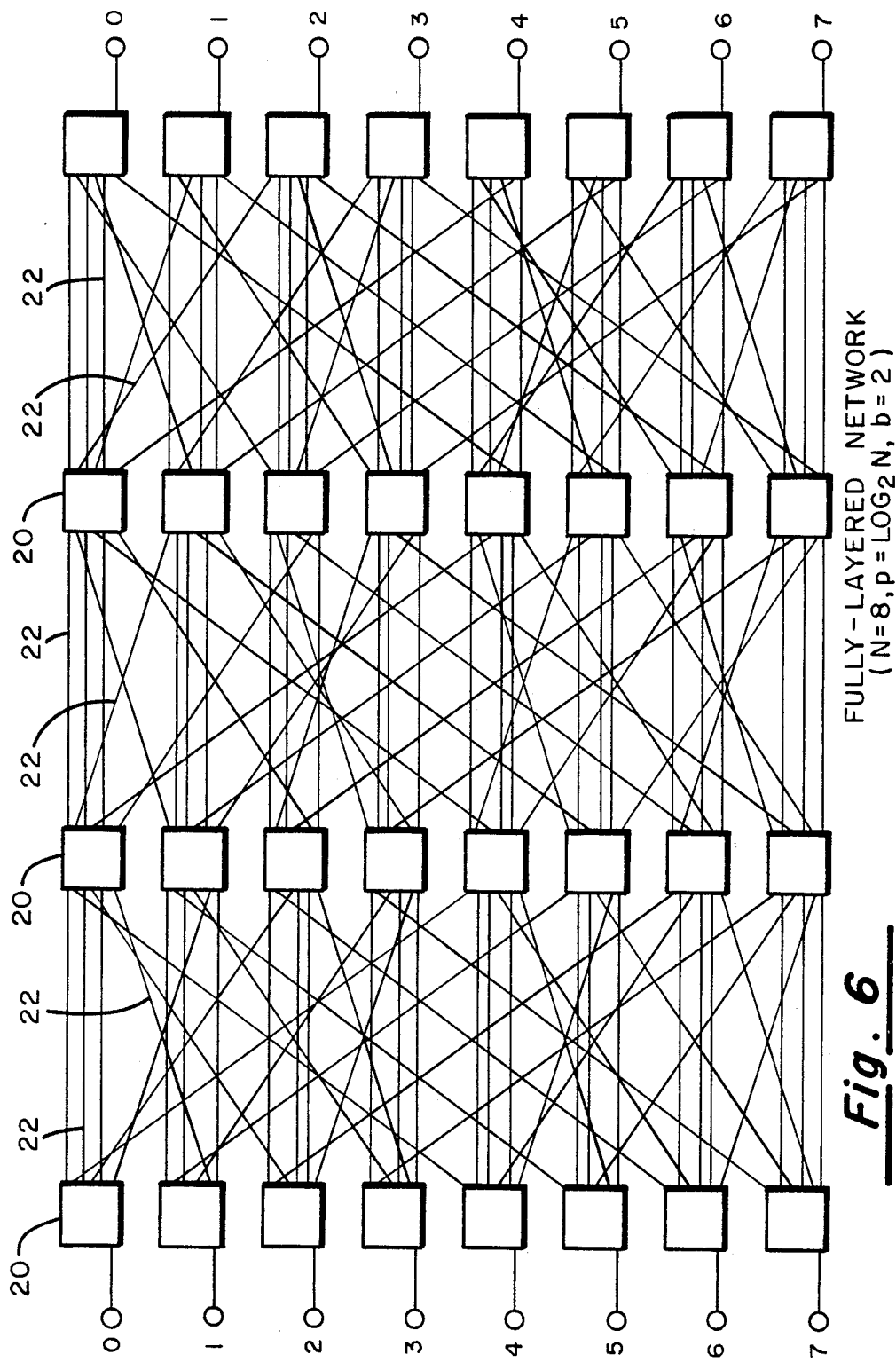
FIG. 6 is a block diagram of a fully layered network constructed in accordance with the present invention.

Three parameters define a Layered Network: N—the number of processors connected to the network, b—the base of logarithms and number representation, and p—the number of "planes" of connections in the network. The planes in a Layered Network provide additional paths that reduce contention in switch setting. A general overview of a Layered Network with N=32, b=2, and p=2 is shown in FIG. 5. The Layered Networks are constructed such that a switch can route a signal (request or response data) to other switches in the next stage that has the same switch-number except for a single b-ary (base b) digit. A Layered Network with $N=8$, $P=\log_2 N$ and $b=2$ is shown in FIG. 6.

The switch setting algorithm requires information regarding only those connections that use the switch. Each switch is set independently, without information exchange between switches in the same stage which allows distributed switch setting. The switch compares the request which is a b-ary number identifying the desired response port with the switch-number. If the b-ary digits compared are the same, the request is routed straight, otherwise the request is routed to another switch that matches the b-ary digit in the request. At the end of the network, the request should have reached the switch in the $\log_b N^{th}$ stage whose switch number exactly matches the request.

Another way to operate Layered Networks is to utilize the concept of Hamming distance. In the binary case, $b=2$, the Hamming distance between two numbers is the quantity of bits differenet between the numbers. Each bit is compared with a bit of the other number of equal significance and the differing bits are counted. Similarly, for b greater than 2, the Hamming distance, d, is the quantity of b-ary digits that differ by the magnitude of the number r exclusive OR'ed with the magnitude of a second number t ($d=r$ "xor" $t$). The Hamming distance for a request is calculated by comparing the number that identifies the desired response port (referred to as the request) with the switch-number which identifies the switch it occupies. When the request's Hamming distance equals zero, the request equals the switch-number. The last stage switches are connected to response ports whose input-numbers match the switch-numbers. If a request reaches a last stage switch, and has Hamming distance zero, it has successfully routed the desired connection. The stages reduce the Hamming distance of the requests as they propagate by switching the request to a switch in the next stage that matches one more b-ary digit. When $b=2$, and $p=\log_b N$, all $N^N$ request sets route successfully.

The system of U.S. Pat. No. 4,084,260 entitled "Best Match Content Addressable Memory" issued to Fleming et al on Apr. 11, 1978 and assigned to the assignee of the present invention shows a Hamming distance circuit that may be adapted to the present invention. U.S. Pat. No. 4,084,260 is hereby incorporated by reference into this document. In order to adapt the circuit of U.S. Pat. No. 4,084,260 to this invention, the Search Word Register of this patent would receive the binary representation of the complement of the switch number, the Best Match word Register would receive one of the processor addresses and the Search File Register would receive the other processor addresses in succession. Because the complement of the switch number is used, the last word in the match register will be the processor address with the maximum hamming distance, rather than the minimum hamming distance.

The address with the largest hamming distance is eliminated from the file and the process is repeated using the remaining Search File Register processor address to get the second to the largest hamming distance. The process is repeated until all requests are ordered by hamming distance.

The request terminal number must be sent to each processor addressed as a label. The request number, however, will not be included in the hamming distance calculations.

NETWORK STRUCTURE

The network structure defined in this section provides the notational foundation for Layered Networks. This section speaks to the size of switches and their interconnection without regard to implementation, use or technology.

Three parameters specify a Layered Network: N—the number of processors, b—the base of logarithms, p—the number of planes. The switches used must have b*p inputs and b*p outputs, where * indicates multiplication. A Layered Network uses $N*(\log_b N+1)$ identical switches. The number of processors, N, must be an integer power of b ($N=b^n$ where $n=\log_b N$). Assuming that the swtiches have a cost proportional to the square of the number of inputs, (as is true of crossbars), the total network cost would be proportional to $N*(\log_b N+1)*(b*p)^2$. Switches are arranged in columns called stages with N switches per stage. Then, $\log_b N+1$ stages are connected to form the network. Layered Networks can be cascaded, if desired, like baseline-type networks to obtain higher percentages of successful routings.

Each object (request terminals, response terminals, stages, switches, and switching or network terminals) as a designation of the form: Identifier (list of parameters). Stages are denoted by Stage (stage-number) where stage-number ranges from 0 to $\log_b N$. Switches are denoted by switch (stage-number, switch-number) where switch-number ranges from 0 to $N-1$. Switch terminals are denoted by swTermL (stage-number, switch-number, plane-number, digit-number), for "left-hand-side" terminals (alternatively SwTermR for "right-hand-side" terminals) where plane-number ranges from 0 to $p-1$ and digit-number ranges from 0 to $b-1$.

All Layered Networks use the same connection formula to determine the wiring of the switches. The parameters N, b, and p define the version of the Layered Network. The following construction procedure definitions yield Layered Networks.

(C1) Choose the number of processors, N, the base of logarithms, b, and the number of planes, p. Determine the switch size having b*p left-hand terminals and b*p right-hand terminals (* means "multiply"). (A terminal may consist of more than one wire or coupling.)

(C2) Establish $\log_b N+1$ stages of switches denoted Stage (stage-number) where stage-number ranges from 0 to $\log_b N$.

(C3) Place N switches in each switch stage denoted Switch (stage-number, switch-number), where switch number ranges from 0 to $N-1$.

(C4) Connect each right-hand switch terminal to a left-hand switch terminal by:
SwTermR (stage, switch, plane, digit)→
SwTermL (stage+1, sw, plane, dig);
where efp1=(plane+$\log_b N-1$-stage) MOD $\log_b N$; is the effective plane
dig=(switch DIV $b^{efp1}$) MOD b;
sw=switch+((digit-dig) MOD b) * $b^{efp1}$;

(C5) Establish N response terminals on the right side of the network, and N request terminals on the left, designated Res(input-number) and Req(output-number) respectively, where input-number and output-number range from 0 to $N-1$. The switches are set by requests from processors. The "inputs to the network" respond to the arrived requests and submit the desired data.

(C6) Connect the request terminals to "first" column of switches by:

Req(output-number)→SwTermL(0, output-number, 0,0).

(C7) Connect the response terminals to the "last" column of switches by:

Res(input_number)→SwTermR($\log_b N$, input_number, 1 (Input_Number DIV $b^{p-1}$) MOD (b).

This completes the rigorous definition of a Layered network without cascading. A cascaded network would have several sets of stages of switches as described above. However, the Layered Network class is so powerful with a single set of stages that cascading provides little additional connectivity.

By following these network structure rules, a pattern of linking wires between input and output ports is established for each selection of N, b and p. For example, in FIG. 5 where N=32, b=2 and p=2, there are two interconnection patterns one of which is implemented with each switch in a column being connected to the same numbered switch in the adjacent column by two wires, (which are illustrated by the horizontal lines in the Figure). The other pattern is implemented by the remaining wires, (which are illustrated by the angled lines in the Figure). (The value of p indicates the number of horizontal wires in one pattern and the corresponding number of angled lines on the other pattern from one column of switches to an adjacent column.)

In FIG. 6 where N=8, b=2, and p=3, one interconnection pattern is requested by the three horizontal lines from switches in a column to the same numbered switches in the adjacent columns. The other pattern is implemented by the remaining angled wires. The two interconnection patterns are thus a function of N and b which is established by the Network Structure rules C1 through C7 above.

SWITCH SETTING

In addition to a novel connection of switches, the switch setting algorithm itself is special for Layered networks. A simple notion of the Layered switch is a crossbar that can connect any permutation or combination of its inputs to its outputs, combined with a mechanism to set the switch.

A Layered Network switch may receive at most b*p requests simultaneously. The Hamming distance of each request with respect to the switch is calculated. The request with the greatest distance selects one of the b*p terminals which will reduce its distance, if such a terminal exists. Other requests then select terminals in decreasing Hamming distance order. In this manner, those signals that need the most "correction" have priority in terminal selection to reduce the distance.

The routing of requests begins with each request terminal issuing a request consisting of at least the response terminal's parameter. Additional bits may represent a memory address, a fetch-and-op parameter, error code bits, or handshake lines. No more than one Response terminal may be connected to a Request termminal, but any number of request ports may connect to a single Response terminal. Routing of Layered Networks is accomplished by the following steps:

(S1) Issue a request from each request terminal as needed.

(S2) Transmit requests to the 0th stage switches with rule C6 above.

(S3) Set a stage of switches by repeating the following for each switch in the stage:

(S3a) Combine identical requests into one. Record the combination.

(S3b) Determine Hamming distance of each request.

(S3c) Assign right-hand terminals by:
(1) Signals with larger Hamming distance have priority in terminal selection.
(2) No more than one request can be assigned to the same terminal.
(3) Use the most significant (highest numbered) effective plane that reduces the Hamming distance. The effective plane, efp1=(plane+$\log_b$ N−1−stage) MOD $\log_b$ N.
(4) The request will select a terminal if that effective plane will decrease the distance and will choose the "digit" that matches the corresponding digit in the request.
(5) Put any request that cannot be assigned by the previous steps on an arbitrary terminal preferring to use straight connections on the lowest numbered effective plane.

(S3d) Transmit the requests to the next stage via the connections made with C4 above.

(S4) Repeat S3 for all remaining stages.

(S5) Transmit the request from the $\log_b N^{th}$ stage to the response terminals via the connections made with C7 above.

The Layered network is now routed. With suitable storage of the request routing by the switches, the responses can follow the same path, but in the reverse direction, back to the request terminals.

FULLY LAYERED NETWORKS

Fully-Layered Networks are Layered Networks having p=$\log_b$ N. The $\log_b$ N planes allow routing of a request to any switch in the next stage whose switch-number differs by a Hamming distance of zero or one. Binary, Fully-Layered network has cost growth on the order of $N \log^3 N$ without recursive definition, determined by substituting b=2 and p=$\log_2$ N into the network cost equation. A binary Fully-Layered Network with N=8, b=2, and p=3 is shown in FIG. 6. If the switches, previously assumed to be crossbars with cost proportional to the square of its terminals, are replaced by Layered Networks, the cost drops to on the order of $N \log^2 N * \log \log^3 N$.

The following proof of the non-blocking property of the binary, Fully-Layered network and algorithm demonstrates that the Hamming distance between request and switch-numbers is reduced to zero as the request is transferred through the network. A Hamming distance of zero between the request and switch-number at the last stage implies that the routing is complete. For the following pages, log N refers to $\log_2$ N.

Clearly, if a signal can select a helpful terminal (reducing Hamming distance) at every stage, log N bits different between output number and request can be changed in log N stages. However, "bumping" of conflicting requests in terminal selection means that all of the signals cannot be helped (by reducing their Hamming distance) at all of the stages. A "bump" occurs during switch setting when two requests choose the same SwTermR. By rule S3c, one request will get its choice and the other is "bumped" to a remaining terminal. The proof also shows that any bumped signals have small enough distance to be resolved by later stages of the network. The proof shows that after the $j^{th}$ stage, the number of requests having Hamming distance ($d_{r,t}$) is at most log N−j.

In order for a signal to be bumped, all of the terminals which handle the differing bits of the request must be claimed by requests with equal or greater distance. Therefore, if the $g^{th}$ request in sequential plane selection is bumped, its distance $d_{g,t}$ is less than g. "$d_{r,t}$" is the Hamming distance between the request, r, and the term, t. Both r and t have range=[0..N−1] expressed in log N bits. Values for $d_{r,t}$ have range−[0..log N].

The request terminals are connected to the $0^{th}$ stage, $0^{th}$ plane of the netowrk terminals. Since only one request is handled by plane selection in the first stage of switches, no bumps can occur. Furthermore, those signals that have $d_{r,t}$=log N, must select the $0^{th}$ plane, which is the plane whose effective plane is log N−1. Therefore, after the first stage, the greates distance of any request is log N−1, and those requests occupy the $0^{th}$ plane. Similarly, after the $j^{th}$ stage, all signals with the maximum distance of log N−j will occupy the j−$1^{th}$ effective plane. Only one signal with distance log N−j will be present at the beginning of the j+$1^{th}$ stage for each plane selection switch, and other quantities of lesser distanced signals are also limited. Any signal with maximum distance will get first choice of planes and bring the signal closer to its destination. Therefore, the maximum distance of any signal after the $j^{th}$ stage is log N−j. After the log $N^{th}$ stage, the maximum distance is zero.

BINARY FULLY-LAYERED NETWORK ROUTABILITY

This section shows how the described routing algorithm routes the binary, Fully-Layered Network. A routable network is sufficient for a concurrent processor system in which all routes are chosen simultaneously. The customary definition of non-blocking, the ability to route any connection without disturbing existing connections, is not relevant to networks that attempt to route all requests simultaneously. What is of interest is that the network can be routed in on the order of (log N) time. (The Cantor network is non-blocking, but not "routable" in the sense the term is used herein.)

The binary Fully-Layered Network consists of switches with 2log N left-hand terminals by right-hand terminals 2log N. Although the construction speaks to single connections and terminals, the path requires w wires where w is the width of the data path. W=1 would be a serial connection, while w=log₂ N would be word parallel.

(A) Every switch can place requests on terminals that connect to switches that differ by only the plane$^{th}$ digit in their switch numbers. Consider an arbitrary switch, S(stage, switch). By rule C4, the right-hand switch terminals SwTermR(stage, switch, plane, digit) are connected to left-hand switch terminals SwTermL(stage+1, S.W., plane, dig), where plane=[0..log N−1], digit=[0..1], efp1=(plane+log₂ N−1−stage) MOD log₂ N, dig=(switch DIV $2^{efp1}$) MOD 2, and sw=switch+((digit−dig) MOD 2) * $2^{efp1}$. The difference in the switch-numbers, sw'switch=((digit−dig) MOD 2) * $2^{efp1}$. Therefore, sw and switch are identical except for the efp$1^{th}$ bit and have a Hamming distance of one.

(B) If a request does not bump in rule S3c in a particular stage, the request's Hamming distance will be reduced by one. If a request gets a plane matching one of its differing bits by rule S3c then by A above, the request has moved to a terminal whose efpl$^{th}$ digit is changed. Therefore, the efp$1^{th}$ digit no longer differs and the Hamming distance of the request to its new switch in the next stage is reduced by one.

(C) During plane selection, if the $g^{th}$ signal assigned to a plane is select bumped, then $g>d_{g,t}$. The only way for the $g^{th}$ signal to be bumped is for requests of equal or greater distance to claim all of the $d_{g,t}$ planes that could reduce the distance. Therefore, the g−1 requests of greater or equal distance must claim $d_{g,t}$ terminal, and $g>d_{g,t}$.

(D) Barring bumps, for a stage j switch, and for some arbitrary distance $d_{r,t}$, the number of requests at a single switch with distance $d_{r,t}$ l or greater, k, is limited to $k=_{log N−j}+1−d_{r,t}$. After the first stage, with only one signal for each switch by C6 of the Network Structure section, each request has selected the plane of its most significant bit of difference by rule S3c3. Those signals with $d_{r,t}$=log N at the outputs must occupy the log N−$1^{th}$ effective plane, since they differ by every bit. At each stage the requests with the maximum distance of $d_{r,t}$=log N−j will all select the same effective plane (log N−j−$1^{th}$) as the requests march down the network. Similarly, requests that start with $d_{r,t}$=log N−1 must select either effective plane log N−1 or log N−2 by rule S3c3 and continue occupying at most two planes. Since a maximum distance signal may be included, the total possible number of signals with $d_{r,t}$=log N−j is k=2. For requests of even lesser distance the property holds allowing at most k signals such that k<=log N−j+1−$d_{r,t}$.

(E) For any request to bump, it must have Hamming distance $d_{r,t}$<(log N−j+1)/2.

By C above, $g>d_{g,t}$ to bump. By D above, at most k signals with $d_{r,t}$ such that k<=log N−j+1−$d_{r,t}$. Choose g=r=k. Then $d_{r,t}<g<=_{log N−j}+1−d_{r,t}$. Therefore, $d_{r,t}$<(log N−j+1)/2.

(F) No request entering stage j with distance either log N−j or log N−j−1 will bump, and will reduce their distance by one.

By C above, if the $g^{th}$ request bumps then $g>d_{g,t}$. By E above, $d_{g,t}$<(log N−j+1)/2. Since requests with $d_{r,t}$=log N−j or log N−j−1 cannot be less than (log N−j+1)/2 they cannot bump. By B above, the request's distance will be reduced by one.

(G) After the log $N^{th}$ stage, all requests have $d_{r,t}$=0.

By F above, after stage j the maximum distance of any request is log N−j. When j=log N, then $d_{r,t}$=0.

(H) The final stage will acquire information from the proper inputs.

By G above, before the final stage, rule C7 of the network structure section, all requests have zero distance meaning the network terminal matches the desired input. The final stage will route the requests to the zero$^{th}$ effective plane by rule S3C5 and C4 to complete the connection with the inputs from rule C7.

ROUTABILITY

The investigation of Layered Networks used simulation initially to determine and refine the interconnect definition and routing algorithm. Observations of fully Layered Networks in simulation led to formalization of the routability proof. Interestingly, Fully-Layered Networks with b=3 or 4 have completely routed all patterns in simulation, but those with b=5 or greater do not. Simulations show that Layered Networks with p=2 have substantially fewer incompleted connections than networks with p=1 (which highly resemble baseline-equivalent networks). When two Layered Networks with p=2 and p=2 are cascaded in simulation, all connections were successfully routed.

It is believed that a Layered Network with two planes using fetch-and-add request combining will exhibit substantially reduced "hot spot" contention compared with baseline-equivalent networks. Layered Networks may, thus, provide rapid, unconstrained communication, as required for tightly coupled concurrent systems. Binary, Fully-Layered Networks will implement all $N^N$ connections of a crossbar, but with on the order of (log N) stages and a cost growth on the order of (N $\log^3$ N). Layered Networks with two planes are expected to have a substantially richer set of allowable connections than single-plane networks.

Figure 7:
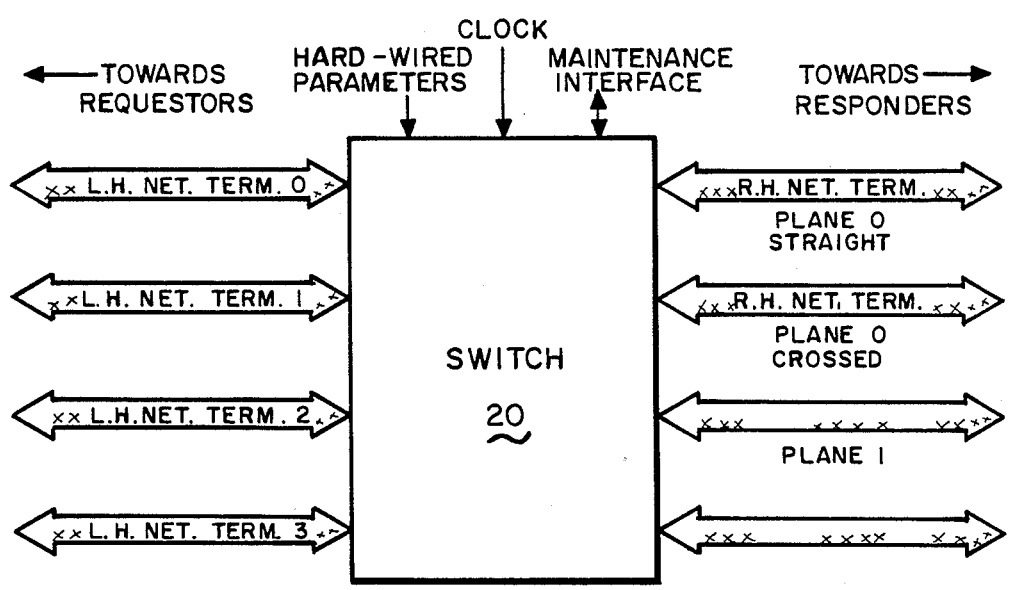
FIG. 7 is a block diagram of a switching stage of the network.
Figure 2:
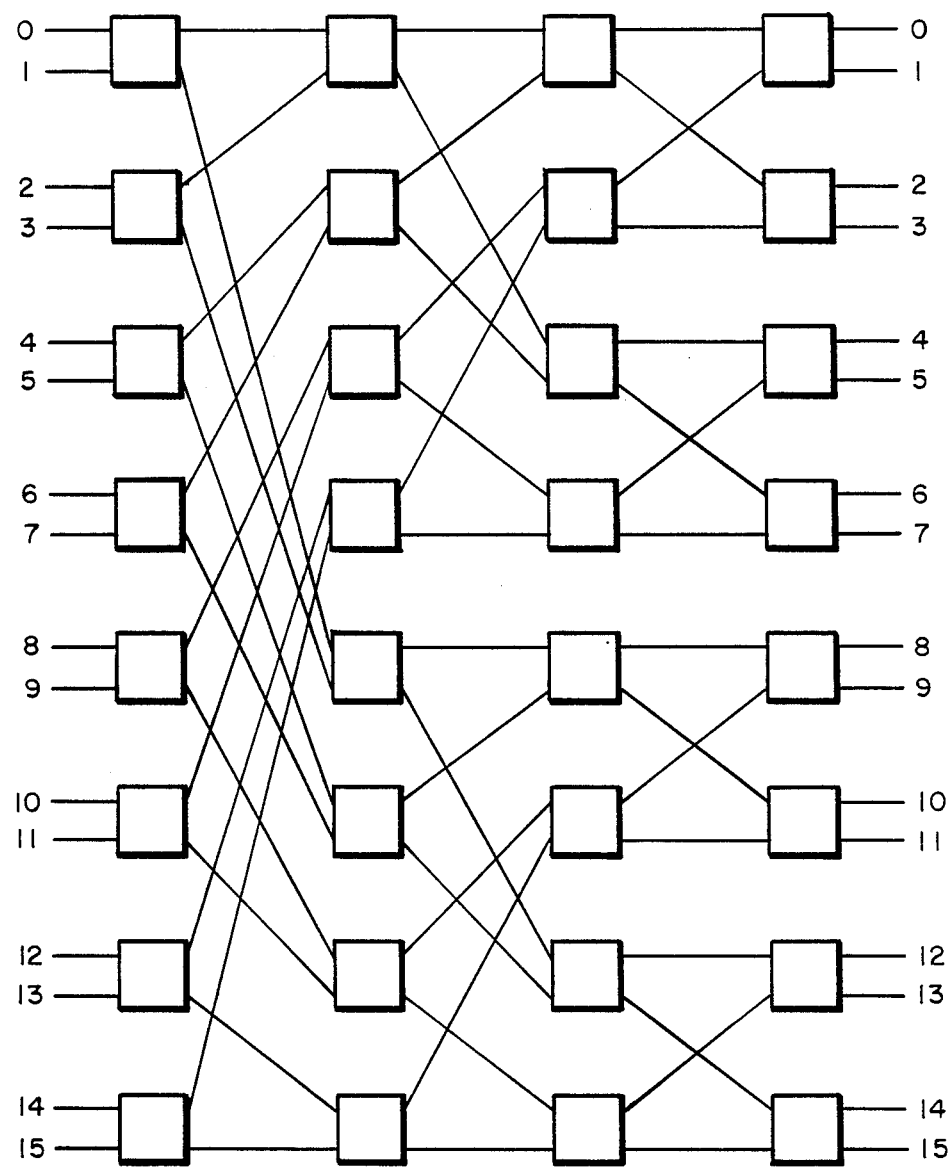
FIG. 2 is a block diagram of a prior art baseline network.
Figure 3:
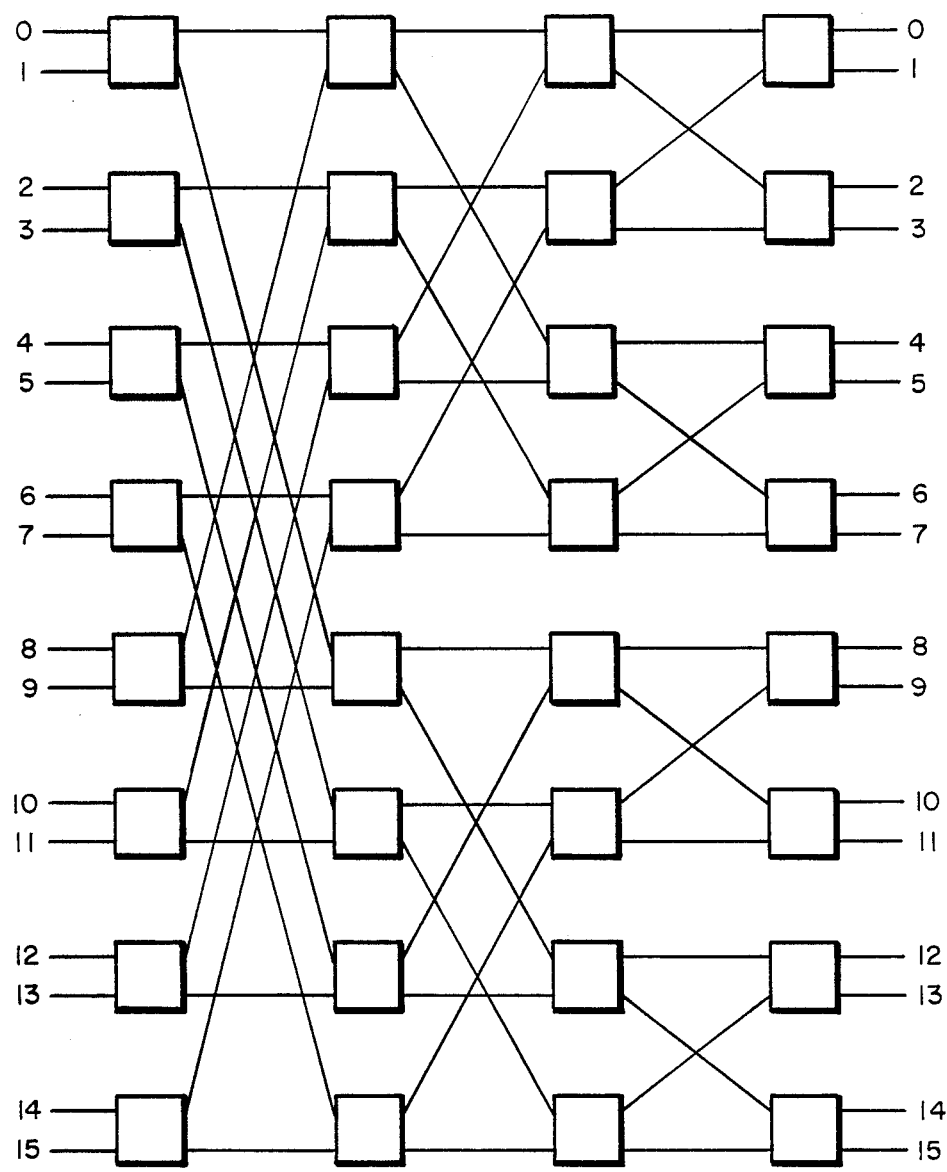
FIG. 3 is a block diagram of a prior art reverse Banyan network.
Figure 4:
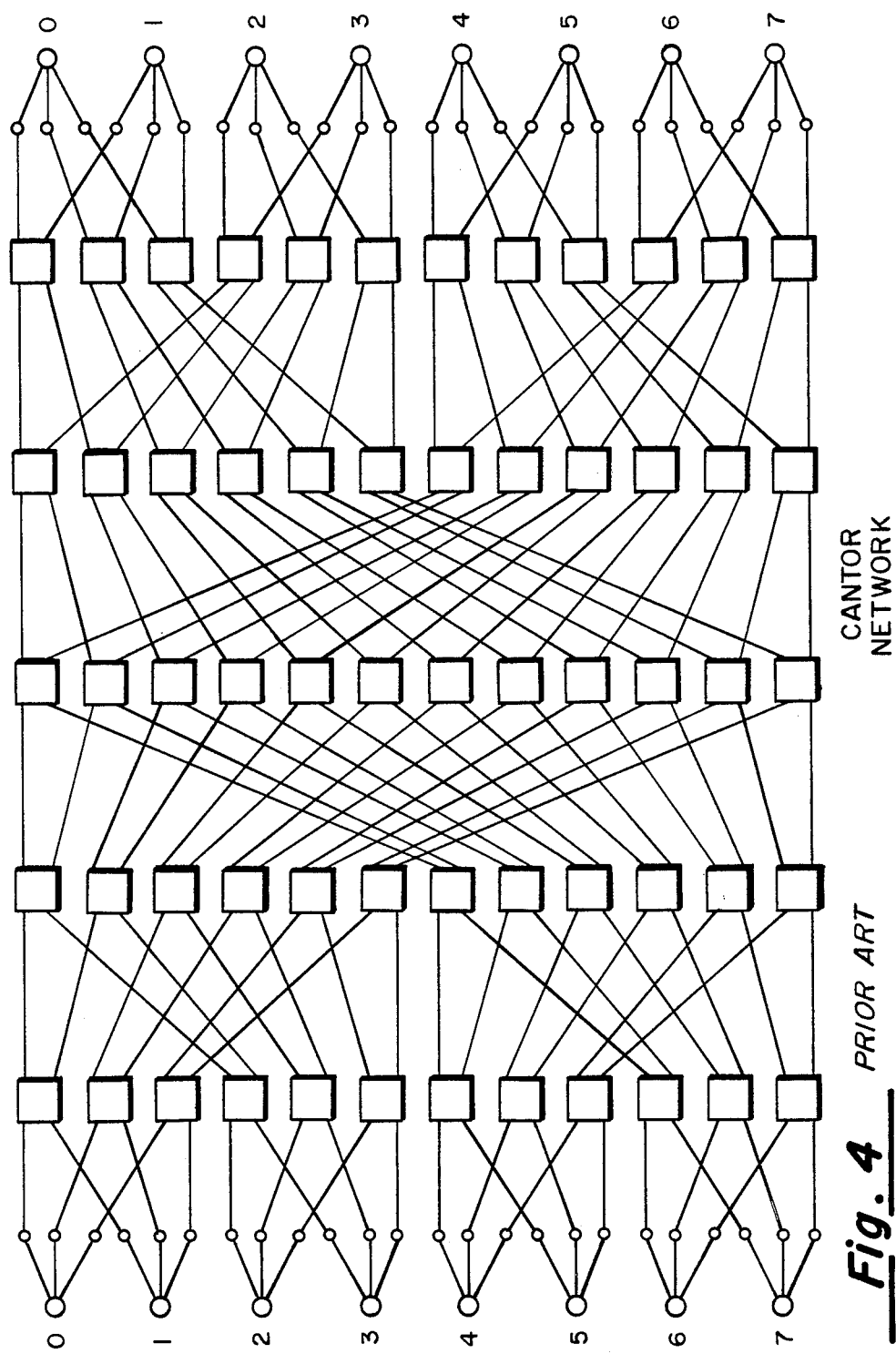
FIG. 4 is a block diagram of a prior art Cantor network.

The networks of FIGS. 5 and 6 are preferably composed of identical switches (FIG. 7). Each switch chip forms a self-setting gate that routes requests and responses between four parallel ports on each side of the switch. A processing node issues a request which is routed to the node that contains the desired memory location. The node then fetches the desired word from memory, and the response is relayed back through the network following the same path as the original request. Requests and responses are pipelined through the network allowing a new request to be issued from every node every 150 ns, with a network clock period of 25 ns, the same period as the node clock.

Each network switch may be constructed as a single, 30K gate, CMOS, VHSIC-scale chip. Each request may take three, 25 ns clock cycles to propagate through each switch on both the forward and the response paths. The chip can then be used to interconnect systems with up to 1024 processors without modification. The chip is easily modified to handle more than 1024 processors. The switch may incorporate error detection and failure avoidance to enhance system availability.

The network consists of identical 4 by 4 self-setting switches. The network has two types of input/output terminals: Request and response. Each processing node in the system has one of each. When a processor wishes to access remote memory it issues a four cycle "Request" on its Request terminal. The first two cycles contain node and memory address, while the second 2 cycles hold a swap or fetch-and-add parameter. The request is transformed across the network to the addressed node's Response terminal. The addressed node fetches the desired memory location, and the data is relayed back through the network to the original request port. The fetch-and-add and swap operations require the receiving node to write after reading to modify the memory cell indivisibly. The Request and Response terminals are administered by a Network Interface Chip in every node. The Network Interface Chip initiates requests, fetches responses, and modifies the fetch memory location appropriately.

A two-layered network has an advantage over a fully-layered network for some applications because the two-layered version provides a robust set of possible connections and currently can be constructed with the VHSIC-scale 1.25 micron and packaging technology available. The network for 64 processing nodes may consist of 448 identical CMOS chips arranged in seven stages of 64 chips each. The switch implements the functionality required for Layered Networks with two planes and the number of processing nodes, N, equal to a power of two up to 1024. A switch occupies a single VLSI chip. The switch has four "inputs" toward the requesters, and four "outputs" toward the responders. Each input and output consists of a sixteen bit bidirectional, parallel path augmented with appropriate control signals. The switches route requests and responses to those requests in pipelined waves through the network.

Each switch receives requests on its left-hand terminals, it then calculates its switch setting and parameter modifications, transmits the requests on the appropriate right-hand terminals, records the response switch setting and appropriate fetch-and-add (or "fetch-and-op) or swap parameters. Finally, upon receipt of the responses on the right-hand terminals, it recalls the switch setting and parameters to transmit the possibly modified responses on the appropriate left-hand terminals.

Switches are set in parallel using only information contained in the requests a particular switch handles. Up to four requests may simultaneously arrive at any particular switch. Each request is checked against its error code and any requests in error are not relayed. If two or more requests have the same destination processing node, memory address and operation, they are combined. Fetch-and-add requests are combined by adding the parameters. Swap requests are combined by choosing one of the parameters and passing it on. In all other circumstances where the destination nodes match, but the operations or memory address don't match, one request takes precedence over the others. Once the switch setting is determined, the requests are transmitted to the next stage of switches. Because the switch settings are stored during request routing, the responses follow the same path through the network, but in the opposite direction, by recalling the original setting.

Layered Networks may provide two operations, fetch-and-add and swap, to facilitate coordination of concurrent activity. The fetch-and-add operation can be used to manage the queues used for job scheduling and data flow buffers. The swap operation allows modification of pointers used for dynamic data structures. The fetch-and-add operation allows many processors to "read then add" the same memory location simultaneously and receive responses as if the operations had occurred in some sequential order. Fetch-and-add allows a job queue pointer to be referenced simultaneously by several users and provides each processor with a different job pointer. The swap operation allows manipulation of pointers used in dynamic, shared, data structures.

The fetch-and-add operation returns the value of the designated memory location, but increments the value left in the memory by adding the fetch-and-add parameter to it. If the memory location is used as a queue pointer, each fetch-and-add reference will return a different value. The network allows any or all processing nodes to access the same memory location simultaneously with the fetch-and-add operation and each node gets distinct values returned as if the fetch-and-add operations had occurred in some sequential order. This property allows many processors to access the job queue simultaneously, and, therefore, keep all processors busy with minimal overhead. Similarly, many reader-many writer data flow queues may be accessed simultaneously by several processing nodes. A simple read of memory is accomplished by a fetch-and-add operation with a parameter of zero.

The swap operation returns the value of the designated memory location, but replaces the value in memory with the swap parameter. The swap operation is intended for manipulation of pointers. For example, insertion of a record into a singly-linked list would perform a swap operation on the pointer of the record after which the new record will be inserted. The swap parameter would be the pointer to the new record, and the returned value would be written to the pointer in the new record to continue the list. Swap operations are combined in the network to allow any or all processing nodes to swap the same memory location simultaneously and get returned values as if the swap operations had occurred in some sequential order. Swap operation combining allows any number of processing nodes to insert new records into the same list, simultaneously.

SWITCH OPERATION OVERVIEW

As shown in FIG. 7, the network switch has four left-hand terminals toward the Requesters, four right-hand terminals toward the Responders, several hard-wired parameters, several clocks, and a maintenance interface. Requests are received on left-hand terminals and are routed to right-hand terminals with appropriate modifications to request parameters. Responses are received on right-hand terminals and are routed to left-hand terminals with modifications using stored information about the original request routing.

Requests contain the information used for switch setting. Requests may be combined, deferred, or switched according to their node address, memory address, and request type. Responses contain the possibly modified word stored in the addressed memory location by the associated request. Responses may be modified if their associated requests were combined. Stored response parameters, calculated from request parameters, are added to the responses if the requests were combined. In addition, a response may be split into two or more responses if the associated requests were combined into one.

Fetch-and-Modify operations, such as Fetch-on, Fetch-And, Fetch-Multiply may be used along with swap operations so that parameters may be modified depending on their associated requests. Parameter modification when requests are combined supports the apparent serialization of simultaneous operations necessary for coordination of concurrent processing.

The left and right-hand switch terminals of the switch 20 are composed of four groups of wires. Each group of wires contains: 16 data wires, two error code wires, and three control wires. The wires are all used bidirectionally. The left-hand switch terminals receive requests and transmit responses. Requests are driven in four clock cycles: The first two cycles contain node destination and memory address information; the second two cycles contain the fetch-and-add or swap parameters. Responses are driven in the opposite direction on the same wires in two more cycles. Every switch in the network performs each of these six exchanges in parallel. Therefore, new requests may be issued from the network interface from any or all processing nodes every six clock cycles.

Each of the four left-hand terminals and four right-hand terminals shown in FIG. 7 consist of 21 bidirectional lines: 16 data, two check code, and three transaction type. Fifteen chip pins are used for hard-wired parameters: four for each of the two Bit Pick choices, two for the appropriate address bits of this chip and five for Slider offset. The chip pins may be replaced by configuration registers set upon system initialization. Seven clocks are used by the chip: a 40 MHz system clock, and six transaction phase clocks which coordinate the six system clock cycle routing of data. The seven clocks may be replaced by two: a 40 MHz system clock and a synchronizing clock for deriving the six phases.

Node and memory addresses for a request are transferred from the right-hand network terminals of one switch to the left-hand network terminals of a switch in the next stage when the two receive-request clocks are active. Parameters for the request, (either fetch-and-add or swap), are transferred on the next system cycles in the same direction when the two receive-parameter clocks are active. Finally, responses to requests are transferred in the opposite direction, back to the requesters, when the two send-response clocks are active. The six transaction clocks ensure orderly transfer of data between switches.

Although transactions are pipelined through the chip, it is easier to describe the three parts of a operation (three sets of two) individually rather than describe the actions of the switch when each of the transaction clocks is active. The switching of the request which contains node address, memory address, and request type, is described first. The information contained in the request is used to determine switching of the request, parameter, and eventual response. Second, the switching and possible modification of parameters is described. Lastly, the switching and possible modification of the response is described.

A switch may simultaneously receive up to four requests on its left-hand network terminals when the receive-request phases are active. The two 16-bit data fields are interpreted as 10-bits of node address and 22-bits of memory address. A request has a type of either fetch-and-add or swap. Requests with the same node address, memory address and type are combined into a single request. Since each node contains a single-port memory, only one memory address may be accessed at a time. Therefore, two, (or more), requests with the same node address, but different memory addresses cannot be combined, and, therefore, only one request is transferred to the next stage as the others are deferred. The rules for message combining or deferral are as follows:

1. Fetch-and-add combine all requests whose node and memory addresses are equal and their types are fetch-and-add.
2. Swap combine all requests whose node and memory addresses are equal and their types are swap.
3. When two (or more) requests have equal node addresses, but differing memory addresses, all but the request with the smallest memory address are deferred.
4. If one (or more) swap requests have the same node address as a fetch-and-add request, defer the fetch-and-add request.
5. Any request with a check code error on its data path or parity error on its type is automatically deferred.
6. If a choice still hasn't been made then take the request with the smaller left-hand terminal number.

When a request is combined with or deferred by another request, the combination or deferral is noted so that the eventual result switching can be determined.

All requests not deferred or combined into another are enabled for terminals claiming.

Before requests can claim a right-hand terminal, which terminals are helpful must be determined. The switch can place requests on either of two "planes" of connections to the next stage. Each of the planes of FIGS. 5 and 6 correspond to one bit of the node address of the request. The switch may place requests on a "straight" or "crossed" terminal on either plane. A straight terminal connects to the switch in the next stage that has the same switch-number. The crossed temrinals connect to a switch in the next stage that has the same switch-number, except for a single bit, the bit corresponding to the plane.

The bits corresponding to the planes are identified for the chip by two hard-wired 4-bit parameters. Those two bits are extracted from the node address of each request. The bits are compared with two bits of the switch-number that are hard-wired. If the extracted bit of a request differs from the corresponding hard-strapped bit, the crossed terminal on that plane will bring the request closer to the addressed node. Whether either of the crossed terminals are helpful is used to claim the right-hand terminals.

For each enabled request, a different right-hand terminal is claimed based upon which, (if any), crossed terminals are helpful. A special logic structure has been invented to perform all claims simultaneously. The rules for terminal claiming are as follows:
1. Prefer to claim crossed terminals over straight, plane 1 over plane 0.
2. Do not claim any terminals connected to failed switches as indicated by the error control section.
3. If all else is equal then requests on lower numbered left-hand terminals have priority.
4. If desired crossed terminals are claimed, use available straight terminal. If no straight terminals available, use a crossed terminal even if not helpful preferring plane 0.

Once the right-hand terminals have been claimed, the switch setting must be determined. A set of four adder trees are used for routing and combining. Each adder tree can select to add any or all of the four data fields of the four requests. When the requests are switched, the adder trees act like simple selectors. Each tree is associated with one of the right-hand terminals. Each tree selects the request that claimed its right-hand terminal and adds zero to it. Finally, the requests are transmitted on the right-hand terminal to the next stage.

The request parameters following each request when the receive-parameter phases are active, are routed somewhat differently. The right-hand terminal to be used has already been determined. However, the parameters may be added if two or more requests were combined. The parameters of all fetch-and-add combined requests are added to form the parameter for the combined request. The parameter from the lowest numbered left-hand terminal is selected when requests are swap combined.

In addition to request and parameter routing, the adder trees are also used to compute response parameters to be used when the response is received. The response to a fetch-and-add request that was combined in the switch must be modified so that each combined request gets data as if the requests occurred sequentially. The stored parameters will be added to the response during response routing. The parameter is the sum of all the fetch-and-add combined request parameters coming from lower numbered left-hand terminals.

When swap requests are combined, one of the parameters is sent on while the others are saved. Upon receipt of the response, the response is sent unmodified for one of the requests while the others take the request parameter of one of the other swap combined requests. The swap parameter for each combined request is the parameter of the request coming from the next largest left-hand terminal, or zero if this is the largest.

After passding through $\log_b N + 1$ switches, the requests and their parameters reach the desired node. The memory location is fetched and the value is returned on the network as a response. Responses are transferred from left-hand terminals to right-hand terminals of the previous stage when the send-response is active. Each switch retains a parameter and response switch setting in a ram file configured to behave like a shift-register. A ram file, called Slider, uses a parameter called Stage-Delay to determine the length of the apparent shift register. This value is hard-wired to be approximately the number of stages to the right-hand side of the network. (See section 7.c. of the switch chip specification section of this paper for the exact formula.) The Slider automatically presents the required parameters and response switch setting when the responses are latched into the switch from its right-hand terminals.

The response switch setting and response parameter calculated during the request routing and stored in Slider vary according to whether the requests were combined, deferred, or switched unmodified. The response switch setting selects one of the response data words or zero to be added to the stored parameter. In addition, the type associated with the response is selected, or substituted with a type indicating the request was deferred. The rules governing response switch setting are as follows:
1. Uncombined, undeferred requests select the terminal that the request was routed to for response data word and type. The response parameter to be added is zero.
2. Fetch-and-add combined requests select the terminal that the combined request was routed to for response data and type. The response parameter to be added is the sum of all combined requests coming from lower-numbered left-hand terminals.
3. Swap combined requests select the terminal that the combined request was routed to for type only. The request coming from the highest-numbered left-hand terminal selects the response data word and adds a zero response parameter.

All others select zero to be added to the response parameter which is the stored response parameter from the next highest-numbered left-hand terminal.
4. Deferred requests select zero to be added to a zero selection parameter and force a "network conflict" type to be returned.

The possible modified request types and data word are transmitted from the left-hand terminals when the send-response phases are active.

In summary, the Network Switch routes requests and responses through the switch in six 25 ns clock cycles. The switch combines fetch-and-add or swap requests, and splits the response. Request combining allows many processing nodes to fetch-and-add or swap the same memory location and receive responses as if each of the requests had occurred sequentially. Most importantly, the network latency is low since the requests and responses require only three clock cycles to traverse each switch in each direction and the throughput is high because the requests and responses are pipelined through the network, a new request can be issued from every processing node every 150 ns.

COMBINABLE REQUESTS

A key feature of the Layered Network interconnect is its ability to combine compatible requests into combined requests that can be satisfied en masse at the responding node, in the same network transmission time as for individual requests. The simplest example of this effect is the broadcast read, where several processors happen to simultaneously request a read of the same memory cell. Each switch involved in the broadcast combines two or more such requests into a single request to be sent on, and remembers the occurrence of the coincidence. When the read data returns, the switch copies it to each of the original incoming requests.

The same principle can be applied to more complex requests. The essential requirement is that the request be combinable in any order, and the combination be representable in a single request. Given such requests, they may be applied to shared memory locations without time consuming conflicts in either the network or the node that contains the memory location. Programs that reference such locations must be prepared to deal with them occurring in any order, which is the essence of multitasking. In turn, the network and node memory assure that there is an equivalent serial order, that is, some serial order of the operations that would cause the same resulting values in the memory cell and all of the tasks.

Request combinations can be easily defined for memory reads and writes. The class of arithmetic and logical operations called "fetch-and-op" has been described in the literature. [See "Issues Related to MIMD Shared-Memory Computers: The NYU Ultracomputer Approach, The 12th Annual Symposium on Computer Architecture," 1985, p. 126] It defines operations in which the memory cell contents are modified by an associative operation such as ADD or AND. The value of the memory cell before modification is returned to the requester. The swap operation replaces the memory cell contents with the request's supplied data, returning the memory cell's original contents. This operation is not associative, though it is straightforward for the network to guarantee an equivalent serial order for combined requests. Nonassociativity means that the software using the swap operations must be prepared to deal with the possible different orderings.

Motivation for the combinable requests comes from the problem of sharing variables among tasks in a high order language (HOL). If there are to be many, perhaps thousands, of tasks trying to simultaneously access a shared variable, they cannot occur sequentially without a disastrous effect on performance. Thus, we observe that all shared variables should only be referenced with combinable operations.

Latency and throughput are critical requirements of a concurrent system. Since a new request can be issued every six clock cycles or 150 ns, 6.6 million, requests can be issued and responses received by each node every second. For a 64-node system, the network can transport 53 billion bits per second (40 MHz*64 nodes*21 bits per port). Although the throughput of the network grows linearly with the number of processors, the network latency grows logarithmically with added nodes. The latency of a message, (the time from request issue to response receipt), is the sum of the request routing, memory access, and response returning. A 64-processor system would have seven, (log N+1) columns of switches, each column imposing one network of delay (six clock cycles total) for request and response routing.

If the memory fetch can be made in 150 ns, the total latency for a 64 processing node system (two passes through the network plus memory access) would be 1200 ns. The excellent latency and throughput provided by the network allows the high-speed communication required to effectively utilize the processing power gained by adding processors.

The following chip specification for the Layered Network sets forth pin connections, formatting, timing and the manner in which requests are combined, decombined and routed (for example, by use of fetch-and-add and swap operations).

SWITCH CHIP SPECIFICATION FOR THE LAYERED NETWORK

1. I-O pin list summary
  A. Data
  B. Check bits
  C. Command type
  D. CLOCK (300)
  E. Hardwired control
  F. RESET (611)
  G. Power, Ground
  H. Maintenance port (testing), Error reporting (637)
2. Request format
3. Response format
4. Type format
5. Handshake format
6. CLOCK format
7. Hardwired control pins
  A. EFPL0 (330), EFPL1 (331)
  B. DIGIT0 (332), DIGIT1 (333)
  C. STAGE DELAY (610)
8. RESET (611)
9. Power pin requirements
10. Maintenance port (testing)-Error reporting
11. Functions
  A. Combining requests, Decombining responses
  B. Routing requests
  C. Storing the return path and stored response parameters
  D. Error detection
12. 32 node example for the hardwired control pin settings.

1. I-O pin list summary

The total pin count is: 213 including power and ground.

There are 8 sets of 21 bit terminals. There are 4 sets on the left for connecting to the previous stage of the network and 4 sets on the right for connecting to the next stage in the network.

A. Data. 16 bits per terminal, 128 total. Pin type: I-O.

The data lines are used to send and receive address, parameter and response data.

Read as Left Hand Network Data terminal 0, bits 0 to 15.

LHNTDT0[0 ... 15] (307A)
LHNTDT1[0 ... 15] (307B)
LHNTDT2[0 ... 15] (307C)
LHNTDT3[0 ... 15] (307D)

Read as Right Hand Network Data terminal 0, bits 0 to 15.

RHNTDT0[0 . . . 15] (546A) (Represents plane 0 straight)
RHNTDT1[0 . . . 15] (546B) (Represents plane 0 crossed)
RHNTDT2[0 . . . 15] (546C) (Represents plane 1 straight)
RHNTDT3[0 . . . 15] (546D) (Represents plane 1 crossed)

B. Check bits. 2 bits per terminal, 16 total. Pin type: I-O. The check bits represent their respective data ports MOD 3.

Read as Left Hand Network check Code terminal 0, bits 0, 1.
LHNTCC0[0 . . . 1] (308A)
LHNTCC1[0 . . . 1] (308B)
LHNTCC2[0 . . . 1] (308C)
LHNTCC3[0 . . . 1] (308D)

Read as Right Hand Network Check Code terminal 0, bits 0, 1.
RHNTCC0[0 . . . 1] (547A) (Represents plane 0 straight)
RHNTCC1[0 . . . 1] (547B) (Represents plane 0 crossed)
RHNTCC2[0 . . . 1] (547C) (Represents plane 1 straight)
RHNTCC3[0 . . . 1] (547D) (Represents plane 1 crossed)

C. Command type. 3 bits per terminal, 24 total. Pin type: I-O.

The command type consists of 2 bits of command type and one bit of odd parity. Bit 2 is the parity bit. The type bits are used to control the request type, for handshaking between stages of the network and for error codes when an error occurs in the network.

Read as Left Hand Network Type terminal 0, bits 0, 1, 2.
LHNTTY0[0 . . . 2] (309A)
LHNTTY1[0 . . . 2] (309B)
LHNTTY2[0 . . . 2] (309C)
LHNTTY3[0 . . . 2] (309D)

Read as Right Hand Network Type terminal 0, bits 0, 1, 2.
RHNTTY0[0 . . . 2] (548A) (Represents plane 0 straight)
RHNTTY1[0 . . . 2] (548B) (Represents a plane 0 crossed)
RHNTTY2[0 . . . 2] (548C) (Represents plane 1 straight)
RHNTTY3[0 . . . 2] (548D) (Represents plane 1 crossed)

D. CLOCK. There are 7 clocks. Pin type: Input.
CLOCK (300) (Network system clock)
RCV_REQ_A (301) (Receive request-first half)
RCV_REQ_B (302) (Receive request-second half)
RCV_PARAM_A (303) (Receive parameter-first half)
RCV_PARAM_B (304) (Receive parameter-second half)
SND_RESP_A (305) (Send response-first half)
SND_RESP_B (306) (Send response-second half)

E. Hardwired control. There are 15 control pins. Pin type: Input.

The control pins tell the switch where it is in the network.
DIGIT0 (332) Effective plane'th bit of the switch number,
DIGIT1 (333) Effective plane'th bit of the switch number,
EFPL0[0..3] (330) Effective plane for plane 0,
EFPL1[0..3] (331) Effective plane for plane 1,
STAGE_DELAY[0..4] (610) Write, Read counter offset for the slider.

F. RESET (611). 1 reset pin. Pin type: input.

G. Power Ground. 12 or more total. Pin type: power pad.

H. Maintenance port (testing)-Error reporting (637). 10 pins.

2. Request format.

The request from the originating node needs to be split into 4 parts. The switch chip samples the lines on the negative edge of the controlling clock phase (RCV_REQ_A (301), etc.). The left hand terminals of the switch chip need to see:

| | | |
|---|---|---|
| RCV_REQ_A (301): | | |
| NODE ADRS | 10 | bits [6 . . . 15] of the terminal |
| MEMORY ADRS | 6 | (most significant bits of the memory address) bits [0 . . . 5] of the terminal |
| TYPE | 3 | |
| CHECK | 2 | |
| RCV_REQ_B: (302) | | |
| MEMORY ADRS | 16 | (least significant bits) |
| TYPE | 3 | |
| CHECK | 2 | |
| RCV_PARAM_A (303): | | |
| PARAMETER | 16 | (least significant bits) |
| HANDSHAKE | 3 | |
| CHECK | 2 | |
| RCV_PARAM_B (304): | | |
| PARAMETER | 16 | (most significant bits) |
| HANDSHAKE | 3 | |
| CHECK | 2 | |

Notice that the request has the most significant half first (RCV_REQ_A, 301) and the parameter has the least significant half first (RCV_PARAM_A, 303). The request needs the most significant half first in order to do proper routing. The parameter needs the least significant half first in order to do addition across the 2 halves.

The leading edge of the request takes 3 clock phases to get through each switch chip. So, the information will appear on the right hand terminals during the following times:

| | | |
|---|---|---|
| RCV_PARAM_B (304): | | |
| NODE ADRS | 10 | bits [6 . . . 15] of the terminal |
| MEMORY ADRS | 6 | (most significant bits of the memory address) bits [0 . . . 5] of the terminal |
| TYPE | 3 | |
| CHECK | 2 | |
| SND_RESP_A (305): | | |
| MEMORY ADRS | 16 | (least significant bits) |
| TYPE | 3 | |
| CHECK | 2 | |
| SND_RESP_B (306): | | |
| PARAMETER | 16 | (least significant bits) |
| HANDSHAKE | 3 | |
| CHECK | 2 | |
| RCV_REQ_A (301): | | |
| PARAMETER | 16 | (most significant bits) |
| HANDSHAKE | 3 | |
| CHECK | 2 | |

Since the above phases do not match what the left hand terminal of the next stage expects to see the clock phases for each stage will have to be assigned differently. It turns out that every other stage will have the same phase assignments since there are 6 clock phases and it takes 3 phases to get through a chip. The following input pins that are on the same line must receive the same clock phase:

| Stage 0 | Stage 1 | Stage 2 | Stage 3 | Stage ... |
|---|---|---|---|---|
| RCV_REQ_A = | RCV_PARAM_B = | RCV_REQ_A = | RCV_PARAM_B = | ... |
| RCV_REQ_B = | SND_RESP_A = | RCV_REQ_B = | SND_RESP_A = | ... |
| RCV_PARAM_A = | SND_RESP_B = | RCV_PARAM_A = | SND_RESP_B = | ... |
| RCV_PARAM_B = | RCV_REQ_A = | RCV_PARAM_B = | RCV_REQ_A = | ... |
| SND_RESP_A = | RCV_REQ_B = | SND_RESP_A = | RCV_REQ_B = | ... |
| SND_RESP_B = | RCV_PARAM_A = | SND_RESP_B = | RCV_PARAM_A = | ... |

For example the input pin labeled RCV_REQ_A (301) for stage 0 must receive the same clock phase as the input pin labeled RCV_PARAM_B (304) for stage 1.

3. Response format.

The response is sent out from the left hand terminal to the previous stage during the following clock phases:

| SND_RESP_A (305): | |
|---|---|
| RESPONSE PARAM | 16 (least significant bits) |
| TYPE | 3 |
| CHECK | 2 |
| SND_RESP_B (306): | |
| RESPONSE PARAM | 16 (most significant bits) |
| TYPE | 3 |
| CHECK | 2 |

Since the clock phases of adjacent stages are assigned differently the right hand terminal will sample the response on the negative edge of the following phases:

| RCV_REQ_B (302): | |
|---|---|
| RESPONSE PARAM | 16 (least significant bits) |
| TYPE | 3 |
| CHECK | 2 |
| RCV_PARAM_A (303): | |
| RESPONSE PARAM | 16 (most significant bits) |
| TYPE | 3 |
| CHECK | 2 |

4. Command type.

The command type consists of 3 bits. The 2 least significant bits indicate the command type and the most significant bit is for odd parity. The types are:

bit: 210
1 (001) Fetch and Add
2 (010) Swap
4 (100) No request Network conflict

5. Handshake format.

Handshaking between stages occurs on the type lines (309A-D, 548A-D). The possible handshake states are:
4 (100) Request received
7 (111) Error detected The handshake is put out to the previous stage by the left hand terminals during RCV_PARAM_A (303) and RCV_PARAM_B (304) and is sampled from the next stage by the right hand terminals on the negative edge of SND_RESP_B (306) and RCV_REQ_A (301).

6. CLOCK format.

7. Hardwired control pins.
A. EFPL0 (330), EFPL1 (331).

The destination node address consists of 10 bits numbered 0 to 9. EFPL0 (330) is the effective plane for plane 0 and can take on any value from 0 to 9. EFPL0 (330) is the bit location in the node address that plane 0 is working on. Example: If plane 0 is switching based on the value of bit 6 in the node address then EFPL0 (330) would be wired as a 6. EFPL1 (331) is the same except that it is the effective plane for plane 1.

B. DIGIT0 (332), DIGIT1 (333).

In an N node network there are N rows of switches and $\log_2 N + 1$ columns. The row number (0..N−1) a switch appears in is also called the switch number. DIGIT0 (332) is bit EFPL0 (330) of the switch number. DIGIT1 (333) is bit EFPL1 (331) of the switch number. Example: If the switch number is 64 (00 0100 0000 binary) and EFPL0 (330): =6 then DIGIT0 (332): =1.

The way the above control inputs are used is that if DIGIT0 (332) does not match bit EFPL0 (330) of the destination node address then the request wants plane 0 crossed, otherwise it wants plane 0 straight. If DIGIT1 (333) does not match bit EFPL1 (331) of the destination node address then the request wants plane 1 crossed, otherwise it wants plane 1 straight. Wanting a cross connected terminal has priority over wanting a straight connected terminal.

C. STAGE_DELAY (610).

The STAGE_DELAY (610) pins are used to tell the switch chip how long to wait before expecting to see the response come back for the current request. There are $\log_2(N) + 1$ stages (columns) of switches in the network for N nodes.

STAGE_DELAY (610): $= 1 + (\log_2(N) - \text{stage}) + (\text{Memory\_access\_cycles} + \text{Other\_cycles} - 10)/6$ Where stage is the column number the switch is in in the network. Stage can take on values from 0 to $\log_2(N)$. The left hand side of the network (left most) is stage 0 and the right hand side (right most) is stage $\log_2(N)$. Memory_access_cycles is the number of network clocks a request needs for access to the same memory location. A new request comes along every 6 network clocks. Within those 6 network cycles the memory location must be read out, corrected for errors, a MOD 3 calculation done, modified according to fetch-add or swap, a new syndrome calculated and finally, written back to the same memory location. (An alternative is to

| 300 | CLOCK | 0101010101010101010101010101010101010101 |
| 301 | RCV_REQ_A | 0110000000001100000000001100000000000110 |
| 302 | RCV_REQ_B | 0001100000000011000000000011000000000001 |
| 303 | RCV_PARAM_A | 0000011000000000110000000001100000000000 |
| 304 | RCV_PARAM_B | 0000000110000000001100000000011000000000 |
| 305 | SND_RESP_A | 0000000001100000000011000000000110000000 |
| 306 | SND_RESP_B | 1000000000011000000000011000000000011000 | not do correction on the response, but just issue a memory error if an error occurrs. Then, correct the word read out and write the corrected version back to memory, skipping the modify process. The request would have to be resent later.) Memory_access_cycles must be less than or equal to 6 in order for the memory to finish the current request before the next request comes along. Other_cycles includes the time it takes to go both ways through any network interface chip and any other pipelining or delays. All Other_cycles must consist of a pipeline. Time is measured in network clock cycles. (Memory_access_cycles+Other_cycles) is the total time between the leading edge of the request leaving the right hand side of the network and the leading edge of the response coming back to the right hand side of the network. (Memory_access_cycles+Other_cycles) can ONLY take on the following values:

$$10, 16, 22, 28, 34, \ldots, 10+6*i \  i >= 0$$

If (Memory_access_cycles+Other_cycles) falls between two of the above values then delay stages need to be added to round up to the next higher value. Example: Let N: =32, Stage: =3, Memory_access_cycles: =6 (maximum value) and Other_cycles: =4 (The minimum value for other cycles is 4 since [Memory_access_cycles+Other_cycles] must be greater than or equal to 10.) Then:

STAGE_DELAY (610):
  $= 1 + (\log_2(32) - 3) + (6 + 4 - 10)/6$ $: = 1 + 2 + 0$ $: = 3$ 3 new requests will be sent out by switch stage 3 before the response for the current request comes back to switch stage 3.
The magnitude constraints on STAGE DELAY (610) are:

$$1 <= \text{STAGE\_DELAY (610)} <= 31$$

Note that 0 is not allowed. The chip will not function properly if STAGE_DELAY (610): =0 due to the way events are pipelined inside the chip.

8. RESET (611).

The RESET (611) pin must be brought HIGH and held HIGH while the Slider Reset Control (613) steps through the 32 RAM addresses. The RAM (RAM_LS 603, RAM_MS 606) in the Slider (103) must be initialized, therefore the RESET signal cannot be asynchronous with CLOCK.

9. Power pin requirements.

The calculation is based on one set of power, ground pads per 16 outputs. There are 168 I-O pins, but only half of them will act as an output at one time so 168/2/16: =5.25. Round up to 6 sets of power-ground pads.

10. Maintenance terminal (testing)-Error reporting (637).

Errors need to be reported to the rest of the world so that reconfiguration can take place in the case of failures isolating a node from the rest of the network. External LSSD and self test features are included.

11. Functions.
A. Combining requests-decombining responses.

Figure 1:
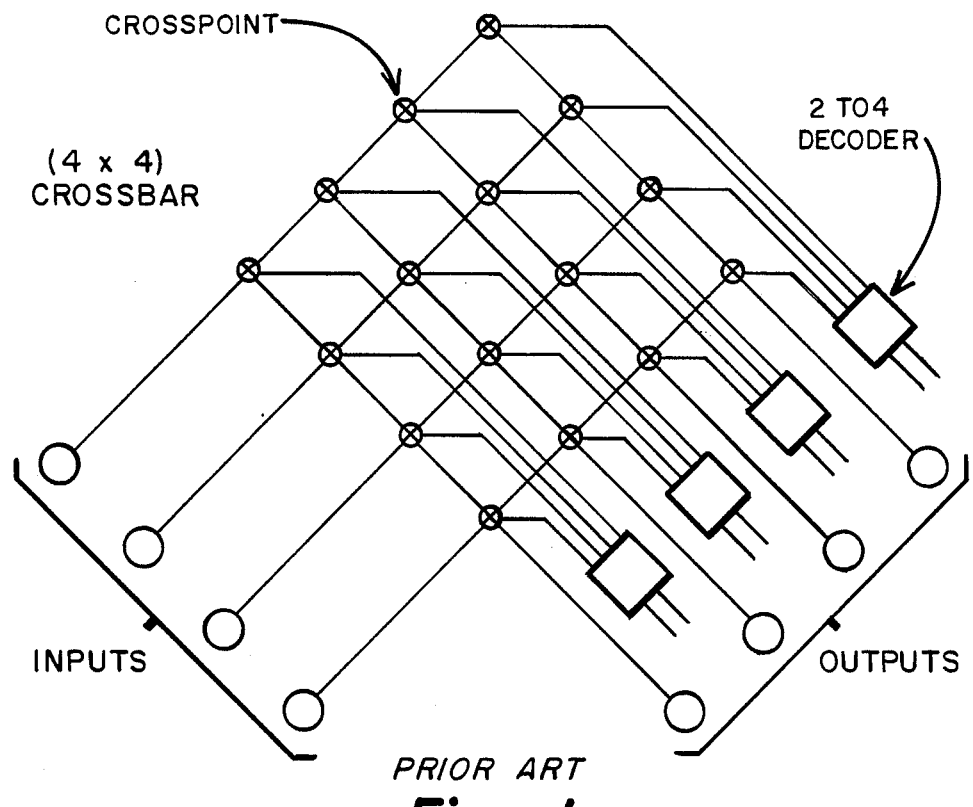
FIG. 1 is a block diagram of a prior art 4×4 crossbar switch network.
Figure 11A:
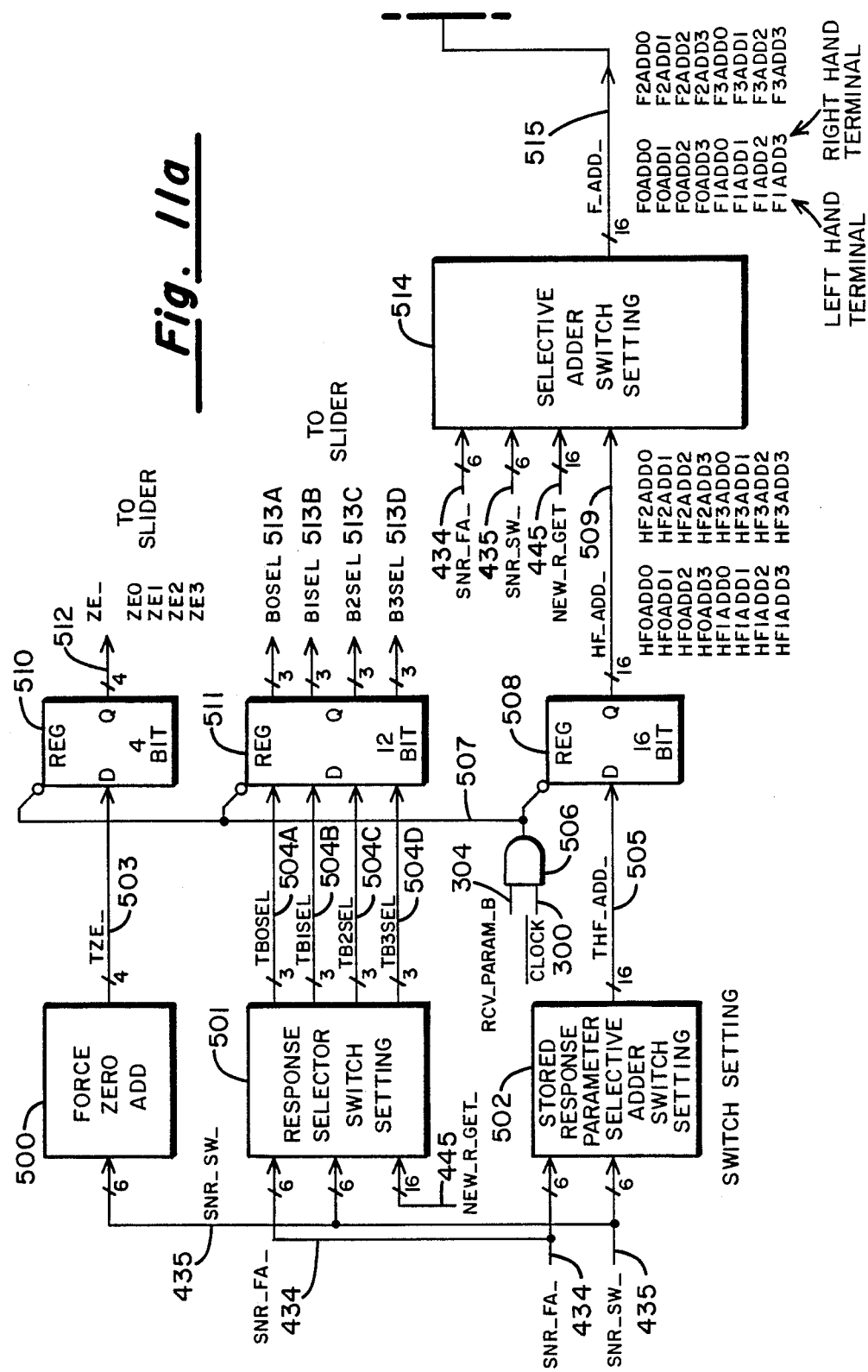
Figure 11B:
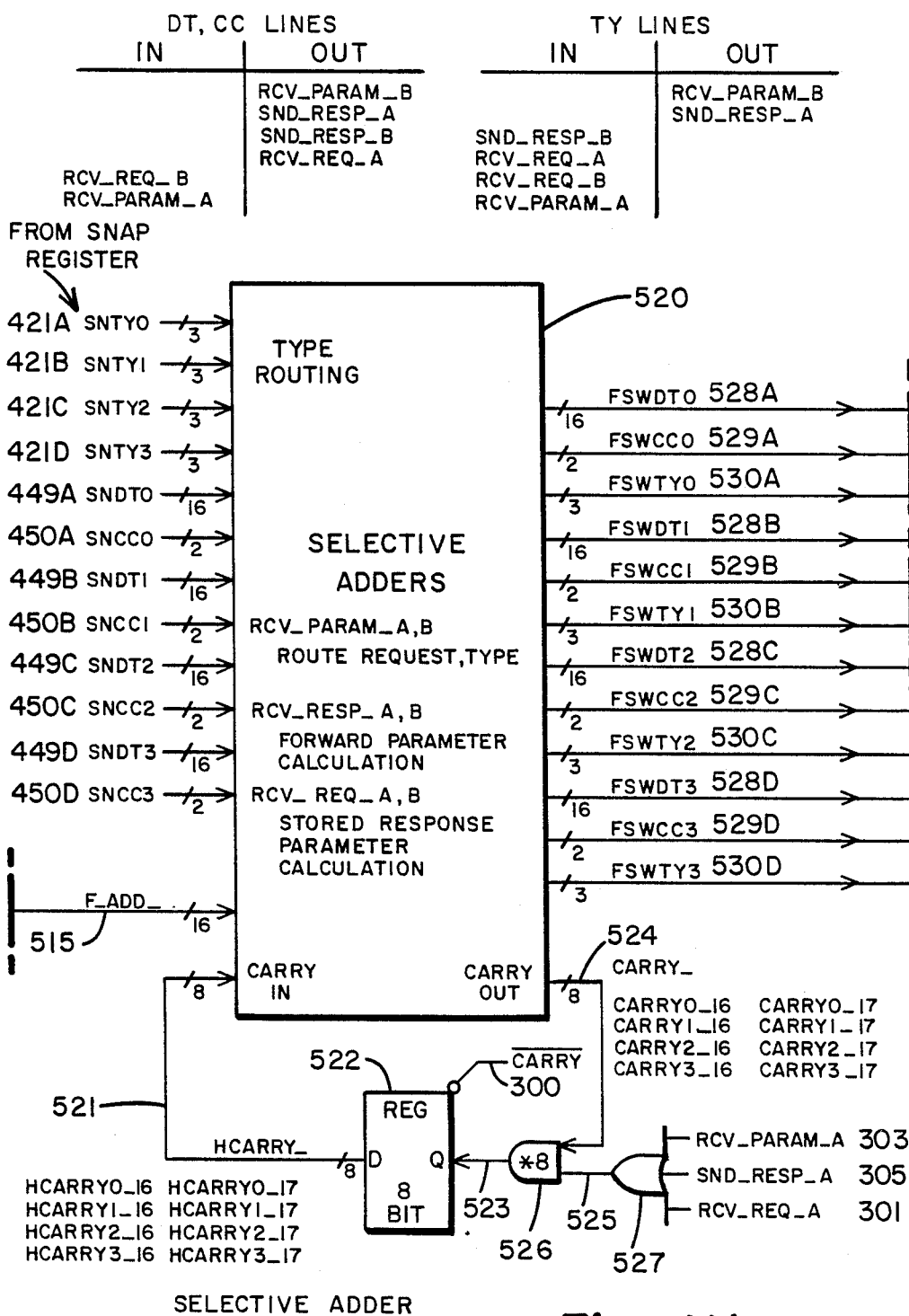
Figure 11C:
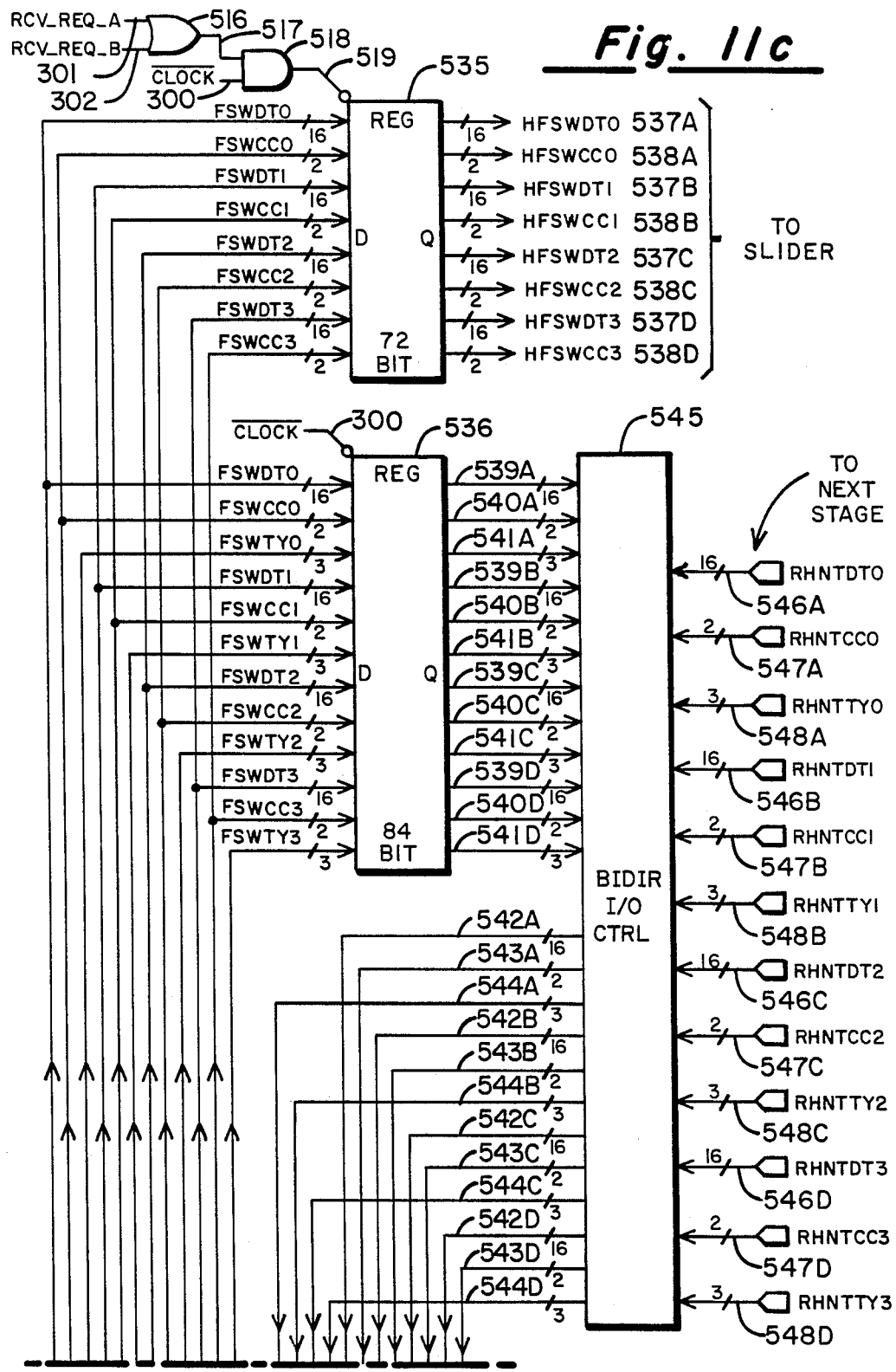

Requests that have the same destination node address, the same memory address, the same type, and have no check code errors in the request will be combined into one request. If the types are different then the Swap will be sent on and the Fetch_add will be aborted. If the memory addresses are different, but the node addresses are the same then the lower value memory address will be sent on and the higher valued memory address will be aborted. An example timing diagram in FIG. 11-1 shows 3 sets of requests. Time is measured in half network cycles. The hardwired parameters for the examples are:
  EFPL0 (330): =9
  EFPL1 (331): =0
  DIGIT0 (332): =0
  DIGIT1 (333): =0
  STAGE_DELAY (610): =1

The first set of requests during times 2 to 9 consists of 4 Fetch adds that go to the same destination node and memory address. They are (unless otherwise stated the numbers in these examples are in hexadecimal):
  FETCH_ADD(ADDRESS, PARAMETER)
  Request 0: FETCH_ADD(C000 0000, 000A AAAA)
  Request 1: FETCH_ADD(C000 0000, 000B BBBB)
  Request 2: FETCH_ADD(C000 0000, 000C CCCC)
  Request 3: FETCH_ADD(C000 0000, 000D DDDD)

The address and parameter have both been listed most significant half first to enhance readability. The parameter is sent out least significant half first in the timing diagram. The destination node address for the above requests is:
  11 0000 0000 (binary)
The memory address is 0.

The 4 requests are combined into one request and come out of right hand terminal 1 (plane 0 crossed) during times 8 to 15. The combined request is:

FETCH_ADD(C000 0000, 0031 110E)

where 0031 110E: =000A AAAA+000B BBBB+000C CCCC+000D DDDD The stored response parameters (for decombining the responses) are:
  Request 0: 0000 0000
  Request 1: 000A AAAA
  Request 2: 0016 6665:=000A AAAA+000B BBBB
  Request 3: 0023 3331:=000A AAAA+000B BBBB+000C CCCC The return path values (for reverse routing) are:
  Request 0: 1
  Request 1: 1
  Request 2: 1
  Request 3: 1

The response to the above request comes from the memory (or the next stage) during times 28 to 31 and consists of the parameter 000D FDDD. The new memory contents are:

003F 0EEB: =0031 110E+000D FDDD

The decombined responses are sent out to the previous stage from the left hand terminals during times 34 to 37. The responses are formed as follows:
  Response 0: 000D FDDD: =000D FDDD
  Response 1: 0018 A887: =000D FDDD+000A AAAA
  Response 2: 0024 6442: =000D FDDD+0016 6665
  Response 3: 0031 310E: =000D FDDD+0023 3331

It is as if the 4 requests had been processed sequentially in the order 0, 1, 2, 3.

The second set of requests during times 14 to 21 consists of 4 Swaps that go to the same destination node and memory address. They are:

SWAP(ADDRESS, PARAMETER)
Request 0: SWAP(C000 0000, 0000 AAAA)
Request 1: SWAP(C000 0000, 0000 BBBB)
Request 2: SWAP(C000 0000, 0000 CCCC)
Request 3: SWAP(C000, 0000, 0000 DDDD)

The 4 requests are combined into one request and come out of right hand terminal 1 (plane 0 crossed) during times 20 to 27. The combined request is:

SWAP(C000 0000, 0000 AAAA)

The stored response parameters (for decombining the responses) are:
Request 0: 0000 BBBB
Request 1: 0000 CCCC
Request 2: 0000 DDDD
Request 3: 0000 0000

The return path values (for reverse routing) are:
Request 0: 1
Request 1: 1
Request 2: 1
Request 3: 1

The response to the above request comes from the memory (or the next stage) during times 40 to 43 and consists of the parameter FFFD FDDD. The new memory contents are:

0000 AAAA

The decombined responses are sent out to the previous stage from the left hand terminals during times 46 to 49. The responses are formed as follows:
Response 0: 0000 BBBB
Response 1: 0000 CCCC
Response 2: 0000 DDDD
Response 3: FFFD FDDD It is as if the 4 requests were processed sequentially in the order 3, 2, 1, 0. The reason for the Swap sequential order to be different than the Fetch add order is that the logic is easier with the above orders. The actual ordering makes no difference since programs are not supposed to depend on the ordering of parallel events.

The third set of requests during times 26 to 33 consists of 2 Fetch_adds and 2 Swaps. They are:

FETCH_ADD(ADDRESS, PARAMETER)
Request 0: FETCH_ADD(0040 0001, A000 0000)
Request 1: FETCH_ADD(0040 0001, B000, 1111)
Request 2: SWAP(1040 0001, C000 2222)
Request 3: SWAP(1040 0001, D000 3333)

The destination node address for the 2 Fetch_adds is:

00 0000 0001 (binary)

The destination node address for the 2 Swaps is:

00 0100 0001 (binary)

The memory address is 1 in all 4 requests. The 2 Fetch_adds are combined into one request and come out of right hand terminal 3 (plane 1 crossed) during times 32 to 39. The combined request is:

FETCH_ADD(0040 0001, 5000 1111)

where 5000 1111: =A000 0000+B000 1111 truncated to 32 bits. Note that 2's complement overflow occurred during the addition of the 2 original parameters. The network does not currently detect overflow, but could if additional logic was added. The 2 Swaps are combined into one request and come out of right hand terminal 2 (plane 1 straight) during times 32 to 39. The combined request is:

SWAP(1040 0001, C000 2222)

The stored response parameters (for decombining the responses) are:
Request 0: 0000 0000
Request 1: A000 0000
Request 2: D000 3333
Request 3: 0000 0000

The return path values (for reverse routing) are:
Request 0: 3
Request 1: 3
Request 2: 2
Request 3: 2

The responses come back from the memory (or the next stage) during times 52 to 55. In this case the 2 responses come from 2 different memory banks since the destination node address is different for the Fetch_adds and for the Swaps. The Fetch_add response parameter is 3000 7777 on right hand terminal 3 (plane 1 crossed) and the Swap response parameter is 2000 6666 on right hand terminal 2 (plane 1 straight). The new memory contents for the Fetch_add location are:

8000 8888: =5000 1111+3000 7777 (2's complement overflow)

The new memory contents for the Swap are:

C000 2222

The decombined responses are sent out from the left hand terminals during times 58 to 61. The responses are formed as follows:

Response 0: 3000 7777
Response 1: D000 7777: =3000 7777+A000 0000
Response 2: D000 3333
Response 3: 2000 6666

It's as if the 2 Fetch_adds were processed sequentially in the order 0, 1 and the 2 Swaps were processed sequentially in the order 3, 2.

TABLE

Example Timing Diagram. All numbers are in hexadecimal.

| TIME | clock | rcv_req_a | rcv_req_b | rcv_param_a | rcv_param_b | rcv_pres_a | rcv_pres_b | reset | eff_p_0 | eff_p_1 | dig_t_0 | dig_t_1 | stage_status | in_tot_0 | in_cc_0 | in_tot_0 | in_ty_1 | in_cc_1 | in_tot_2 | in_ty_1 | in_cc_2 | in_tot_2 | in_ty_3 | in_cc_3 | in_tot_3 | in_ty_0 | in_cc_0 | in_t_1 | in_ty_1 | in_cc_1 | in_t_2 | in_ty_2 | in_cc_2 | in_t_3 | in_ty_3 |
|---|---|---|---|---|---|---|---|---|---|---|---|---|---|---|---|---|---|---|---|---|---|---|---|---|---|---|---|---|---|---|---|---|---|---|
| 0.000 | 0 | 0 | 0 | 0 | 0 | 0 | 0 | 1 | 9 | 0 | 0 | 0 | 01 | 0000 | 0 | 0000 | 0 | 0000 | 0 | 0000 | 0 | 0000 | 0 | 0000 | 0 | 0000 | 0 | 0000 | 0 | 0000 | 0 | 0000 | 0 | 0 |
| 1.000 | 1 | 0 | 0 | 0 | 0 | 0 | 0 | 1 | 9 | 0 | 0 | 0 | 01 | 0000 | 0 | 0000 | 0 | 0000 | 0 | 0000 | 0 | 0000 | 0 | 0000 | 0 | 0000 | 0 | 0000 | 0 | 0000 | 0 | 0000 | 0 | 0 |
| 2.000 | 0 | 1 | 0 | 0 | 0 | 0 | 0 | 0 | 9 | 0 | 0 | 0 | 01 | C000 | 0 | C000 | 0 | C000 | 1 | C000 | 1 | C000 | 0 | 0000 | 0 | 0000 | 0 | 0000 | 0 | 0000 | 0 | 0000 | 0 | 4 |
| 3.000 | 1 | 0 | 1 | 0 | 0 | 0 | 0 | 0 | 9 | 0 | 0 | 0 | 01 | C000 | 0 | C000 | 0 | C000 | 1 | C000 | 1 | C000 | 1 | 0000 | 0 | 0000 | 0 | 0000 | 0 | 0000 | 0 | 0000 | 0 | 4 |
| 4.000 | 0 | 0 | 0 | 1 | 0 | 0 | 0 | 0 | 9 | 0 | 0 | 0 | 01 | 0000 | 0 | 0000 | 1 | 0000 | 1 | 0000 | 1 | 0000 | 1 | 0000 | 0 | 0000 | 0 | 0000 | 0 | 0000 | 0 | 0000 | 0 | 4 |
| 5.000 | 1 | 0 | 0 | 0 | 1 | 0 | 0 | 0 | 9 | 0 | 0 | 0 | 01 | AAAA | 1 | BBBB | 2 | CCCC | 4 | DDDD | 4 | 0000 | 0 | 0000 | 0 | 0000 | 0 | 0000 | 0 | 0000 | 0 | 0000 | 0 | 4 |
| 6.000 | 0 | 0 | 0 | 0 | 0 | 1 | 0 | 0 | 9 | 0 | 0 | 0 | 01 | AAAA | 1 | BBBB | 2 | CCCC | 4 | DDDD | 4 | 0000 | 0 | 0000 | 0 | 0000 | 0 | 0000 | 0 | 0000 | 0 | 0000 | 0 | 4 |
| 7.000 | 1 | 0 | 0 | 0 | 0 | 0 | 1 | 0 | 9 | 0 | 0 | 0 | 01 | 000A | 1 | 000B | 2 | 000C | 4 | 000D | 4 | 0000 | 0 | 0000 | 0 | 0000 | 0 | 0000 | 0 | 0000 | 0 | 0000 | 0 | 4 |
| 8.000 | 0 | 0 | 0 | 0 | 0 | 0 | 0 | 0 | 9 | 0 | 0 | 0 | 01 | 0000 | 0 | 0000 | 0 | 0000 | 4 | 0000 | 4 | 0000 | 0 | 0000 | 0 | 0000 | 0 | 0000 | 0 | 0000 | 0 | 0000 | 0 | 4 |
| 9.000 | 1 | 0 | 0 | 0 | 0 | 0 | 0 | 0 | 9 | 0 | 0 | 0 | 01 | 0000 | 0 | 0000 | 0 | 0000 | 4 | 0000 | 4 | 110E | 1 | 0000 | 0 | 0000 | 0 | 0000 | 0 | 0000 | 0 | 0000 | 0 | 4 |
| 10.000 | 0 | 0 | 0 | 0 | 0 | 0 | 0 | 0 | 9 | 0 | 0 | 0 | 01 | 0000 | 0 | 0000 | 0 | 0000 | 4 | 0000 | 4 | 110E | 1 | 0000 | 0 | 0000 | 0 | 0000 | 0 | 0000 | 0 | 0000 | 0 | 4 |
| 11.000 | 1 | 0 | 0 | 0 | 0 | 0 | 0 | 0 | 9 | 0 | 0 | 0 | 01 | 0000 | 0 | 0000 | 0 | 0000 | 2 | 0000 | 2 | 9031 | 0 | 0000 | 0 | 0000 | 0 | 0000 | 0 | 0000 | 0 | 0000 | 0 | 4 |
| 12.000 | 0 | 0 | 0 | 0 | 0 | 0 | 0 | 0 | 9 | 0 | 0 | 0 | 01 | 0000 | 0 | 0000 | 0 | 0000 | 2 | 0000 | 2 | 0000 | 0 | 0000 | 0 | 0000 | 0 | 0000 | 0 | 0000 | 0 | 0000 | 0 | 4 |
| 13.000 | 1 | 0 | 0 | 0 | 0 | 0 | 0 | 0 | 9 | 0 | 0 | 0 | 01 | C000 | 1 | C000 | 2 | C000 | 2 | C000 | 2 | 0000 | 0 | 0000 | 0 | 0000 | 0 | 0000 | 0 | 0000 | 0 | 0000 | 0 | 4 |
| 14.000 | 0 | 0 | 0 | 0 | 0 | 0 | 0 | 0 | 9 | 0 | 0 | 0 | 01 | C000 | 1 | C000 | 2 | C000 | 2 | C000 | 2 | 0000 | 0 | 0000 | 0 | 0000 | 0 | 0000 | 0 | 0000 | 0 | 0000 | 0 | 4 |
| 15.000 | 1 | 0 | 0 | 0 | 0 | 0 | 0 | 0 | 9 | 0 | 0 | 0 | 01 | 0000 | 0 | 0000 | 2 | 0000 | 2 | 0000 | 2 | 0000 | 0 | 0000 | 0 | 0000 | 0 | 0000 | 0 | 0000 | 0 | 0000 | 0 | 4 |
| 16.000 | 0 | 0 | 0 | 0 | 0 | 0 | 0 | 0 | 9 | 0 | 0 | 0 | 01 | 0000 | 0 | 0000 | 2 | 0000 | 2 | 0000 | 2 | 0000 | 0 | 0000 | 0 | 0000 | 0 | 0000 | 0 | 0000 | 0 | 0000 | 0 | 4 |
| 17.000 | 1 | 0 | 0 | 0 | 0 | 0 | 0 | 0 | 9 | 0 | 0 | 0 | 01 | AAAA | 1 | BBBB | 2 | CCCC | 4 | DDDD | 4 | 0000 | 0 | 0000 | 0 | 0000 | 0 | 0000 | 0 | 0000 | 0 | 0000 | 0 | 4 |
| 18.000 | 0 | 0 | 0 | 0 | 0 | 0 | 0 | 0 | 9 | 0 | 0 | 0 | 01 | AAAA | 1 | BBBB | 2 | CCCC | 4 | DDDD | 4 | 0000 | 0 | 0000 | 0 | 0000 | 0 | 0000 | 0 | 0000 | 0 | 0000 | 0 | 4 |
| 19.000 | 1 | 0 | 0 | 0 | 0 | 0 | 0 | 0 | 9 | 0 | 0 | 0 | 01 | 0000 | 0 | 0000 | 0 | 0000 | 4 | 0000 | 4 | 0000 | 0 | 0000 | 0 | 0000 | 0 | 0000 | 0 | 0000 | 0 | 0000 | 0 | 4 |
| 20.000 | 0 | 0 | 0 | 0 | 0 | 0 | 0 | 0 | 9 | 0 | 0 | 0 | 01 | 0000 | 0 | 0000 | 0 | 0000 | 4 | 0000 | 4 | 0000 | 0 | 0000 | 0 | 0000 | 0 | 0000 | 0 | 0000 | 0 | 0000 | 0 | 4 |
| 21.000 | 1 | 0 | 0 | 0 | 0 | 0 | 0 | 0 | 9 | 0 | 0 | 0 | 01 | 0000 | 0 | 0000 | 0 | 0000 | 4 | 0000 | 4 | 3000 | 1 | AAAA | 1 | 0000 | 0 | 0000 | 0 | 0000 | 1 | 0040 | 0 | 4 |
| 22.000 | 0 | 0 | 0 | 0 | 0 | 0 | 0 | 0 | 9 | 0 | 0 | 0 | 01 | 0000 | 0 | 0000 | 0 | 0000 | 4 | 0000 | 4 | AAAA | 1 | AAAA | 1 | 0000 | 0 | 0000 | 0 | 0000 | 1 | 0040 | 1 | 4 |
| 23.000 | 1 | 0 | 0 | 0 | 0 | 0 | 0 | 0 | 9 | 0 | 0 | 0 | 01 | 0040 | 1 | 0040 | 1 | 0040 | 1 | 1040 | 1 | 0000 | 0 | FDDD | 0 | 0000 | 0 | 0000 | 0 | 0000 | 1 | 0040 | 1 | 4 |
| 24.000 | 0 | 0 | 0 | 0 | 0 | 0 | 0 | 0 | 9 | 0 | 0 | 0 | 01 | 0040 | 1 | 0040 | 1 | 0040 | 1 | 1040 | 1 | FDDD | 1 | FDDD | 1 | 0000 | 0 | 0000 | 0 | 0000 | 1 | 0040 | 1 | 1 |
| 25.000 | 1 | 0 | 0 | 0 | 0 | 0 | 0 | 0 | 9 | 0 | 0 | 0 | 01 | 0001 | 1 | 0001 | 4 | 0001 | 4 | 0001 | 4 | 000D | 0 | 000D | 0 | 0000 | 0 | 0000 | 0 | 0000 | 4 | 0001 | 1 | 1 |
| 26.000 | 0 | 0 | 0 | 0 | 0 | 0 | 0 | 0 | 9 | 0 | 0 | 0 | 01 | 0001 | 1 | 0001 | 4 | 0001 | 4 | 0001 | 4 | 000D | 1 | 000D | 1 | 0000 | 0 | 0000 | 0 | 0000 | 4 | 0001 | 1 | 1 |
| 27.000 | 1 | 0 | 0 | 0 | 0 | 0 | 0 | 0 | 9 | 0 | 0 | 0 | 01 | 0000 | 0 | 1111 | 4 | 2222 | 4 | 3333 | 4 | 0000 | 0 | 0000 | 1 | 0000 | 0 | 0000 | 0 | 0000 | 4 | 1111 | 1 | 4 |
| 28.000 | 0 | 0 | 0 | 0 | 0 | 0 | 0 | 0 | 9 | 0 | 0 | 0 | 01 | 0000 | 1 | 1111 | 4 | 2222 | 4 | 3333 | 4 | 0000 | 0 | 0000 | 1 | 0000 | 0 | 0000 | 0 | 0000 | 4 | 1111 | 1 | 4 |
| 29.000 | 1 | 0 | 0 | 0 | 0 | 0 | 0 | 0 | 9 | 0 | 0 | 0 | 01 | B000 | 2 | B000 | 0 | C000 | 4 | D000 | 4 | C000 | 0 | 0000 | 0 | 0000 | 0 | 0000 | 0 | 0000 | 4 | 0000 | 0 | 4 |
| 30.000 | 0 | 0 | 0 | 0 | 0 | 0 | 0 | 0 | 9 | 0 | 0 | 0 | 01 | B000 | 2 | B000 | 0 | C000 | 4 | D000 | 4 | C000 | 0 | 0000 | 0 | 0000 | 0 | 0000 | 0 | 0000 | 4 | 0000 | 0 | 4 |
| 31.000 | 1 | 0 | 0 | 0 | 0 | 0 | 0 | 0 | 9 | 0 | 0 | 0 | 01 | A887 | 0 | A887 | 0 | 6442 | 1 | 310E | 1 | AAAA | 1 | 0000 | 0 | 0000 | 0 | 0000 | 0 | 0000 | 4 | 0000 | 1 | 4 |
| 32.000 | 0 | 0 | 0 | 0 | 0 | 0 | 0 | 0 | 9 | 0 | 0 | 0 | 01 | A887 | 0 | A887 | 0 | 6442 | 1 | 310E | 1 | AAAA | 1 | 0000 | 1 | 0000 | 0 | 0000 | 0 | 0000 | 4 | 0000 | 1 | 1 |
| 33.000 | 1 | 0 | 0 | 0 | 0 | 0 | 0 | 0 | 9 | 0 | 0 | 0 | 01 | 0018 | 1 | 0018 | 1 | 0024 | 1 | 0031 | 1 | 0000 | 0 | 0000 | 1 | 0000 | 0 | 0000 | 0 | 0000 | 4 | 0040 | 2 | 1 |
| 34.000 | 0 | 0 | 0 | 0 | 0 | 0 | 0 | 0 | 9 | 0 | 0 | 0 | 01 | 0018 | 1 | 0018 | 1 | 0024 | 1 | 0031 | 1 | 0000 | 0 | 0000 | 1 | 0000 | 0 | 0000 | 0 | 0000 | 4 | 0040 | 2 | 1 |
| 35.000 | 1 | 0 | 0 | 0 | 0 | 0 | 0 | 0 | 9 | 0 | 0 | 0 | 01 | 0000 | 0 | 0000 | 4 | 0000 | 4 | 0000 | 4 | 0000 | 0 | 0000 | 4 | 0000 | 0 | 0000 | 0 | 0000 | 4 | 0001 | 2 | 4 |
| 36.000 | 0 | 0 | 0 | 0 | 0 | 0 | 0 | 0 | 9 | 0 | 0 | 0 | 01 | 0000 | 0 | 0000 | 4 | 0000 | 4 | 0000 | 4 | 0000 | 0 | 0000 | 4 | 0000 | 0 | 0000 | 0 | 0000 | 1 | 1111 | 2 | 4 |
| 37.000 | 1 | 0 | 0 | 0 | 0 | 0 | 0 | 0 | 9 | 0 | 0 | 0 | 01 | 0000 | 0 | 0000 | 4 | 0000 | 4 | 0000 | 4 | 0000 | 0 | 0000 | 4 | 0000 | 0 | 0000 | 0 | 0000 | 1 | 1111 | 2 | 4 |
| 38.000 | 0 | 0 | 0 | 0 | 0 | 0 | 0 | 0 | 9 | 0 | 0 | 0 | 01 | 0000 | 0 | 0000 | 4 | 0000 | 4 | 0000 | 4 | 0000 | 0 | 0000 | 4 | 0000 | 0 | 0000 | 0 | 0000 | 4 | 5000 | 2 | 4 |
| 39.000 | 1 | 0 | 0 | 0 | 0 | 0 | 0 | 0 | 9 | 0 | 0 | 0 | 01 | 0000 | 0 | 0000 | 4 | 0000 | 4 | 0000 | 4 | 0000 | 0 | FDDD | 2 | 0000 | 0 | C000 | 0 | 0000 | 4 | 5000 | 2 | 4 |
| 40.000 | 0 | 0 | 0 | 0 | 0 | 0 | 0 | 1 | 9 | 0 | 0 | 0 | 01 | 0000 | 0 | 0000 | 4 | 0000 | 4 | 0000 | 4 | FDDD | 2 | FDDD | 2 | 0000 | 0 | 0000 | 0 | 0000 | 4 | 0000 | 0 | 4 |

TABLE-continued

Example Timing Diagram. All numbers are in hexadecimal.

| Time | | | | | | | | | | | | | | | | | | | | | | | | | | |
|------|---|---|---|---|---|---|---|---|---|---|---|---|---|---|---|---|---|---|---|---|---|---|---|---|---|---|
| 41.000 | 0 | 0 | 0 | 0 | 0 | 9 | 0 | 0 | 0 | 01 | 0000 | 0 | 0 | 0000 | 0 | 4 | 0000 | 0 | 4 | FDDD | 0 | 2 | 0000 | 0 | 0000 | 0 | 4 |
| 42.000 | 0 | 1 | 0 | 0 | 0 | 9 | 0 | 0 | 0 | 01 | 0000 | 0 | 0 | 0000 | 0 | 4 | 0000 | 0 | 4 | FFFD | 1 | 2 | 0000 | 0 | 0000 | 0 | 4 |
| 43.000 | 0 | 0 | 0 | 0 | 0 | 9 | 0 | 0 | 0 | 01 | 0000 | 0 | 0 | 0000 | 0 | 4 | 0000 | 0 | 4 | FFFD | 1 | 2 | 0000 | 0 | 0000 | 0 | 4 |
| 44.000 | 1 | 0 | 0 | 0 | 0 | 9 | 0 | 0 | 0 | 01 | 0000 | 0 | 0 | 0000 | 0 | 4 | 0000 | 0 | 4 | 0000 | 0 | 4 | 0000 | 0 | 0000 | 0 | 4 |
| 45.000 | 0 | 0 | 0 | 0 | 0 | 9 | 0 | 0 | 0 | 01 | 0000 | 0 | 0 | 0000 | 0 | 4 | 0000 | 0 | 4 | 0000 | 0 | 4 | 0000 | 0 | 0000 | 0 | 4 |
| 46.000 | 1 | 0 | 0 | 0 | 1 | 9 | 0 | 0 | 0 | 01 | BBBB | 2 | 2 | CCCC | 2 | 2 | DDDD | 2 | 2 | 0000 | 0 | 4 | 0000 | 0 | 0000 | 0 | 4 |
| 47.000 | 0 | 0 | 0 | 0 | 1 | 9 | 0 | 0 | 0 | 01 | BBBB | 2 | 2 | CCCC | 2 | 2 | DDDD | 2 | 2 | 0000 | 0 | 4 | 0000 | 0 | 0000 | 0 | 4 |
| 48.000 | 1 | 0 | 0 | 0 | 0 | 9 | 0 | 0 | 0 | 01 | 0000 | 0 | 2 | 0000 | 0 | 2 | FDDD | 1 | 2 | 0000 | 0 | 4 | 0000 | 0 | 0000 | 0 | 4 |
| 49.000 | 0 | 0 | 0 | 0 | 0 | 9 | 0 | 0 | 0 | 01 | 0000 | 0 | 2 | 0000 | 0 | 2 | FFFD | 1 | 2 | 0000 | 0 | 4 | 0000 | 0 | 0000 | 0 | 4 |
| 50.000 | 0 | 1 | 0 | 1 | 0 | 9 | 0 | 0 | 0 | 01 | 0000 | 0 | 4 | 0000 | 0 | 4 | 0000 | 0 | 4 | 0000 | 0 | 4 | 0000 | 0 | 0000 | 0 | 1 |
| 51.000 | 0 | 0 | 0 | 0 | 0 | 9 | 0 | 0 | 0 | 01 | 0000 | 0 | 4 | 0000 | 0 | 4 | 0000 | 0 | 4 | 0000 | 0 | 4 | 0000 | 0 | 7777 | 0 | 1 |
| 52.000 | 0 | 1 | 0 | 0 | 0 | 9 | 0 | 0 | 0 | 01 | 0000 | 0 | 4 | 0000 | 0 | 4 | 0000 | 0 | 4 | 0000 | 0 | 4 | 0000 | 0 | 7777 | 0 | 1 |
| 53.000 | 0 | 0 | 0 | 0 | 0 | 9 | 0 | 0 | 0 | 01 | 0000 | 0 | 4 | 0000 | 0 | 4 | 0000 | 0 | 4 | 0000 | 0 | 4 | 0000 | 0 | 3000 | 0 | 4 |
| 54.000 | 1 | 0 | 0 | 0 | 0 | 9 | 0 | 0 | 0 | 01 | 0000 | 0 | 4 | 0000 | 0 | 4 | 0000 | 0 | 4 | 0000 | 0 | 4 | 0000 | 0 | 3000 | 0 | 4 |
| 55.000 | 0 | 0 | 0 | 0 | 0 | 9 | 0 | 0 | 0 | 01 | 0000 | 0 | 4 | 0000 | 0 | 4 | 0000 | 0 | 4 | 0000 | 0 | 4 | 0000 | 0 | 0000 | 0 | 4 |
| 56.000 | 1 | 0 | 0 | 0 | 0 | 9 | 0 | 0 | 0 | 01 | 7777 | 1 | 1 | 7777 | 1 | 1 | 6666 | 0 | 2 | 0000 | 0 | 4 | 6666 | 2 | 0000 | 0 | 4 |
| 57.000 | 0 | 0 | 0 | 0 | 0 | 9 | 0 | 0 | 0 | 01 | 7777 | 1 | 1 | 7777 | 1 | 1 | 6666 | 0 | 2 | 0000 | 0 | 4 | 6666 | 2 | 0000 | 0 | 4 |
| 58.000 | 0 | 1 | 0 | 0 | 0 | 9 | 0 | 0 | 0 | 01 | 7777 | 1 | 1 | 3333 | 1 | 1 | 2000 | 0 | 2 | 0000 | 0 | 4 | 2000 | 2 | 0000 | 0 | 4 |
| 59.000 | 0 | 0 | 0 | 0 | 0 | 9 | 0 | 0 | 0 | 01 | 7777 | 1 | 1 | 3333 | 1 | 1 | 2000 | 0 | 2 | 0000 | 0 | 4 | 2000 | 2 | 0000 | 0 | 4 |
| 60.000 | 0 | 1 | 0 | 1 | 0 | 9 | 0 | 0 | 0 | 01 | 3000 | 0 | 1 | D000 | 0 | 1 | 2000 | 0 | 2 | 0000 | 0 | 4 | 0000 | 0 | 0000 | 0 | 4 |
| 61.000 | 0 | 0 | 0 | 0 | 0 | 9 | 0 | 0 | 0 | 01 | 3000 | 0 | 1 | D000 | 0 | 1 | 2000 | 0 | 2 | 0000 | 0 | 4 | 0000 | 0 | 0000 | 0 | 4 |
| 62.000 | 0 | 1 | 0 | 0 | 0 | 9 | 0 | 0 | 0 | 01 | 0000 | 0 | 4 | 0000 | 0 | 4 | 0000 | 0 | 4 | 0000 | 0 | 4 | 0000 | 0 | 0000 | 0 | 4 |
| 63.000 | 0 | 0 | 0 | 0 | 0 | 9 | 0 | 0 | 0 | 01 | 0000 | 0 | 4 | 0000 | 0 | 4 | 0000 | 0 | 4 | 0000 | 0 | 4 | 0000 | 0 | 0000 | 0 | 4 |

The number "1" represents a high level signal and the number "0" represents a low level signal in this timing diagram.

Here are 4 more examples not shown in the timing diagram. 3 Fetch-add requests are combined-decombined as follows:
FETCH_ADD(ADDRESS, PARAMETER)
  Request 0: FETCH_ADD(C000 0000, 000A AAAA)
  Request 1: FETCH_ADD(C000 0000, 000B BBBB)
  Request 2: FETCH_ADD(C000 0000, 000C CCCC)
Combined Request: FETCH_ADD(C000 0000, 0023 3331)
The stored response parameters (for decombining the responses) are:
  Request 0: 0000 0000
  Request 1: 000A AAAA
  Request 2: 0016 6665: =000A AAAA+000B BBBB
Response from the memory: 000D FDDD
New memory contents: 0031 310E: =0023 3331+000D FDDD
Response 0: 000D FDDD: =000D FDDD
Response 1: 0018 A887: =000D FDDD+000A AAAA
Response 2: 0024 6442: =000D FDDD+0016 6665
2 Fetch add requests are combined-decombined as follows:
FETCH_ADD(ADDRESS, PARAMETER)
  Request 0: FETCH_ADD(C000, 0000, 000A AAAA)
  Request 1: FETCH_ADD(C000 0000, 000B BBBB)
Combined Request: FETCH_ADD(C000 0000, 0016 6665)
The stored response parameters (for decombining the responses) are:
  Request 0: 0000 0000
  Request 1: 000A AAAA
Response from the memory: 000D FDDD
New memory contents: 0024 6442:=0016 6665+000D FDDD
Response 0: 000D FDDD:=000D FDDD
Response 1: 0018 A887:=000D FDDD+000A AAAA
3 Swap requests are combined-decombined as follows:
SWAP(ADDRESS, PARAMETER)
  Request 0: SWAP(C000 0000, 0000 AAAA)
  Request 1: SWAP(C000 0000, 0000 BBBB)
  Request 2: SWAP(C000 0000, 0000 CCCC)
Combined Request: SWAP(C000 0000, 0000 AAAA)
The stored response parameters (for decombining the responses) are:
  Request 0: 0000 BBBB
  Request 1: 0000 CCCC
  Request 2: 0000 0000
Response from the memory: FFFD FDDD
New memory contents: 0000 AAAA
  Response 0: 0000 BBBB
  Response 1: 0000 CCCC
  Response 2: FFFD FDDD
2 Swap requests are combined-decombined as follows:
SWAP(ADDRESS, PARAMETER)
  Request 0: SWAP(C000 0000, 0000 AAAA)
  Request 1: SWAP(C000 0000, 0000 BBBB)
Combined Request: SWAP(C000 0000, 0000 AAAA)
The stored response parameters (for decombining the responses) are:
  Request 0: 0000 BBBB
  Request: 1: 0000 0000
Response from the memory: FFFD FDDD
New memory contents: 0000 AAAA
  Response 0: 0000 BBBB
  Response 1: FFFD FDDD
B. Routing requests The order of priorities is that plane 1 is always preferred over plane 0. Cross connected terminals are preferred over straight connected terminals if the request wants a cross connected terminal. If a request does not want any cross connected terminals (meaning it wants a straight connected terminal) and no straight connected terminals are available then a cross connected terminal is chosen with plane 0 being preferred because at the next stage there is a chance to get back on track using the "catch up" plane. If all other things are equal then an arbitrary decision is made to give the lower numbered left hand terminal's request priority.

Plane 1 is the catch up plane so any request that wants plane 1 has to get it now because there is not another chance to get it, unless you are at the first stage in which case there is a second chance for the catch up plane at the last stage. Plane 0 is the main plane. The next stage has the same effective plane as the catch up plane so there is a second chance to get routed.

Example: In the example timing diagram above EFPL0 (330): =9, EFPL1 (331): =0, DIGIT0 (332): =0, DIGIT1 (333): =0. The destination node address is: 11 0000 0000 (binary) (C000 0000 HEX). DIGIT0 (332) does not match bit 9 of the destination node address so the request wants plane 0 crossed. DIGIT1 (333) matches bit 0 of the destination node address so the request does not want plane 1 crossed. The combined request ends up getting plane 0 crossed (RHNTDT1, 546B).

C. Storing the return path and stored response parameters

The switch chip stores the return path and parameters that must be used to route and decombine the responses. The return paths and the stored response parameters are stored in locations according to which left hand terminal the request came in on. The return path value is the right hand terminal the request went out on. See the section on combining requests, decombining responses for examples of the return path and the stored response parameters.

D. Error detection

The switch chip performs error detection on the requests and responses as they go through the chip. If an error occurs then the request is stopped if the request has not already left the chip and the response type for that request is forced to an error condition. If an error is detected after a right hand terminal has been claimed then the request is allowed to go through, but the response is stored as a force error response.

12. 32 node example for the hardwired control pin settings.

The example network will consist of 32 nodes. There will be 6 stages in the network so 192: =6*32 switch chips are required. Connect stage 0 left hand terminal 0 to the network interface chip to the requesting node. Tie off the other 3 left hand terminals with resistors so that the 'no request' type is always sent. (The network interface can take care of this.) The terminals are bidirectional so resistor tie offs are necessary. Left hand terminal 0 has the highest priority. Connect stage 5 right hand terminal 2 (plane 1 straight) to the network interface chip to the memory. The network interface can take care of tieing off the other 3 right hand terminals. A routing error is sent back only if a request actually shows up on any of the unused terminals. If no request shows up then send back the 'no request' response type. Right hand terminal 2 has the highest priority when a straight terminal is wanted. The hardwired connections for each switch chip are:

| Switch number 4 3210 | Stage 0 EFPL E0 4 STAGE_DELAY 6 DIGIT D0 | E1 0 D1 | Stage 1 E0 3 5 D0 | E1 4 D1 | Stage 2 E0 2 4 D0 | E1 3 D1 | Stage 3 E0 1 3 D0 | E1 2 D1 | Stage 4 E0 0 2 D0 | E1 1 D1 | Stage 5 E0 1 1 D0 | E1 0 D1 |
|---|---|---|---|---|---|---|---|---|---|---|---|---|
| 0  0 0000 | 0 | 0 | 0 | 0 | 0 | 0 | 0 | 0 | 0 | 0 | 0 | 0 |
| 1  0 0001 | 0 | 1 | 0 | 0 | 0 | 0 | 0 | 0 | 1 | 0 | 1 | 1 |
| 2  0 0010 | 0 | 0 | 0 | 0 | 0 | 1 | 0 | 0 | 1 | 0 | 0 | 0 |
| 3  0 0011 | 0 | 1 | 0 | 0 | 0 | 1 | 0 | 1 | 1 | 1 | 1 | 1 |
| 4  0 0100 | 0 | 0 | 0 | 0 | 1 | 0 | 0 | 1 | 0 | 0 | 0 | 0 |
| 5  0 0101 | 0 | 1 | 0 | 0 | 1 | 0 | 0 | 1 | 1 | 0 | 1 | 1 |
| 6  0 0110 | 0 | 0 | 0 | 0 | 1 | 1 | 0 | 1 | 1 | 0 | 0 | 0 |
| 7  0 0111 | 0 | 1 | 0 | 0 | 1 | 0 | 1 | 1 | 1 | 1 | 1 | 1 |
| 8  0 1000 | 0 | 0 | 1 | 0 | 0 | 1 | 0 | 0 | 0 | 0 | 0 | 0 |
| 9  0 1001 | 0 | 1 | 1 | 0 | 0 | 1 | 0 | 0 | 1 | 0 | 1 | 1 |
| 10 0 1010 | 0 | 0 | 1 | 0 | 0 | 1 | 1 | 0 | 0 | 1 | 0 | 0 |
| 11 0 1011 | 0 | 1 | 1 | 0 | 0 | 1 | 1 | 0 | 1 | 1 | 1 | 1 |
| 12 0 1100 | 0 | 0 | 1 | 0 | 1 | 1 | 0 | 1 | 0 | 0 | 0 | 0 |
| 13 0 1101 | 0 | 1 | 1 | 0 | 1 | 1 | 0 | 1 | 1 | 0 | 1 | 1 |
| 14 0 1110 | 0 | 0 | 1 | 0 | 1 | 1 | 1 | 1 | 0 | 1 | 0 | 0 |
| 15 0 1111 | 0 | 1 | 1 | 0 | 1 | 1 | 1 | 1 | 1 | 1 | 1 | 1 |
| 16 1 0000 | 1 | 0 | 0 | 1 | 0 | 0 | 0 | 0 | 0 | 0 | 0 | 0 |
| 17 1 0001 | 1 | 1 | 0 | 1 | 0 | 0 | 0 | 0 | 1 | 0 | 1 | 1 |
| 18 1 0010 | 1 | 0 | 0 | 1 | 0 | 0 | 1 | 0 | 1 | 0 | 0 | 0 |
| 19 1 0011 | 1 | 1 | 0 | 1 | 0 | 0 | 1 | 0 | 1 | 1 | 1 | 1 |
| 20 1 0100 | 1 | 0 | 0 | 1 | 1 | 0 | 0 | 1 | 0 | 0 | 0 | 0 |
| 21 1 0101 | 1 | 1 | 0 | 1 | 1 | 0 | 0 | 1 | 1 | 0 | 1 | 1 |
| 22 1 0110 | 1 | 0 | 0 | 1 | 1 | 0 | 1 | 1 | 0 | 1 | 0 | 0 |
| 23 1 0111 | 1 | 1 | 0 | 1 | 1 | 0 | 1 | 1 | 1 | 1 | 1 | 1 |
| 24 1 1000 | 1 | 0 | 1 | 1 | 0 | 1 | 0 | 0 | 0 | 0 | 0 | 0 |
| 25 1 1001 | 1 | 1 | 1 | 1 | 0 | 1 | 0 | 0 | 1 | 0 | 1 | 1 |
| 26 1 1010 | 1 | 0 | 1 | 1 | 0 | 1 | 1 | 0 | 0 | 1 | 0 | 0 |
| 27 1 1011 | 1 | 1 | 1 | 1 | 0 | 1 | 1 | 0 | 1 | 1 | 1 | 1 |
| 28 1 1100 | 1 | 0 | 1 | 1 | 1 | 1 | 0 | 1 | 0 | 0 | 0 | 0 |
| 29 1 1101 | 1 | 1 | 1 | 1 | 1 | 1 | 0 | 1 | 1 | 0 | 1 | 1 |
| 30 1 1110 | 1 | 0 | 1 | 1 | 1 | 1 | 1 | 1 | 0 | 1 | 0 | 0 |
| 31 1 1111 | 1 | 1 | 1 | 1 | 1 | 1 | 1 | 1 | 1 | 1 | 1 | 1 |

SWITCH CHIP DETAILED DESCRIPTION

Figure 8:
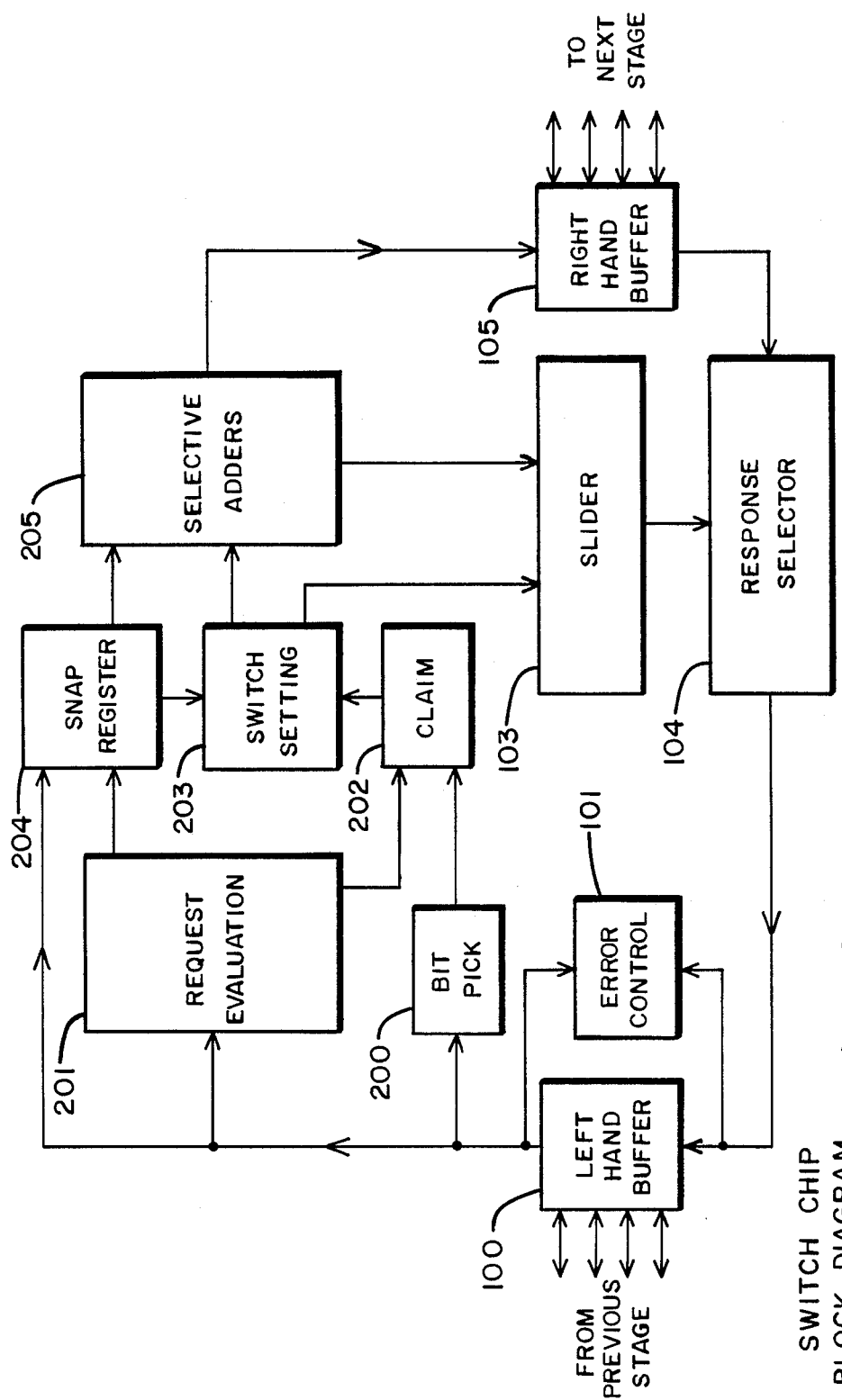
FIG. 8 is an overall block diagram of a switching circuit that may be used in the present invention.
Figure 9B:
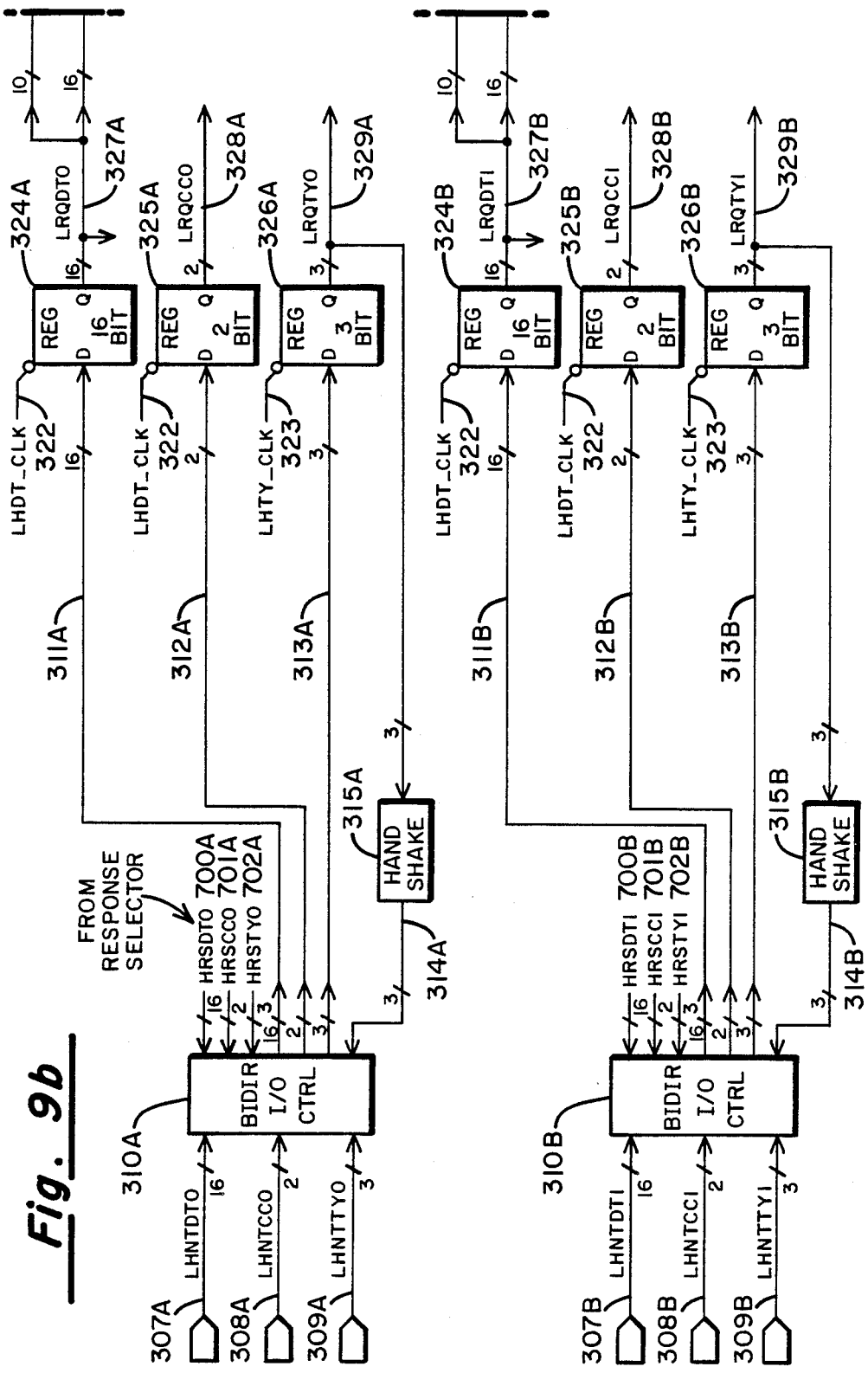
Figure 9C:
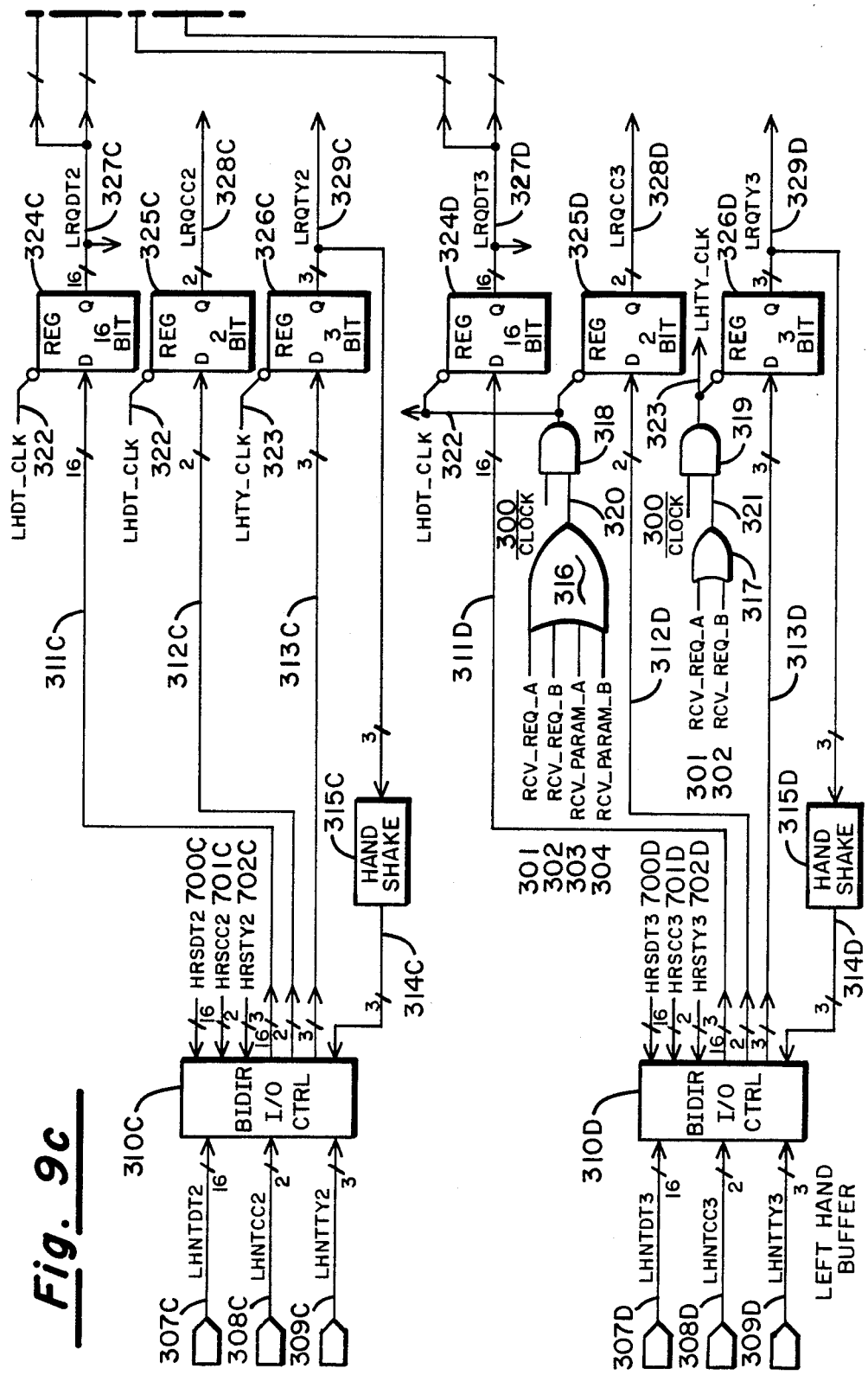
Figure 9D:
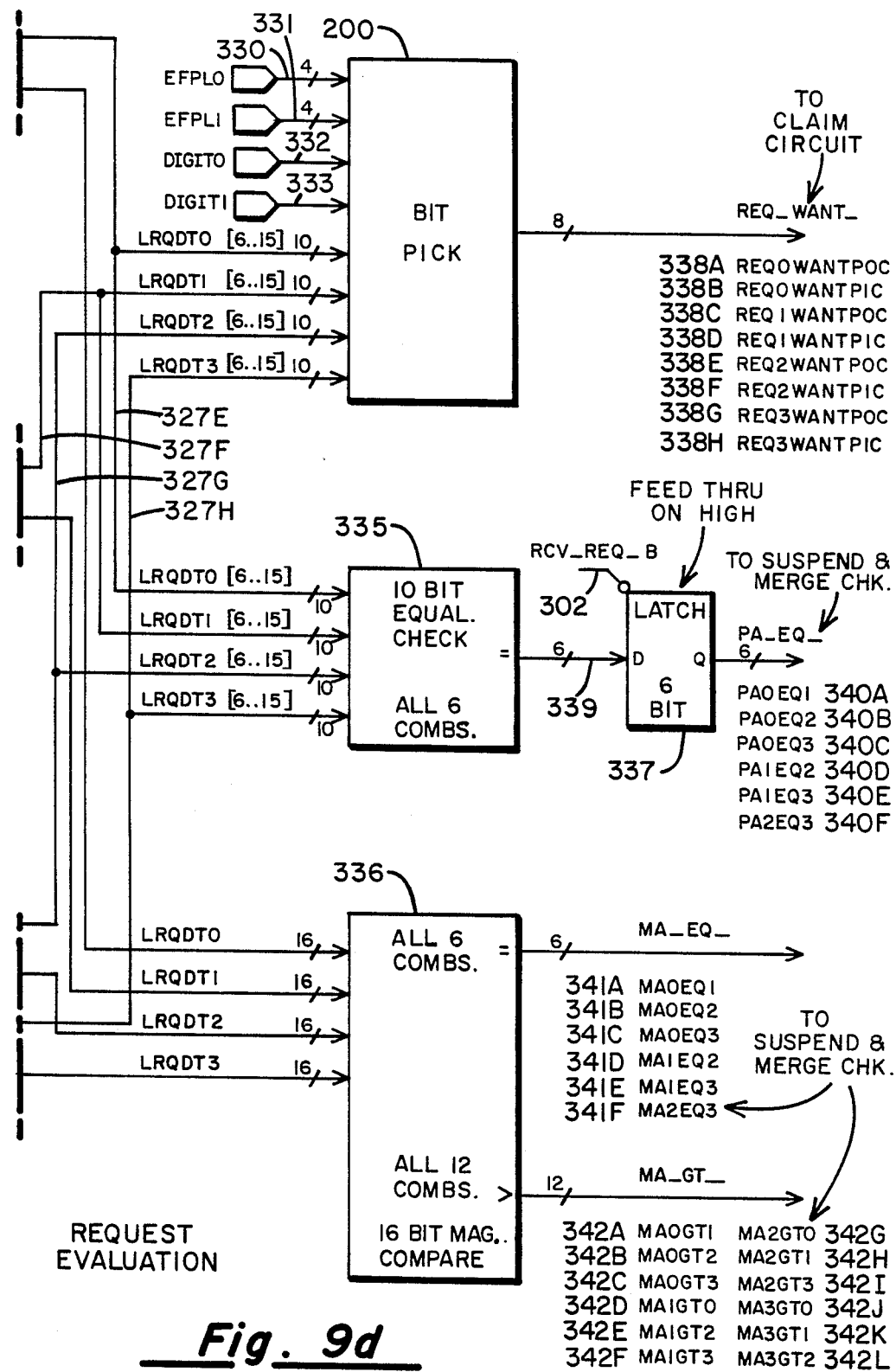
Figure 10A:
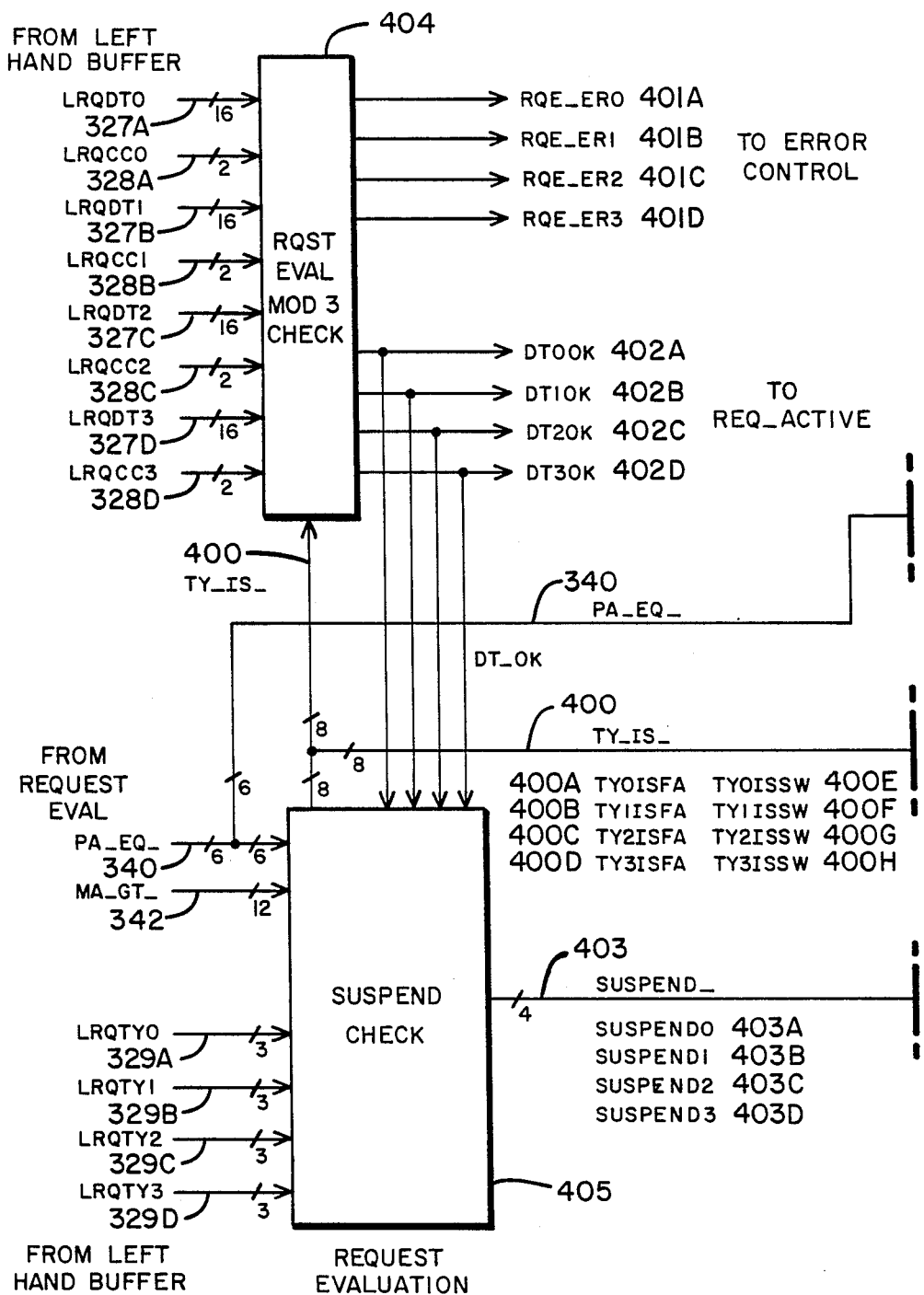
Figure 10B:
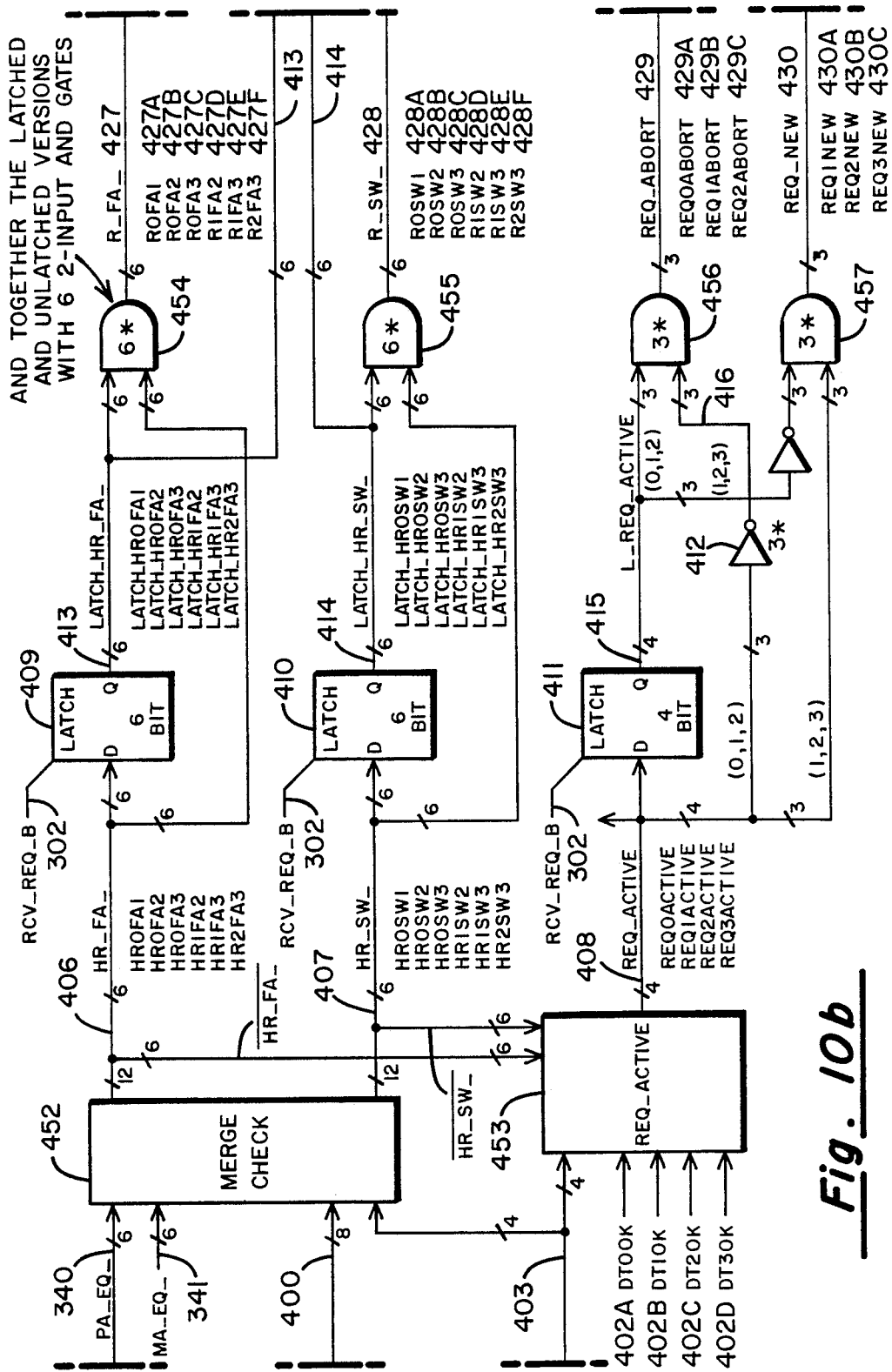
Figure 10C:
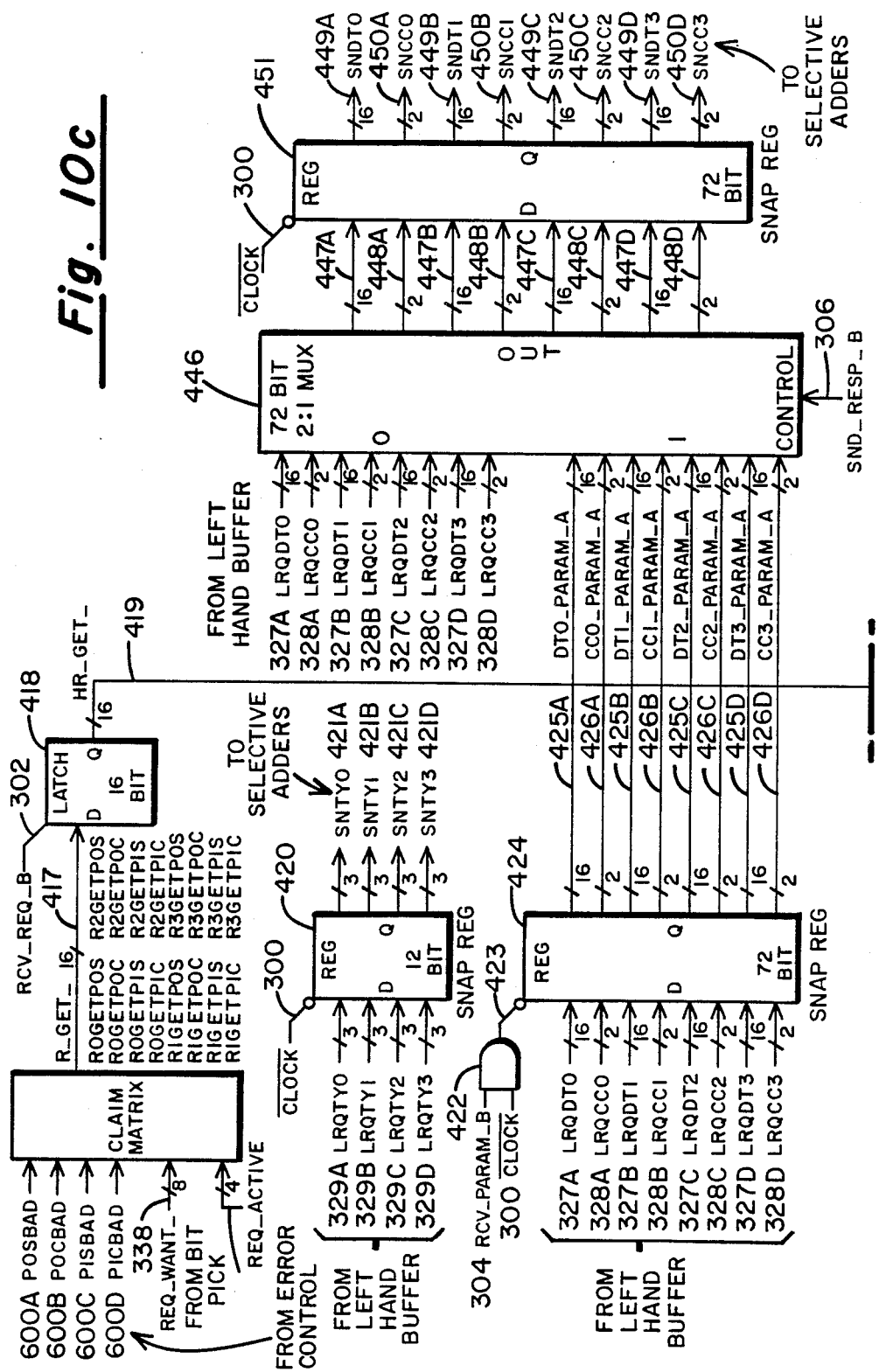
Figure 10D:
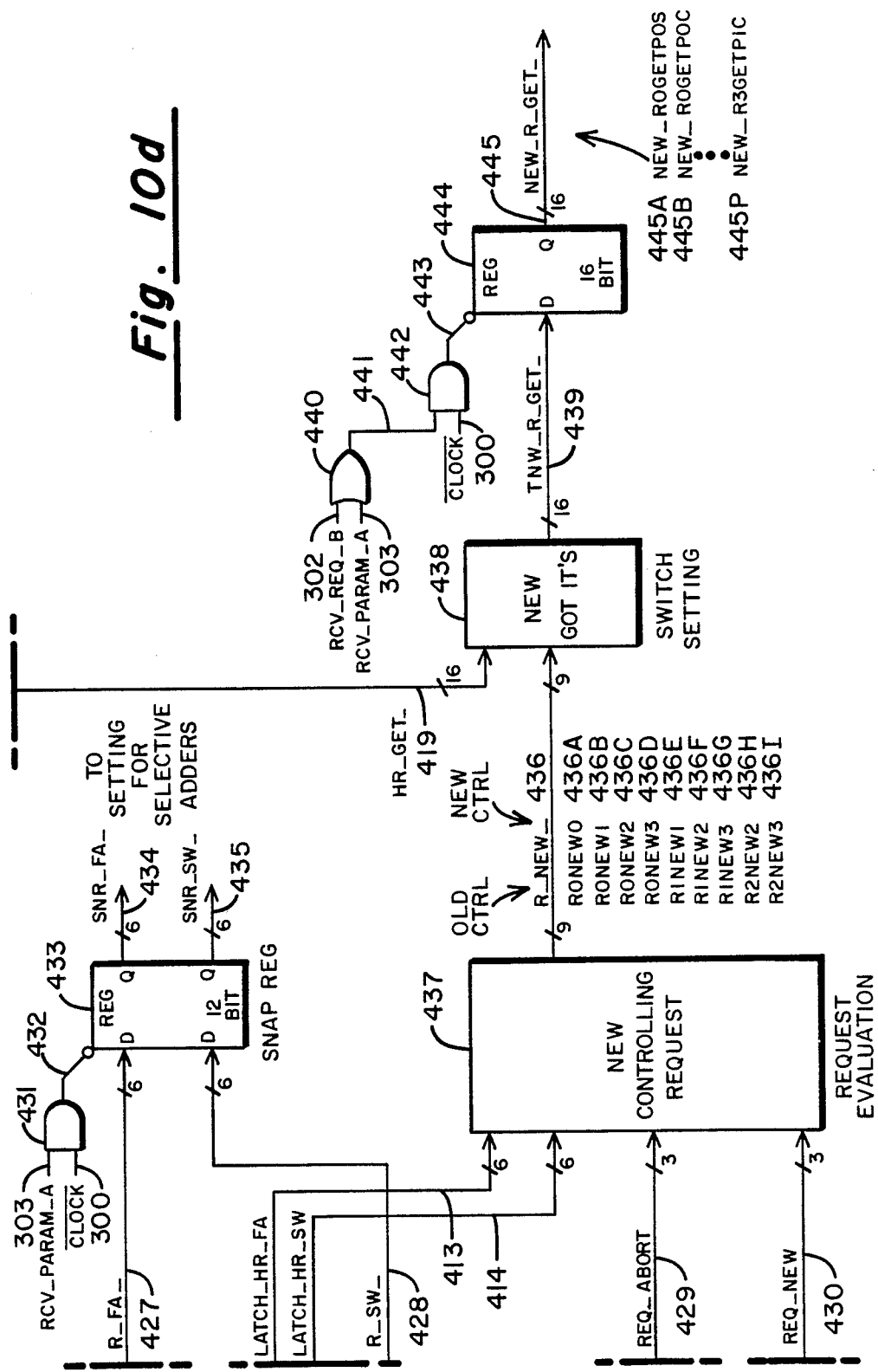

FIG. 8 shows an overall block diagram of a chip for a switch 20. Up to four requests can come from the previous stage into the Left Hand Buffer (100). The incoming "requests" are forward routed to the correct right hand terminal and combined if possible. The requests then go out to the next stage through the Right Hand Buffer (105). The Slider (103) saves the reverse switch settings and the stored response parameter for decombining the responses to requests that were combined. The responses come back from the next stage through the Right Hand Buffer (105) and go into Response Reverse Routing-Decombining (104). The responses are routed to the proper left hand terminal and are decombined if necessary. The responses then go to the previous stage through the Left Hand Buffer (100). The Error Control Block (101) monitors the four paths through the chip, records error occurrences, and if too many errors occur on a particular path, then that path is shut off and all data must be routed through the remaining paths.

The circuit labelled Bit Pick (200) examines the node address of requests and determines which right hand terminal each request wants. Request Evaluation (201) compares each request with every other request and determines whether requests can be combined and which requests have priority over other requests. Request Evaluation (201) also checks for MOD 3 errors on the data paths. The Claim Section (202) compares the wanted right hand terminals with the priorities of each request and assigns a right hand terminal to each request. The Snap Register (204) saves data between clock phases for future use.

Switch Setting (203) takes the assigned right hand terminals and the combinability information and sets up the control lines to the Selective Adders (205) to route and combine the requests to the correct righ hand terminal. Switch Setting (203) also sets up the Selective Adder control lines for calculating the stored response parameter for response decombining. Switch Setting (203) also calculates the reverse switch setting for routing the response through the Response Selector (104). If there were not enough working right hand terminals for all of the requests, then instead of saving the reverse switch setting in the Slider (103) a Force Error Response bit is set in the Slider signifying that the request was not routed. The Selective Adders (205) are used for routing the request, routing and calculating the forward parameter and calculating the stored response parameter.

Figure 25:
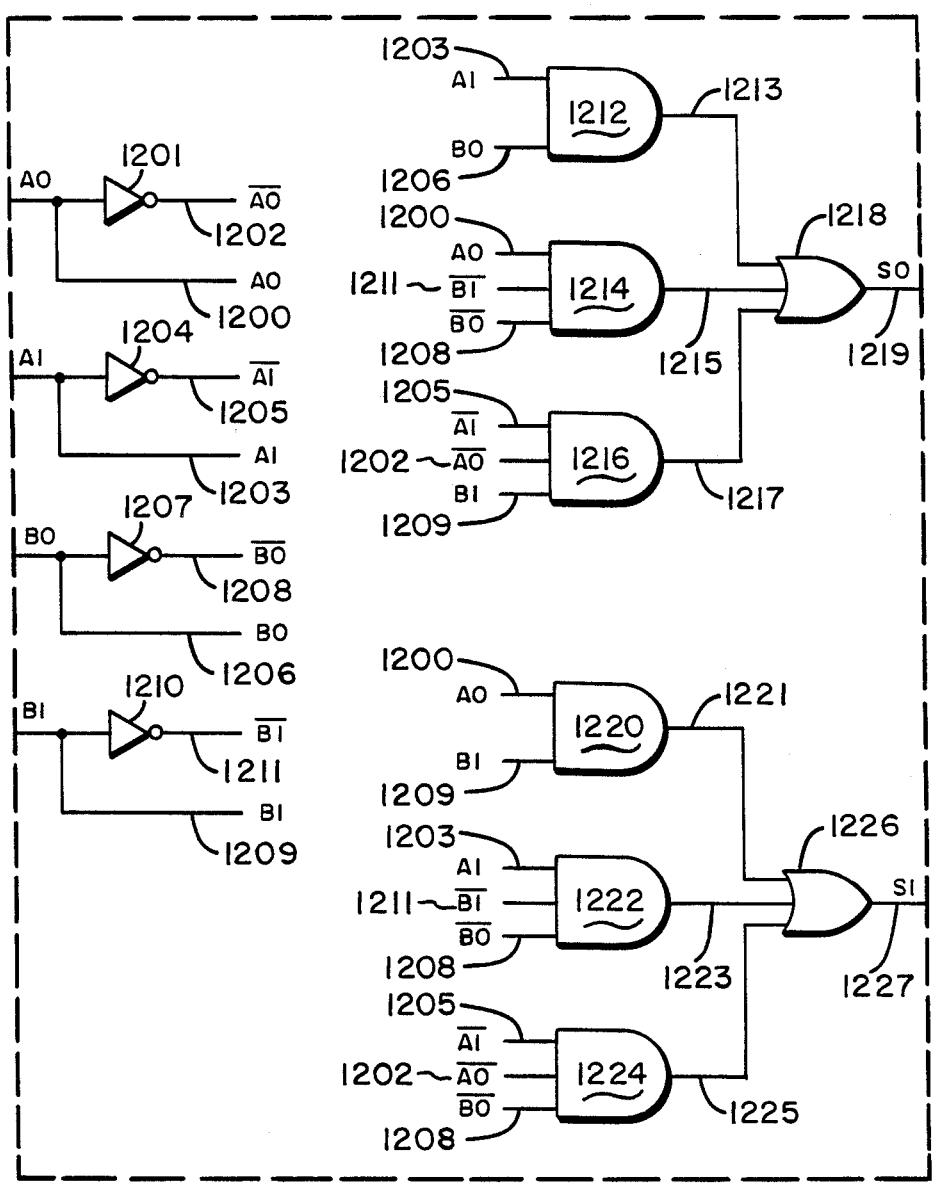
Figure 26A:
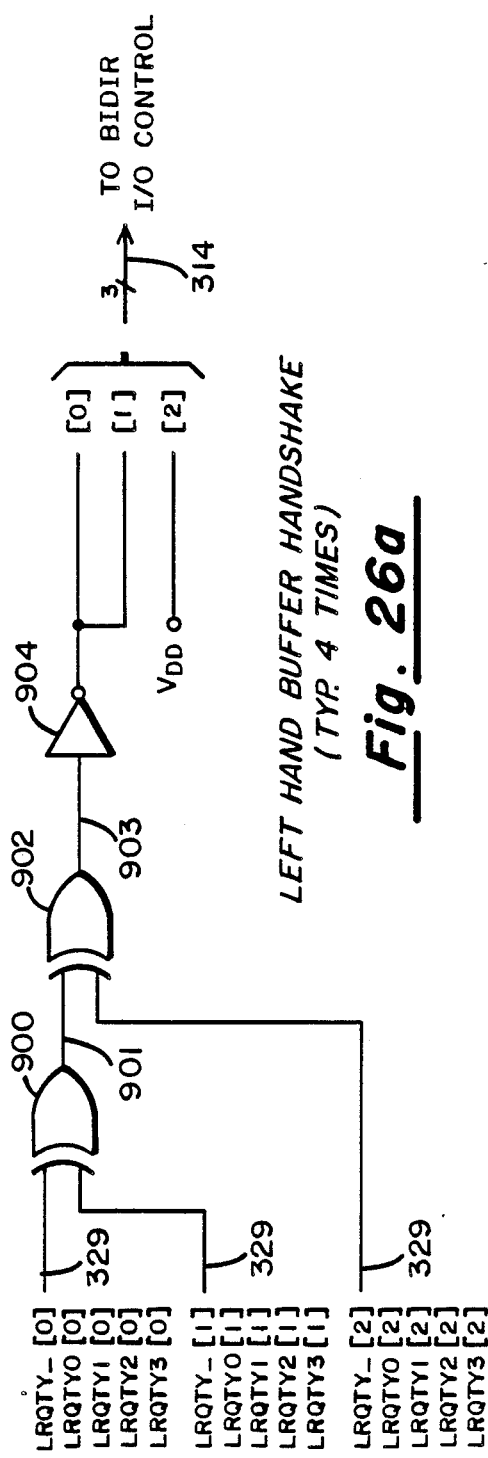
Figure 26B:
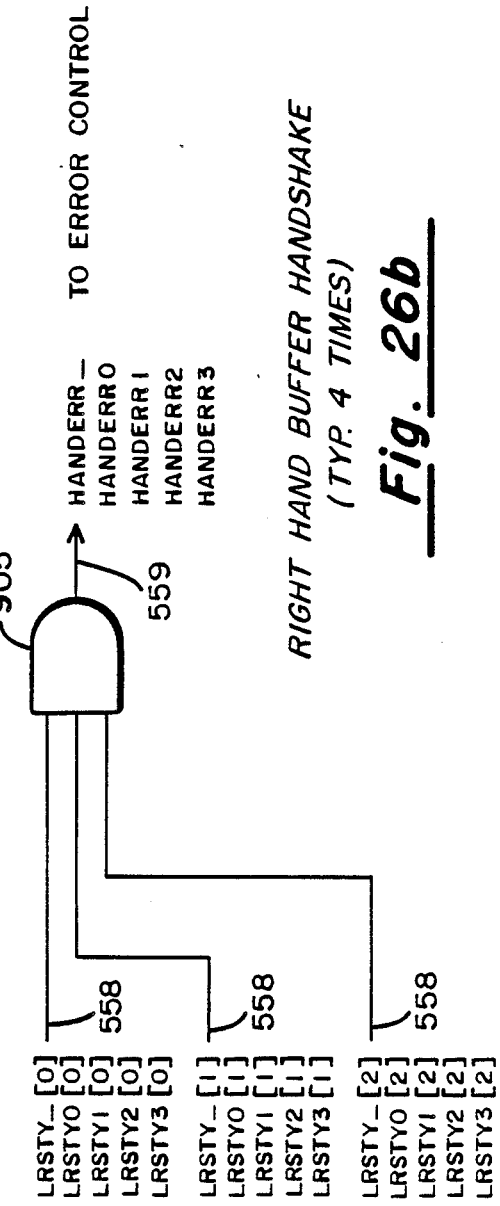

FIGS. 9-26 show detailed block diagrams of the Network Switch. All blocks that are labelled LATCH are feed-through latches. Data is fed through to the output when the clock is high and the output is held when the clock is low. In the Left-Hand Buffer (100) (which includes the bidirectional I/O control circuits 310A-310D) 16 bits of request data (LHNTDT_, 307A-D) and 2 bits of check codes for the data (LHNTCC_, 308A-D) are accepted from the previous stage during clock phases RCV_REQ_A (301), RCV_REQ_B (302), RCV_PARAM_A (303) and RCV PARAM_B (304). Response data and check codes are sent to the previous stage on the same lines during clock phases SND_RESP_A (305) and SND RESP_B (306). 3 bits of request type (LHNTTY_, 309A-D) are accepted from the previous stage during clock phases RCV_REQ_A (301) and RCV REQ_B (302). The response type is sent to the previous stage during clock phases SND_RESP_A (305) and SND_RESP_B (306). A handshake 'valid request received' (314A-D) is sent to the previous stage on the type lines (309A-D) during clock phases RCV_PARAM_A (303) and RCV PARAM_B (304). The Left Hand Buffer Handshake circuits (315A-D) are shown in FIG. 26. The Handshake circuits check that the received type has odd parity and puts out a 4 if the parity is odd and a 7 if parity is even (indicating error).

The upper 10 bits of the data lines (LRQDT_[6..15], 327E-H) are sent to Bit Pick (200) to determine which right hand terminals are wanted (338A-H). These 10 bits represent the Destination Processor Address during RCV_REQ_B (302). Only the cross-connected right hand terminals have 'want' signals. The straight-connected right hand terminals are the default if no crossed terminals are wanted by a request.

FIG. 14 shows the details of Bit Pick. 10:1 muxes within Bit Pick select one bit of the Destination Processor Address using EFPLO (330) or EFPLI (331) as control lines to designate the effective planes. The selected bit is then EXCLUSIVE-ORED with either DIGIT0 (332) or DIGIT1 (333) to produce REQ_ WANT_ (338A-H). LRQDT_[6 . . 15] (327E-H) is also sent to a 10 bit Equality Checker (335) to see if any 2 destination processor addresses are equal. The signals produced are PA_EQ_ (340A-F).

The full 16 bits of data (LRQDT_, 327A-D) are sent to a 16 bit Magnitude Comparator (336) to find out which memory addresses are equal (MA_EQ_ 341A-F) and which memory addresses are greater than other memory addresses (MA_GT_, 342A-L). The magnitude comparison is only valid during RCV_REQ_B (302) and RCV_PARAM_A (303).

Figure 24B:
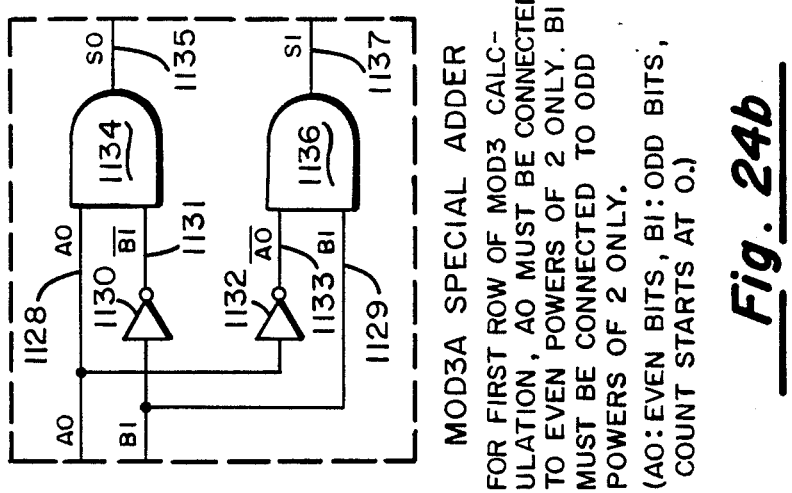
Figure 24A:
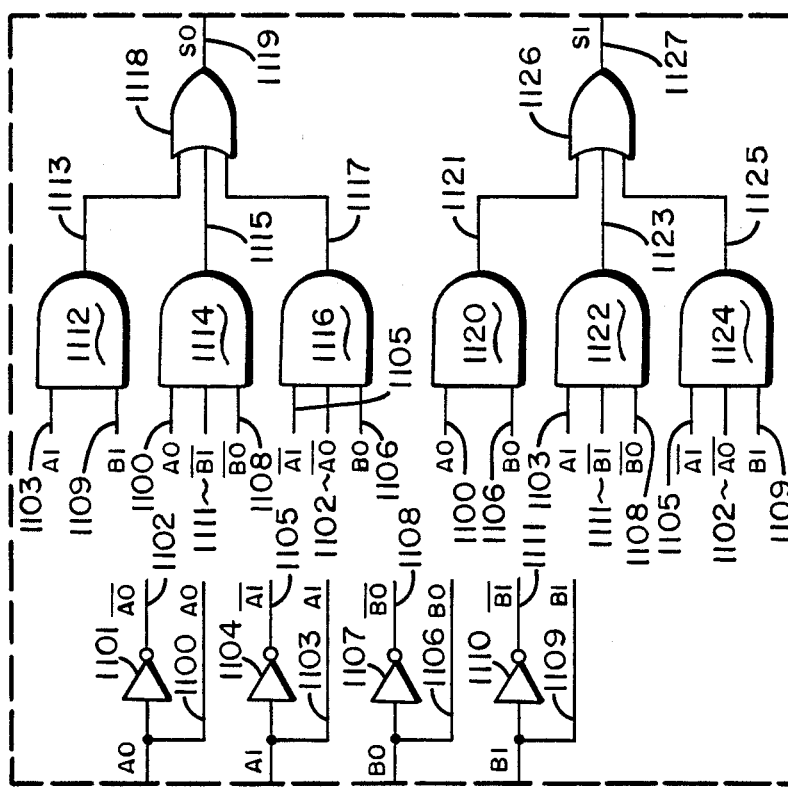

During RCV_REQ_B (302), RCV_PARAM_A (303), RCV_PARM_B (304) and SND_RESP_A (305), a MOD 3 check is done on the data (LRQDT_, 327A-D) and compared to the check codes (LRQCC_, 328A-D) within the block Request Evaluation MOD 3 Check (404). The MOD 3 checker assembly (FIG. 15) consists of a tree of 2 bit MOD 3 adders. The first row of the tree is a special reduced MOD 3 adder to handle the conversion of a 16 bit binary number to sets of 2 bit MOD 3 numbers. Logic of the MOD 3 adders is shown in FIG. 24. Within the Request Evaluation MOD 3 Check block a further check on the type lines is done. The request types are decoded within Suspend Check (405) into either Fetch_add or Swap (TY_ISFA, 400A-D and TY_ISSW, 400E-H).

Type Decoding is shown in FIG. 16. If the type is not either Fetch_add (i.e., fetch-and-add) or Swap, then that request's DT_OK (402A-D) line is brought low indicating that the data is to be ignored. Either there has been an error or there is no request. The complement of the DT_OK (402A-D) lines is RQE_ER_ (401A-D) and are sent to Error Control for monitoring the errors on each path through the chip.

Suspend Check (405) checks to see if a request needs to be suspended either because there has been an error in a request or a request has low priority and the same destination processor address as a higher priority request, but cannot be combined with that higher priority request.

Suspend Check logic is shown in FIG. 16. A smaller memory address has priority over a larger memory address. Swap has priority over Fetch_add. SUSPEND_ (403A-D) is then sent to Merge Check (452) and Req_active (453). Merge Check compares each request with every other request and sees which requests can be combined into one.

Figure 23A:
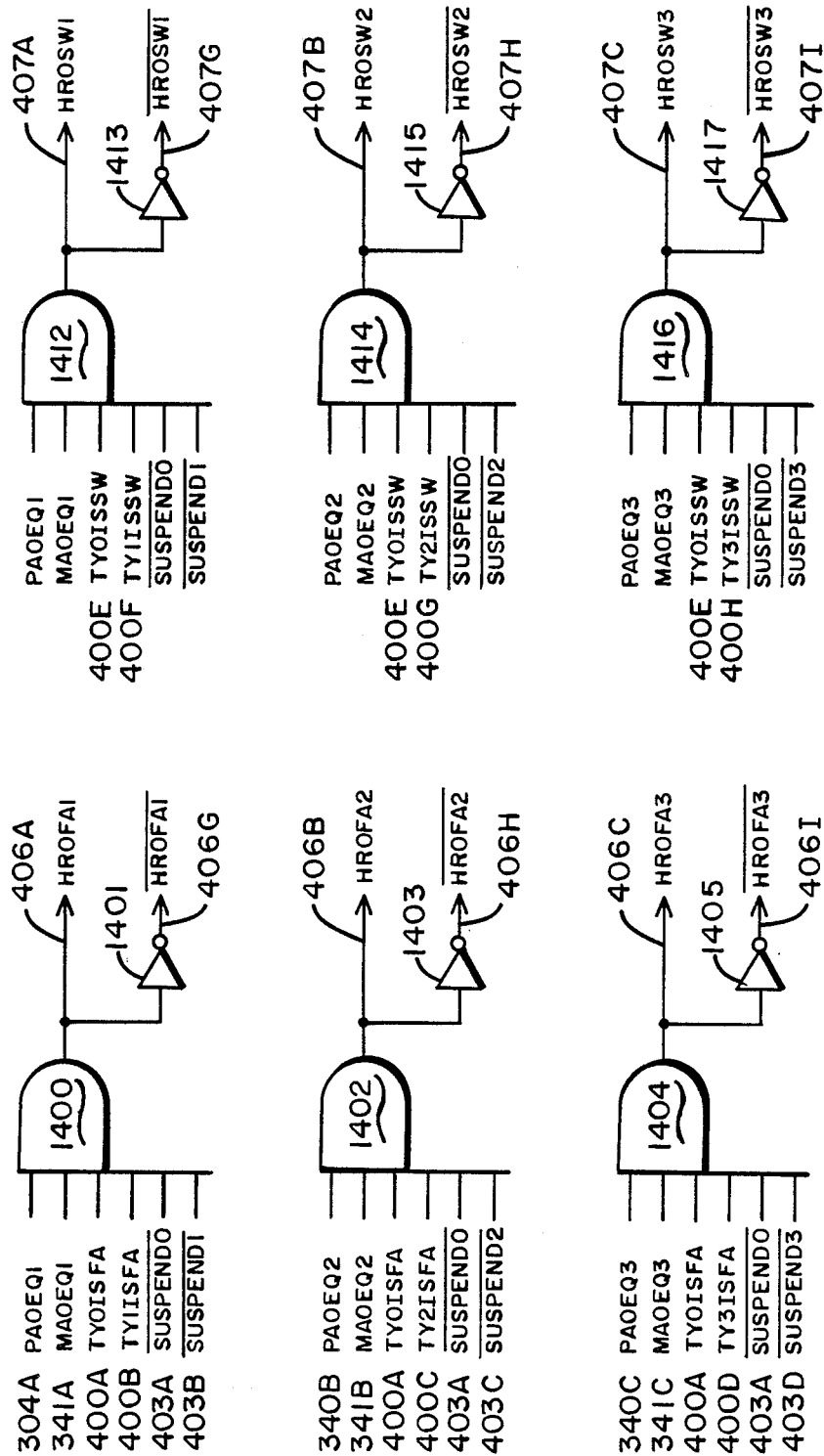
Figure 23B:
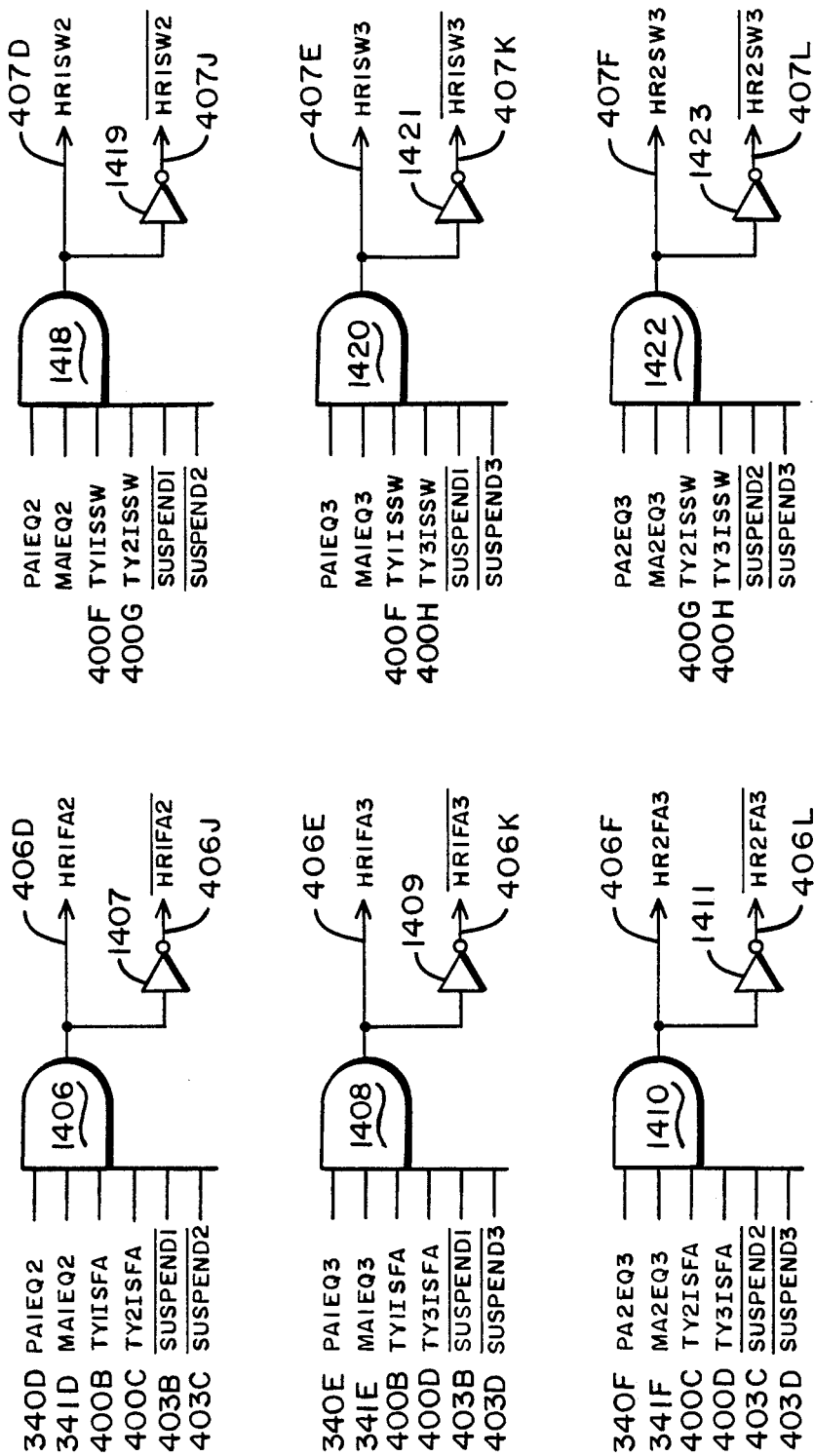

FIG. 23 shows the logic for Merge Check and Req_active. Requests are combined only if their destination processor addresses are equal, their memory addresses are equal, their types are equal and they have not been suspended. Req_active (453) determines which requests are active after combining takes place. In a set of combined requests, the one with the lowest numbered left hand terminal is the one that remains active and in control of the combined request. Requests that are not combined and not suspended are also active. Since the request is split into 2 halves (multiplexed to limit the external pin count) a comparison must be made between the 2 halves of the request to see if the decision made during the first half is still valid during the second half. AND gate groups 454 and 455 compare the merge signals of the first half with the second half.

The only way that a merge occurs is that if both the first half and the second half results say to merge. AND gate group 456 (REQ_ABORT, 429A-C) checks to see if a REQ_ACTIVE (408A-D) signal was aborted due to conflicting memory addresses on a previous merge or conflicting types or errors on the second half of the request. There is no REQ3_ABORT since request 3 is never active if it is merging with another request. AND gate group 457 (REQ_NEW, 430A-C) checks for a new request being active during the second half when it was not active during the first half. A REQ_NEW line will go high if the lowest numbered request in a group of requests that are being merged is suspended during the second half of the request.

Figure 17:
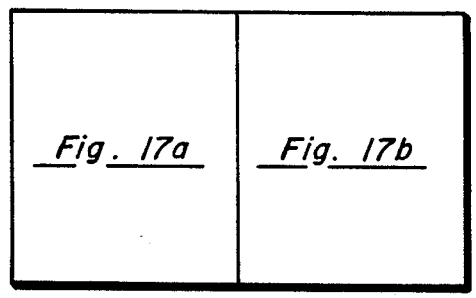
Figure 17C:
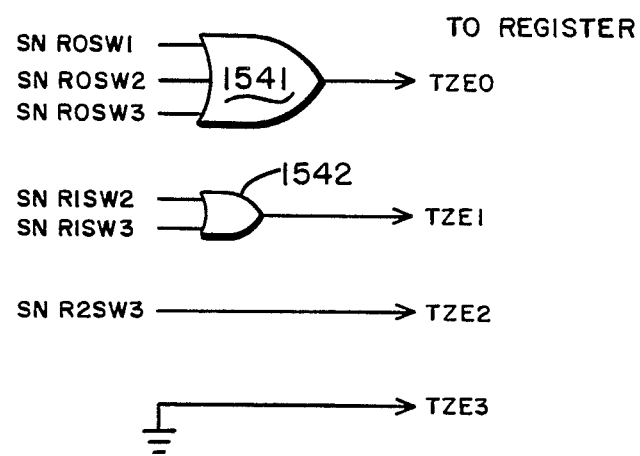
Figure 17A:
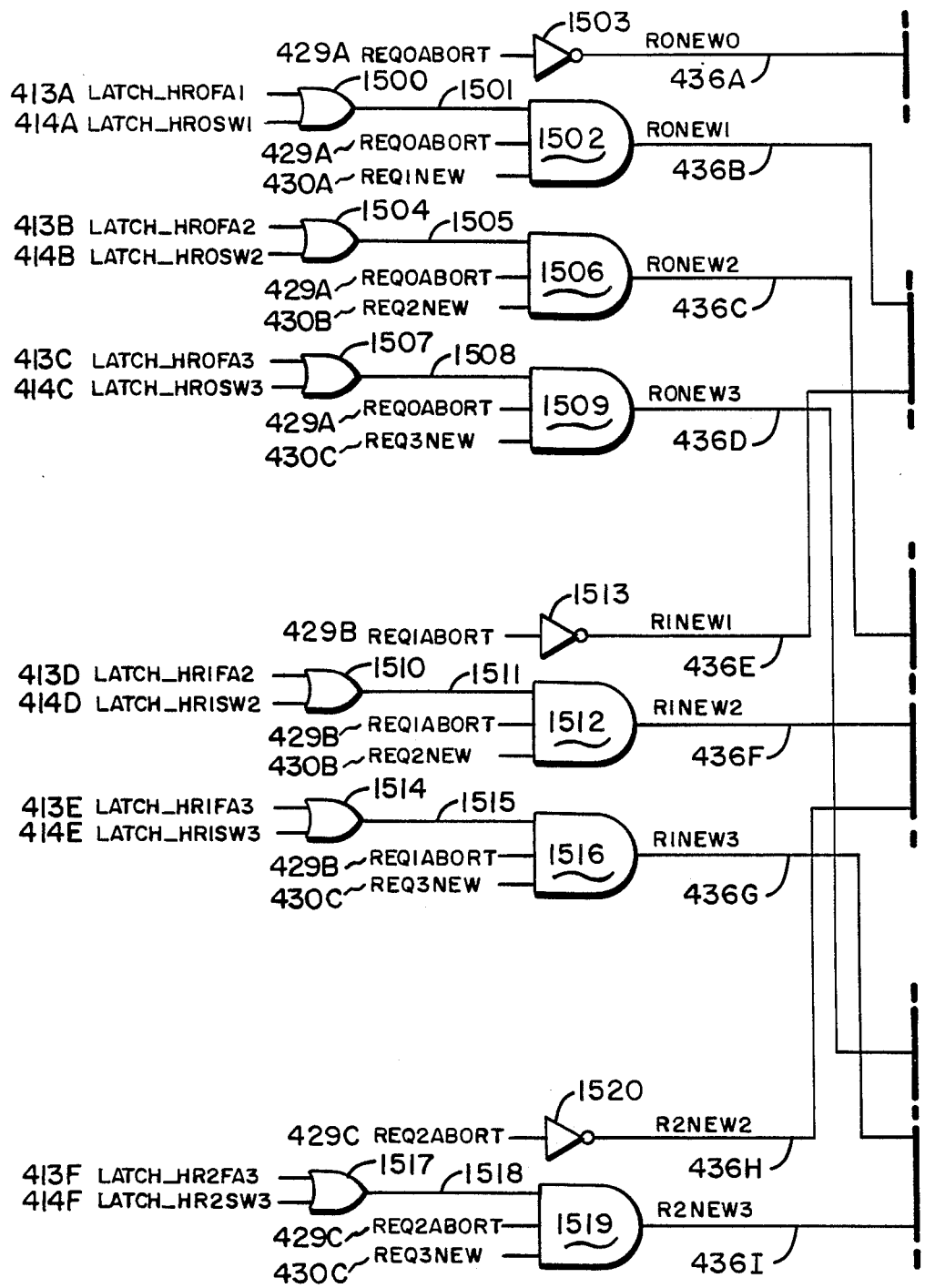

There is no REQ0NEW line since if the request was being merged with some other request, then the request arriving on left-hand terminal 0 would always be the controlling request during the first half of the request. The request has the highest priority. The MERGE, ABORT, and NEW signals are sent to New Controlling Request (437) to determine which request was in control, the first half versus which request is in control during the second half. The logic for New Controlling Request (437) is shown in FIG. 17. The output signals are R_NEW_ (436A-I) where the number the NEW indicates the old controlling request and the number after the NEW indicates the new controlling request.

The Claim Matrix (202) assigns right hand terminals to requests. Error Control can disable a right hand terminal by bringing one of the lines POSBAD, POCBAD, PISBAD or PICBAD (600A-D) high. The Claim Matrix uses the REQ_WANT_ (338A-H) and REQ_ACTIVE (408A-D) lines to assign right hand terminals. The Claim Matrix is shown in FIG. 18. The Claim Cell is shown in FIG. 22. The order of priority in assigning right hand terminals is plane 1 crossed (PIC), plane 0 crossed (POC), plane 1 straight (PIS) and plane 0 straight (POS).

This priority scheme is represented by the order of the columns in the Claim Matrix. If a request did not want a crossed terminal and both of the straight terminals are already claimed, then that request is going to get a crossed terminal from the last 2 columns of the claim matrix. The priority order is plane 0 crossed and then plane 1 crossed. Plane 0 crossed is given priority because at the next stage the request will want plane 1 crossed and be able to get back on track by using the "catch up" plane.

The order of the rows indicates the priority of the requests based on left hand terminal number. If all other things are equal, then the request arriving on the lower numbered left hand terminal has priority. The column priority order takes precedence over the row priority order. Wanting a crossed right hand terminal has higher priority than being a lower numbered left hand terminal. The outputs of the Claim Matrix are R_GET_ (417A-P).

HR_GET_ (419A-P) and R_NEW_ (436A-I) are fed to New Got Its (438) to determine how to reassign the right hand terminal during the second half of the request. It is not sufficient to merely redo the claims with the Claim Matrix during the second half because the priorities between requests may have changed due to aborts during the second half. If the priorities change and the claims are redone, then a request may be split between 2 right hand terminals. Example: if requests 0, 2 and 3 are being combined and want plane 1 crossed and request 1 goes through by itself and also wants plane 1 crossed, then at the end of the first half of the request, request 0 will get plane 1 crossed and request 1 will get plane 1 straight. If during the second half request 0 is aborted, then a re-evaluation with the Claim Matrix would result in request 1 getting plane 1 crossed and request 2 getting plane 1 straight. The two sets of requests would be mixed up. What is needed is to take the signal HR0GETPlC (419D) and reassign it to NEW_ R2GETPlC (445L). Now the requests stay on the correct right hand terminal and do not intermixed. The logic for the New Got Its is shown in FIG. 17.

The Snap Register (204) is used to hold data for use in future clock phases. Register 420 holds the types SNTY_ (421A-D). Register 424 holds the first half of the parameter's data and check bits. The second half of the parameter's data and check bits is held in the Left hand Buffer Registers 324A-D and 325A-D. The first and second half of the parameter is multiplexed (446) into Register 451 producing the signals SNDT_ (449A-D) and SNCC_ (450A-D) which are then sent to the Selective Adders (205, 520).

The reason for the Snap Register is that the request parameter needs to be used twice: once for calculating the forward parameter and once for calculating the stored response parameter. When calculating the forward parameter then both halves of the parameter flow through terminal 0 of the mux (446). When calculating the stored response parameter, the first half of the parameter comes from terminal 1 of the Mux (446) and the second half of the parameter comes from terminal 0 of the Mux (446). Register 433 saves the merge signals SNR_FA_ (434A-F) and SNR_SW_ (435A-F) for future use.

Figure 20B:
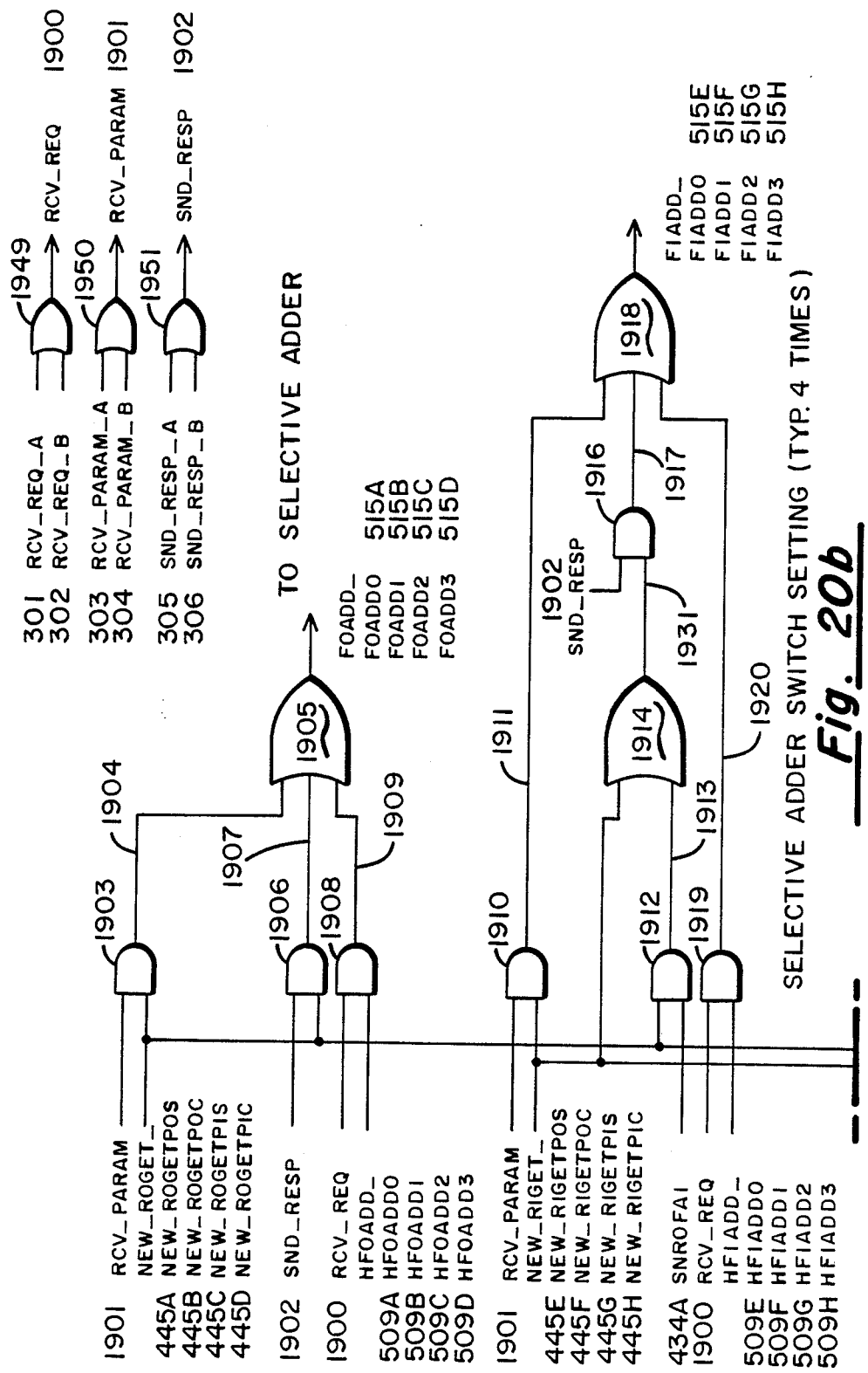

Switch Setting (203) sets up the control lines for the Selective Adders (205). Stored Response Parameter Selective Adder Switch Setting (502) takes the merge signals SNR_FA_ (434A-F) and SNR_SW_ (435A-F) and determines how to set up the Selective Adders for calculating the stored response parameter. The logic for the Stored Response Parameter Selective Adder Switch Setting (502) is shown in FIG. 20. If a request is not being combined with any other request, then the stored response parameter is 0. If a request is being Fetch_add combined with other requests, then the stored response parameter is the sum of the parameters of the other requests being combined that have lower left hand terminal numbers. If the request has the lowest left hand terminal number of those requests being combined, then the stored response parameter is 0.

If the request is being Swap combined with other requests, then the stored response parameter is the parameter of the request (among those being combined) with the next higher left hand terminal number. If the request has the highest left hand terminal number of those requests being combined, then the stored response parameter is 0.

Selective Adder Switch Setting (514) takes the signals SNR_FA_ (434A-F), SNR_SW_ (435A-F), NEW_R_GET_ (445A-P) and HF_ADD_ (509A-P), (Stored Response Parameter Selective Adder Switch Setting) and produces the signals that control the Selective Adders: F_ADD_ (515A-P). In F_ADD_ the number before the ADD in indicates the left hand terminal number and the number after the ADD indicates the right hand terminal number.

The logic for Selective Adder Switch Setting (514) is shown in FIG. 20. During RCV_PARAM_A (303) and RCV_PARAM_B (304) the request is routed through the Selective Adders based purely on which right hand terminal the request got. No addition takes place. During SND_RESP_A (305) and SND_RESP_B (306) the forward request parameters are calculated.

If the request is not being combined with any other request, then the parameter is routed through the Selective Adder based on which right hand terminal the request got. If the request is being Fetch_add combined with other requests, then the forward parameter is the sum of all of the parameters being combined. If the request is being Swap combined with other requests, then the forward parameter is the parameter of the request with the lowest numbered left hand terminal. During RCV_REQ_A (301) and RCV_REQ_B (302) the stored response parameter is calculated as described above.

Figure 19A:
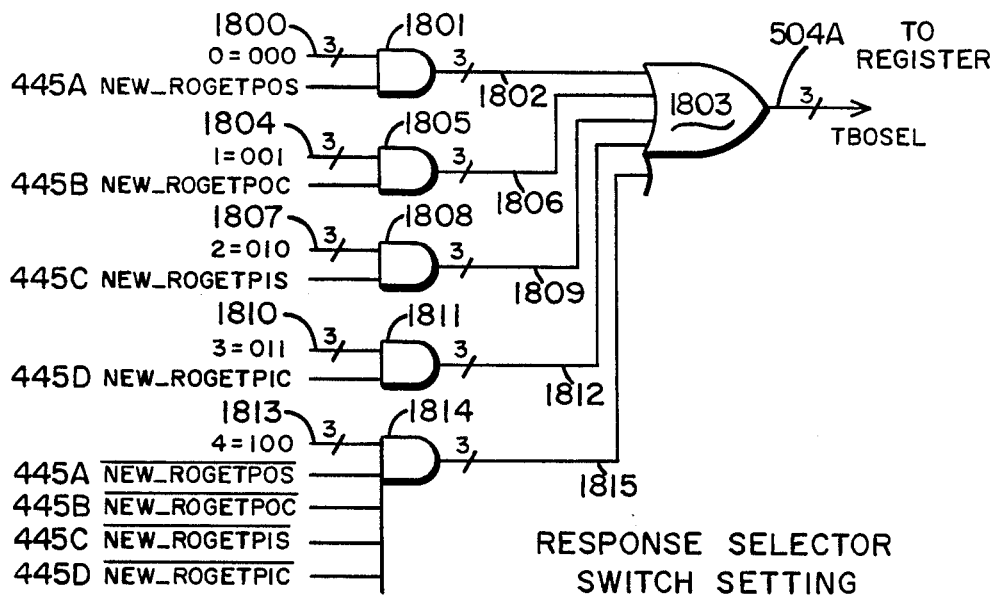
Figure 19C:
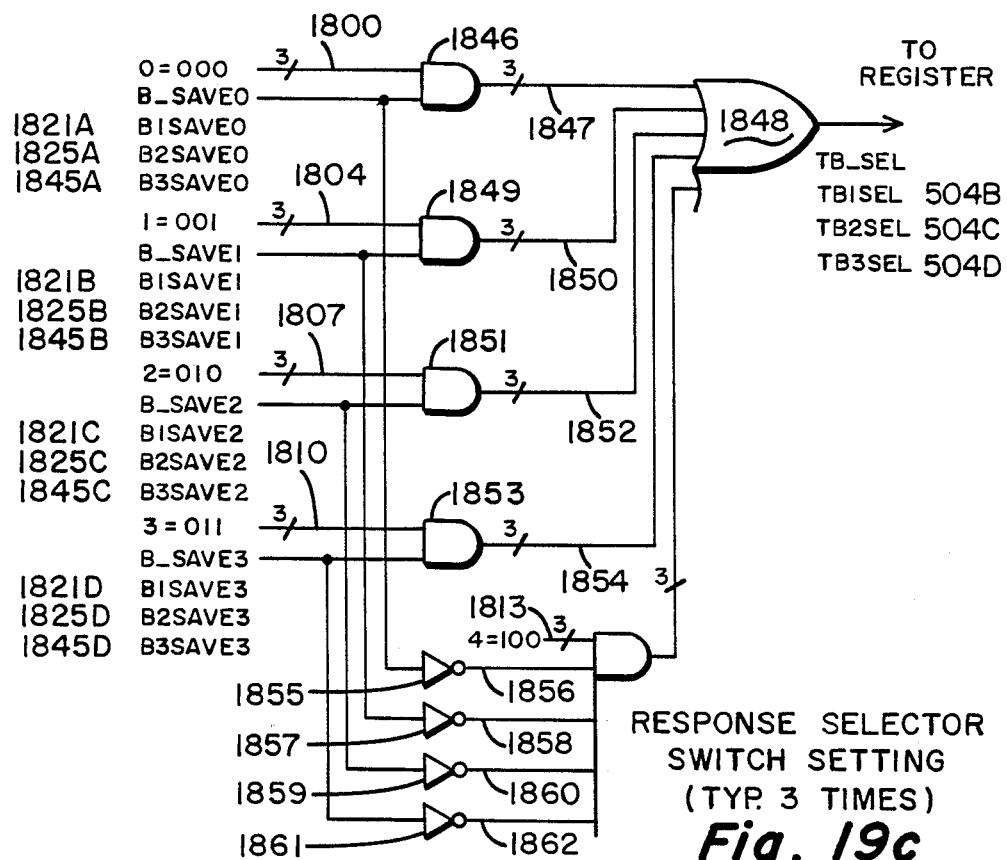
Figure 19B:
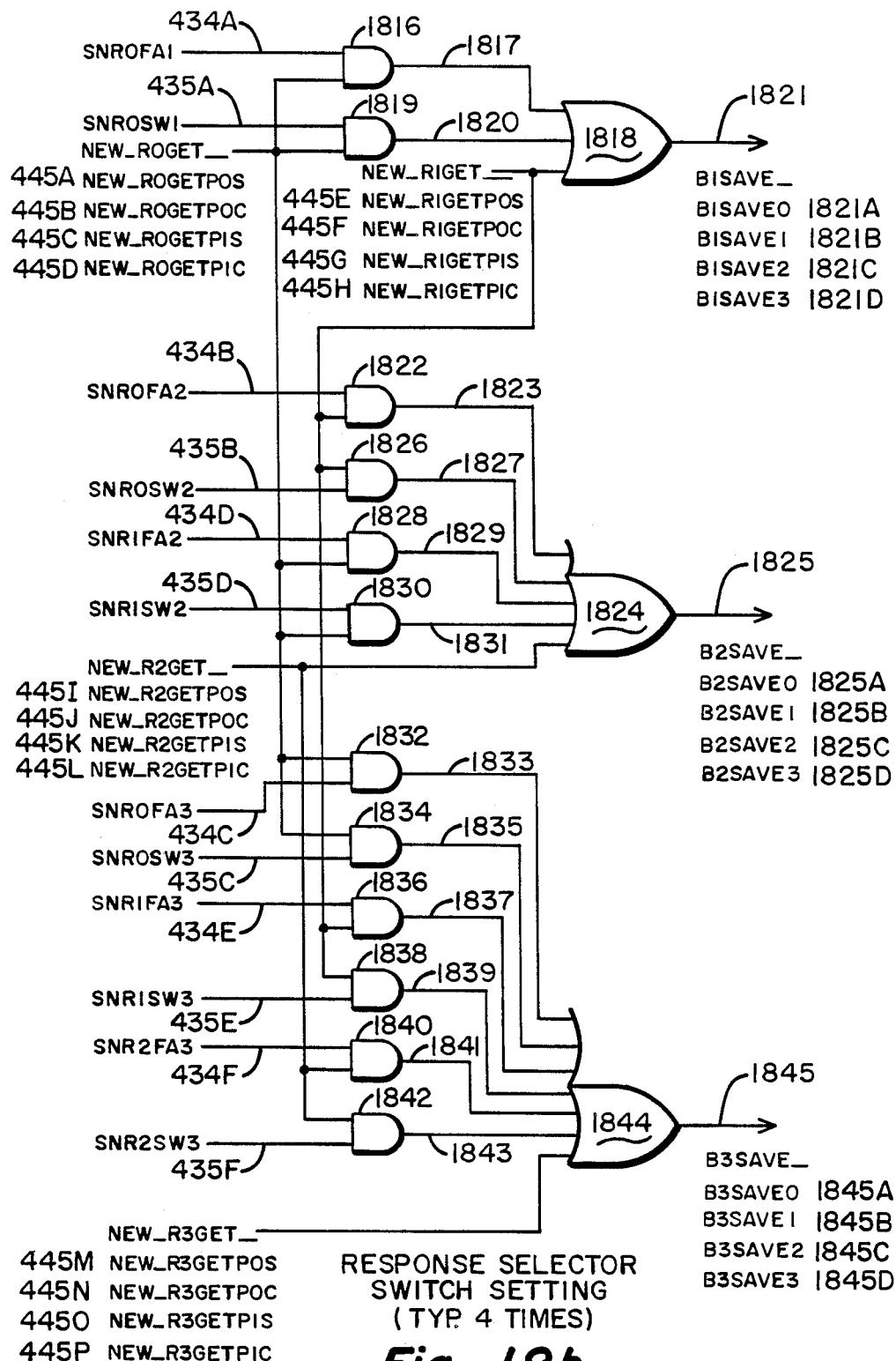

Response Selector Switch Setting (501) calculates the right hand terminal that each request actually went out on based on the Merge signals SNR_FA_ (434A-F), SNR_SW_ (435A-F) and the New Got Its NEW_R_GET (445A-P). The logic for Response Selector Switch Setting (501) is shown in FIG. 19. The assigned right terminal is encoded in the 2 low order bits of B_SEL (513A-D). The high order bit of B_SEL (513A-D) is set if a request did not go out on any right hand terminal due to conflicts on errors. The high order bit is used to force an error response when the response comes back through the chip. The Response Selector Switch Setting bits are saved in the Slider (103) for use in reverse routing the response.

Force Zero Add (500) is used for control when decombining a response that was Swap combined. The logic for Force Zero Add (500) is shown in FIG. 17. When decombining a Swap, the original request with the highest numbered left hand terminal will get the response parameter that comes into the Right Hand Buffer (105). The other requests will ignore the response coming from the Right Hand Buffer (105) and use their stored response parameters based on the Force Zero Add bits ZE_ (512A-D). The Force Zero Add bits are saved in the Slider (103) for use when the response comes back.

The Selective Adders (205) are used for routing the request, routing and calculating the forward parameter and calculating the stored response parameter as described above. Since the parameters are split into two halves, carry bits are saved between halves by Register 522. The Selective Adders consist of 4 sets of adders each of which can add together any combination of the 4 input data lines (SNDT_, 449A-D). Since up to 4 operands can be added together, there needs to be 2 carry bits per adder set.

The logic for the Selective Adders is shown in FIGS. 11 and 21. The check codes for the operands that were added are added using MOD 3 adders. During the second half of the addition the carry bits from the first half of the addition (HCARRY_, 521A-H) are added into the check code using a Special MOD 3 Adder (FIG. 24). During the first half of the addition the stored carry bits, HCARRY_ (521A-), are zero. During both halves of the addition the current carry bits (CARRY_, 524A-H) from the Selective Adders are added in a special MOD 3 Adder and then MOD 3 subtracted from the check codes to produce the final check codes FSWCC_ (529A-D). This is necessary for the check codes for each of the sixteen-bit halves of the parameter to remain correct in the presence of carries. A MOD 3 Subtractor is shown in FIG. 25.

The request types are routed along with the request during RCV_PARAM_A (303) and RCV_PARAM_B (304) and are ignored at all other times. AND gate group 2018 (FIG. 21) puts out 'no request' if no request is using that particular right hand terminal. The routed request types are FSWTY_ (530A-D). The routed data signals are FSWDT (528A-D).

In FIG. 11 the output of the Selective Adders (520) goes to two registers. One register (536) feeds the request and forward parameter to the Right Hand Buffer (105) and the other register (535) feeds the stored response parameter to the Slider (103). The Right Hand Buffer (105) sends the data and check codes out to the next stage during RCV_PARAM_B (304), SND_RESP_A (305), SND_RESP_B (306) and RCV_REQ_A (301). Note the 3 phase offset between the request coming into the Left Hand Buffer (100) and the request going out of the Right Hand Buffer (105). The response data and check codes are accepted from the next stage during RCV_REQ_B (302) and RCV_PARAM_A (303).

The request type is sent out to the next stage during RCV_PARAM_B (304) and SND_RESP_A (305). Handshake signals are accepted from the next stage on the type lines during SND_RESP_B (306) and RCV_REQ_A (301). The response type is accepted from the next stage during RCV_REQ_B (302) and RCV_PARAM_A (303). The Handshake logic (557) is shown in FIG. 26. If a handshake error occurs, then Error Control (101) is notified via the lines HAND-ERR_ (559A-D) that a path has a problem.

Figure 12A:
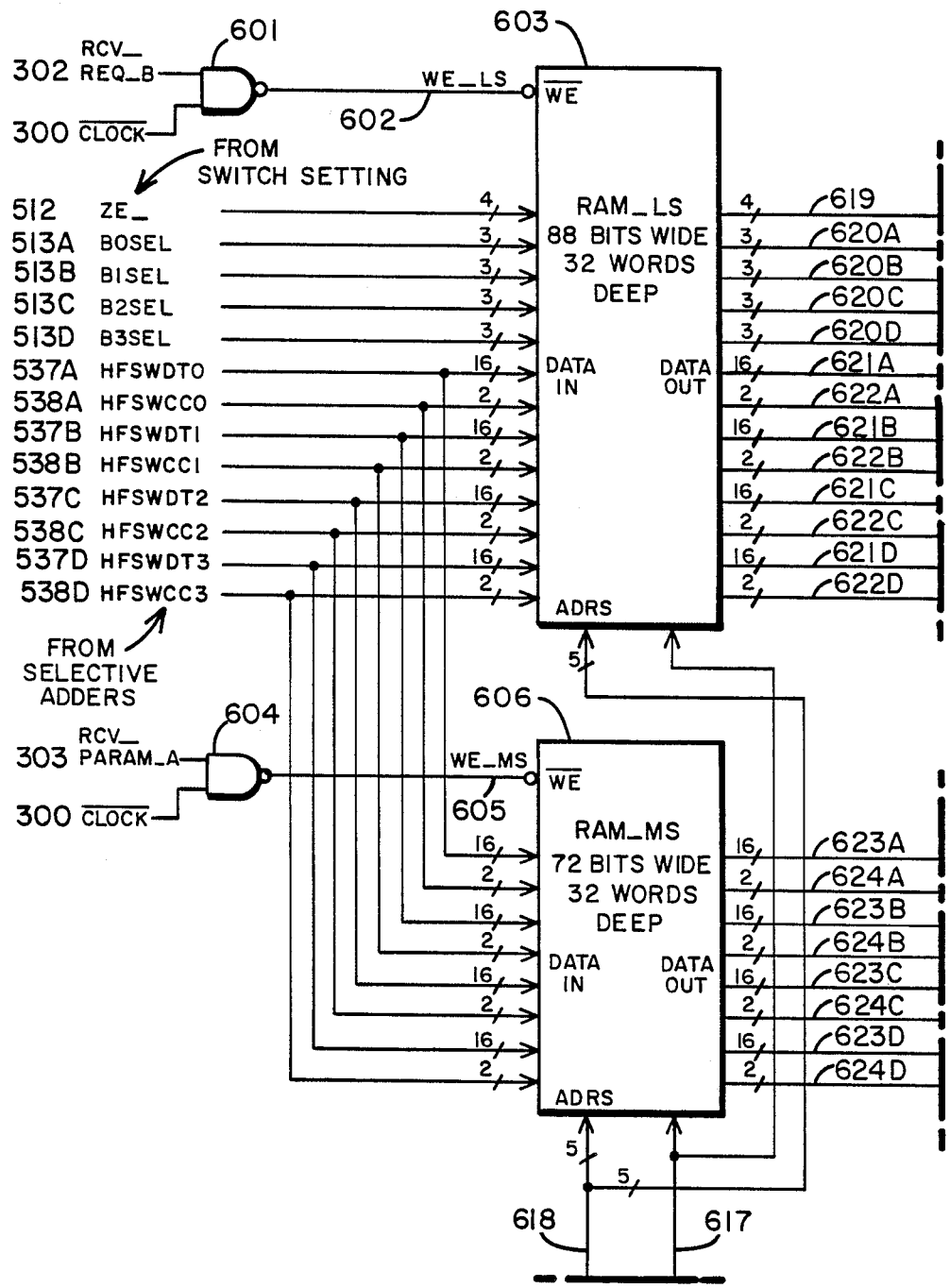
Figure 12B:
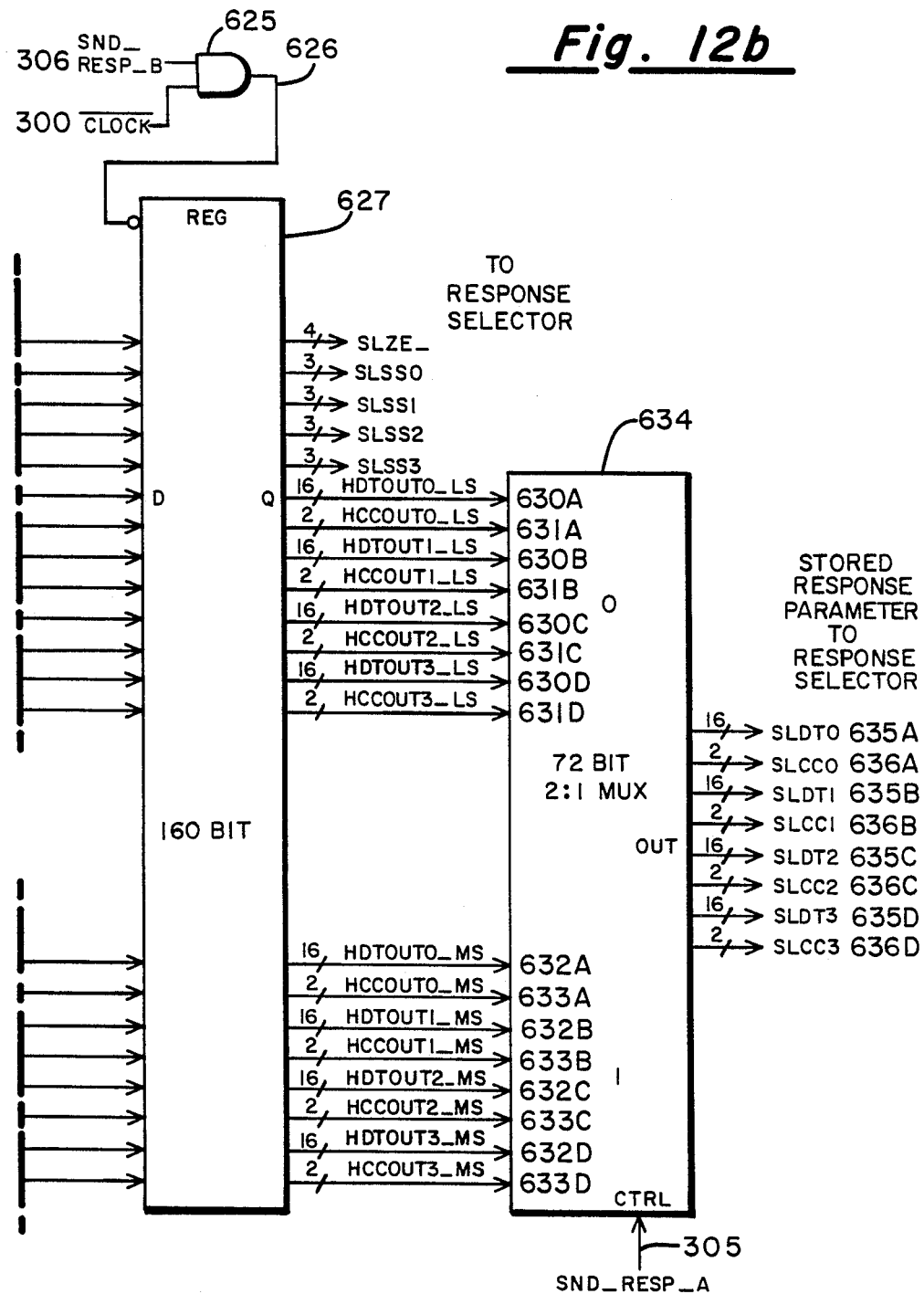
Figure 12C:
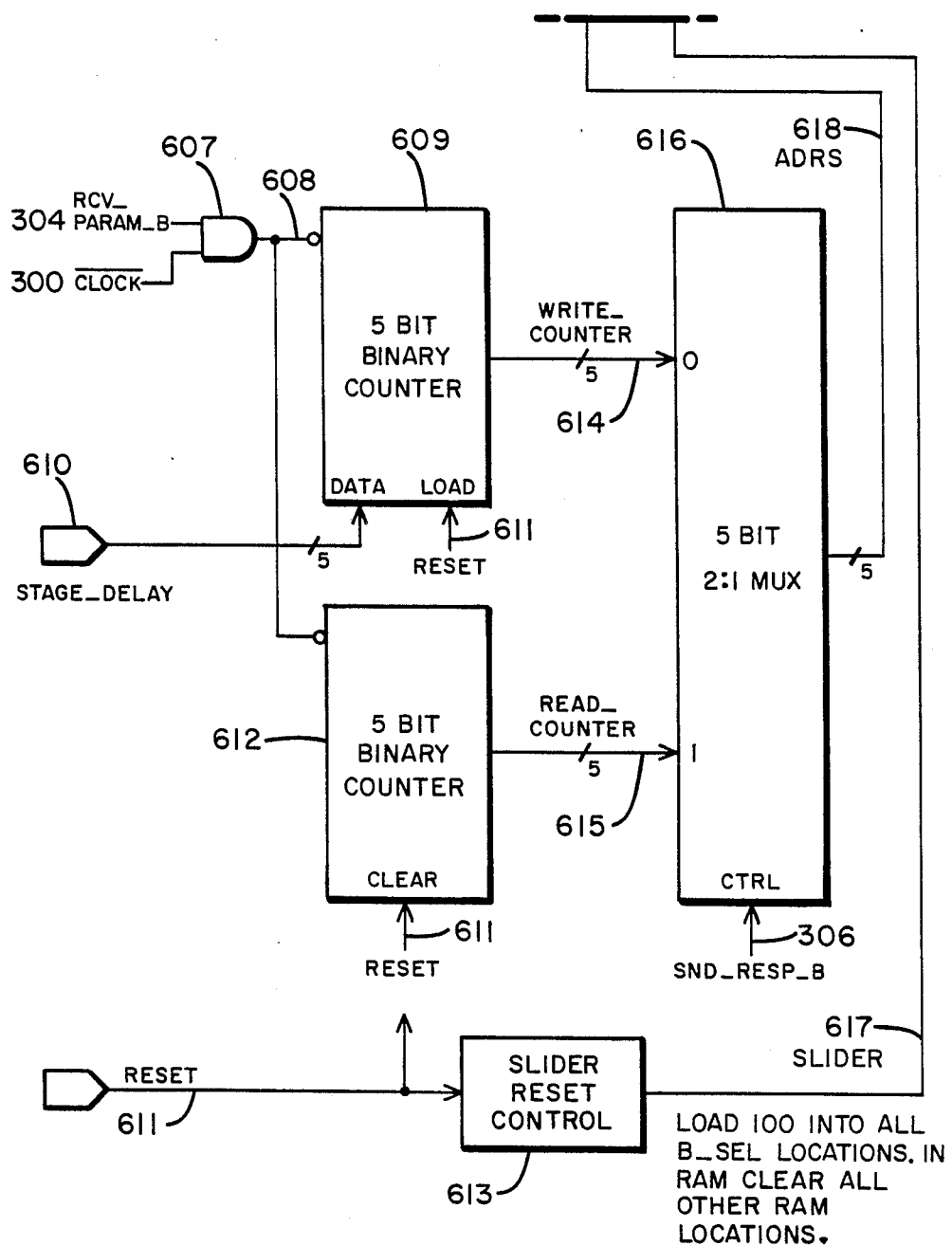

The Slider (103) consists of 2 sections of RAM and is shown is FIG. 12. The first section, RAM_LS (603), is 88 bits wide and 32 words deep. The second section, RAM_MS (606), is 72 bits wide and 32 words deep. The Slider Reset Control (613) loads binary 100 (4 decimal) into all B_SEL (513A-D) locations and 0 into all other RAM locations when RESET (611) is active. The binary 100 indicates 'no request'. The Slider Reset Control (613) works by stepping through all 32 addresses of the RAM_ (603, 606), forcing the data lines (512, 513A-D, 537A-D, 538A-D) to the correct values and activating the Write-Enable lines (602, 605) during each address. There is a 5 bit Write Counter (609) and a 5 bit Read Counter (612). The Read Counter is initialized to 0 and the Write Counter is initialized to STAGE_DELAY (610) when RESET (611) is active. The Read and Write Counters are always offset by STAGE_DELAY (610) during the entire operation of the Switch Chip. STAGE_DELAY (610) indicates when the response is expected to come back to the Switch Chip on the Right Hand Buffer.

Both the Write and the Read Counters are advanced at the same time (RCV_PARAM_B, 304) in order to avoid the possibility of one of the counters being advanced an extra time during clock start-up. RAM_LS (603) saves the Force Zero Add bits (ZE_, 512A-D), the Reverse Switch Settings (B_SEL, 513A-D), and the first half of the stored response parameter (HFSWDT_, 537A-D and HFSWCC_D) during RCV_REQ_B (302). The second half of the stored response parameter is saved in RAM_MS (606) during RCV_PARAM_A (303). The stored information is read out during SND_RESP_B (306) and saved in a register (627) for future use. The data is read out early and saved to avoid a conflict with writing to the RAM_ (603, 606). The least significant (first) half of the stored response parameter is sent to the Response Selector (104) and used during RCV_PARAM_A (303).

The most significant (second) half of the stored response parameter is sent to the Response Selector (104) and used during SND_RESP_A (305). The reason for calculating the 2 halves of the response during non-contiguous clock phases is to save a register in the Left Hand Buffer (100).

Figure 13A:
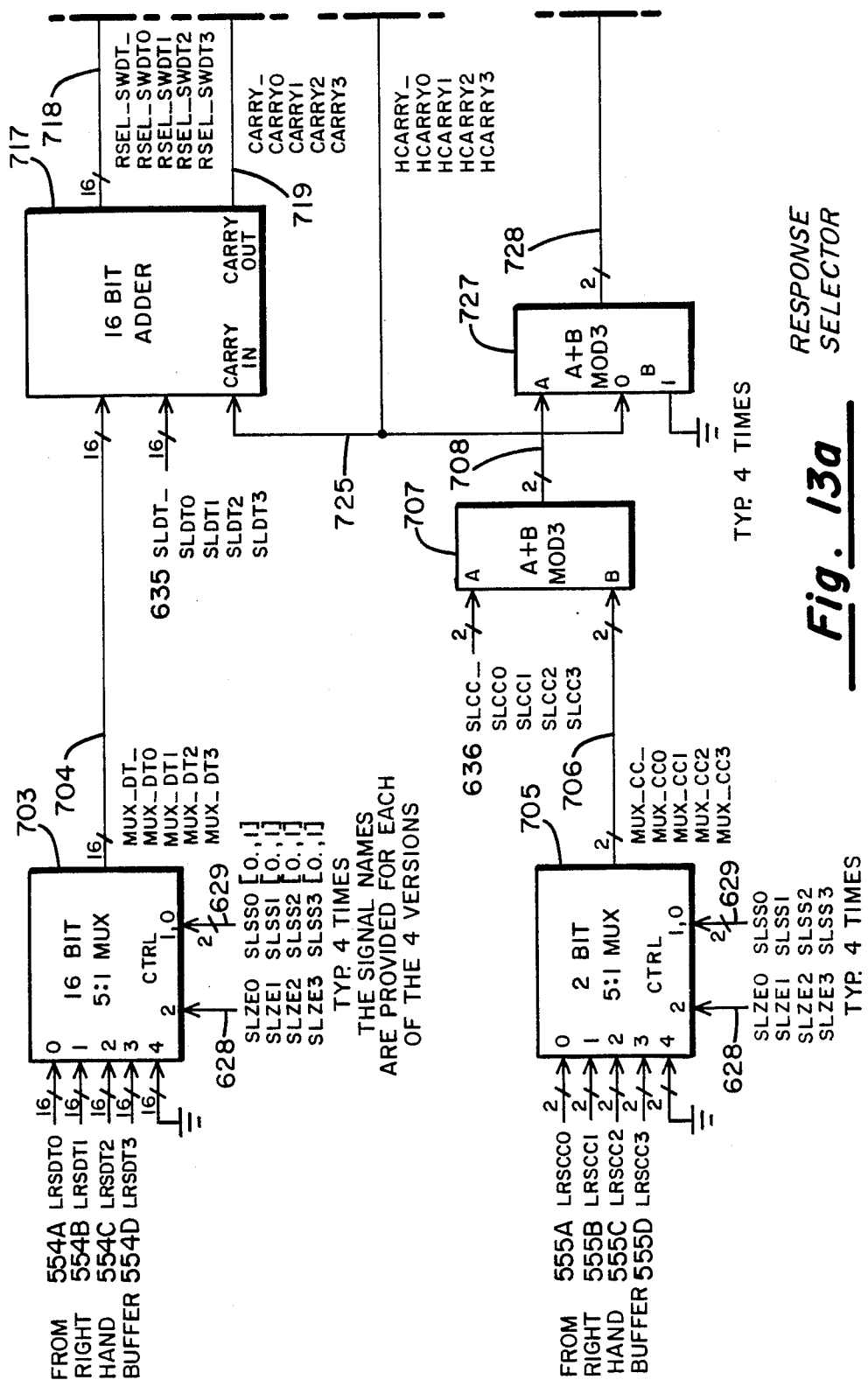
Figure 15A:
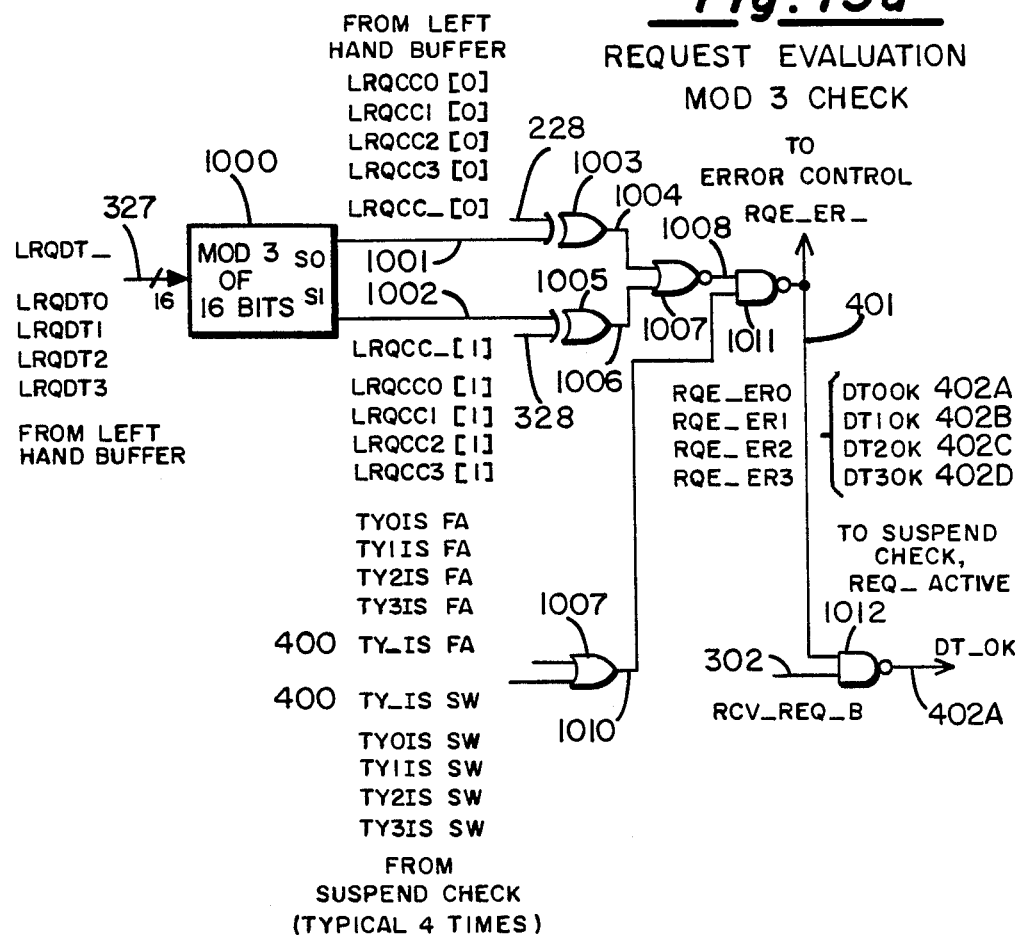
Figure 15B:
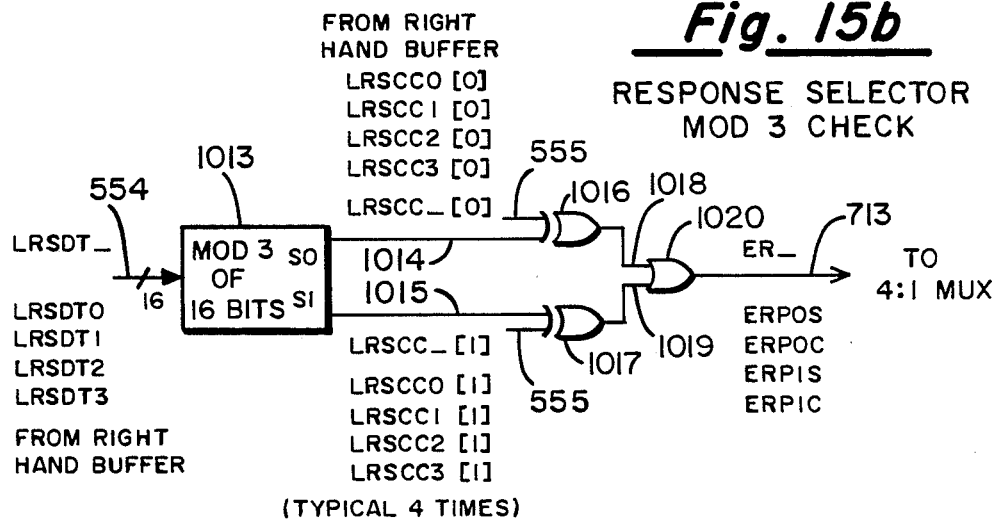
Figure 15C:
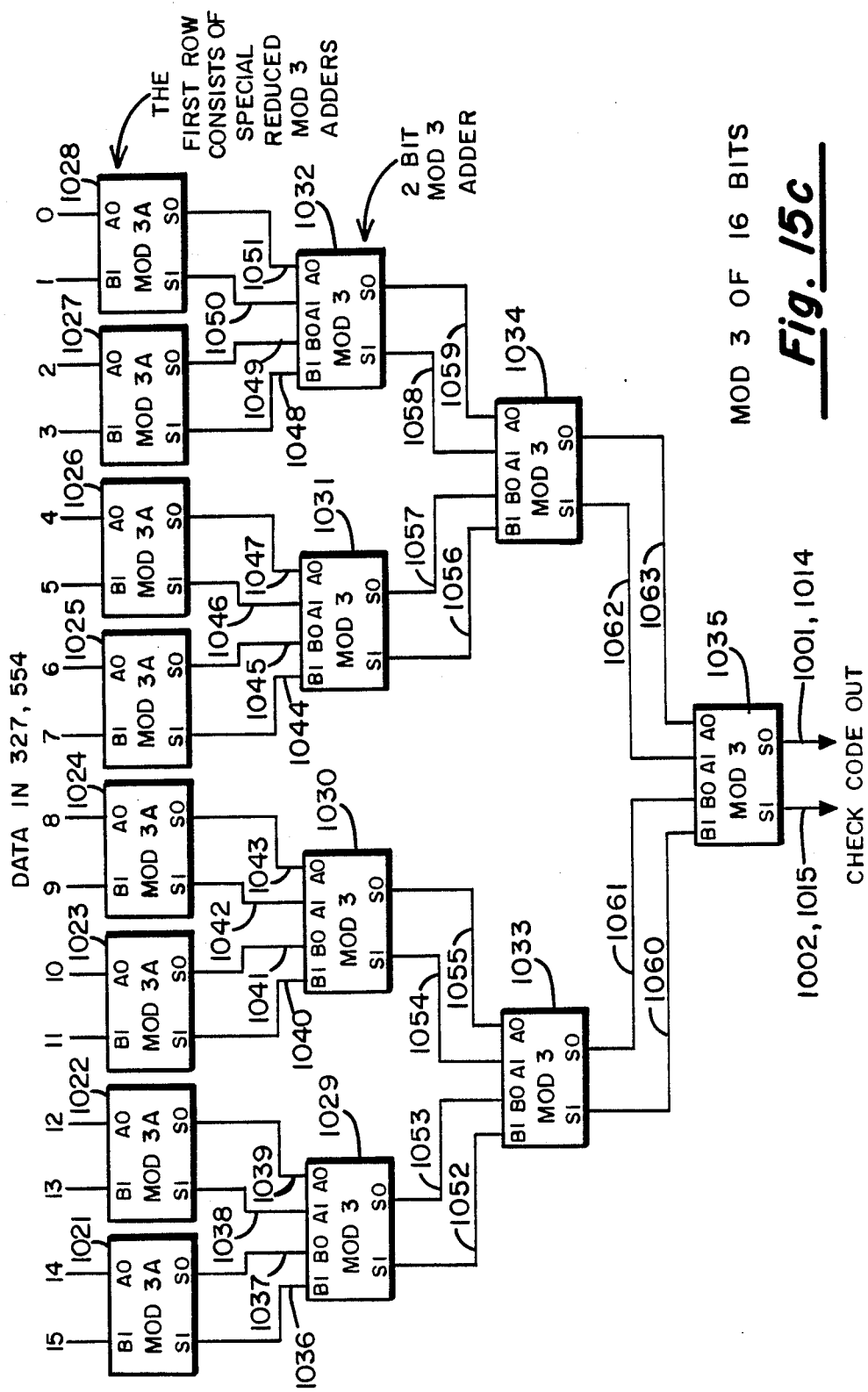
Figure 16A:
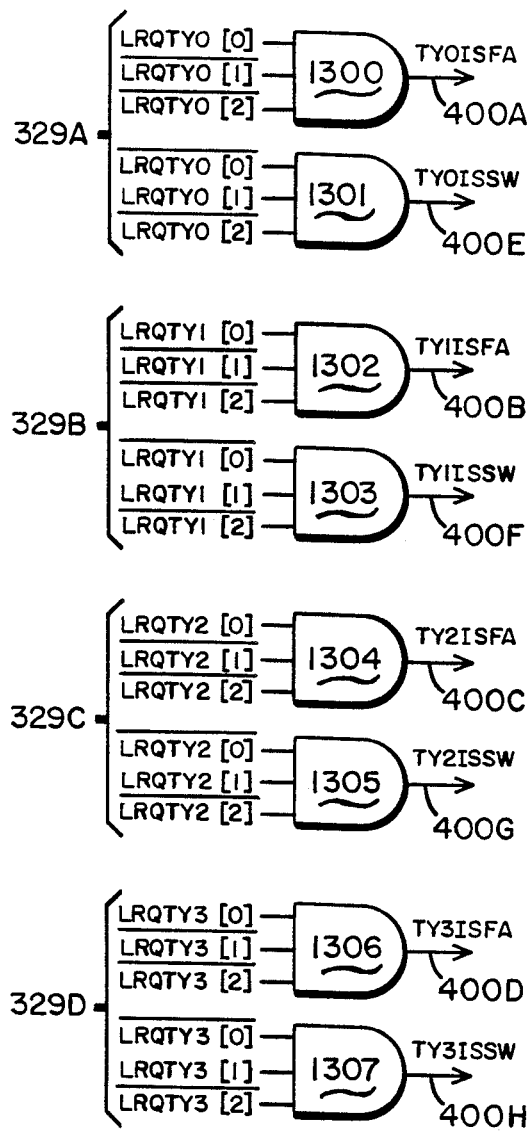
Figure 16B:
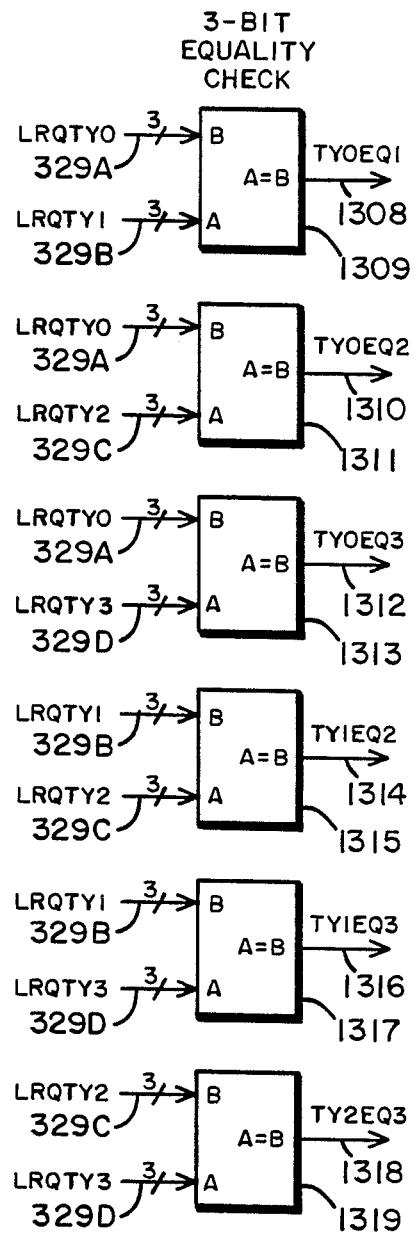
Figure 16C:
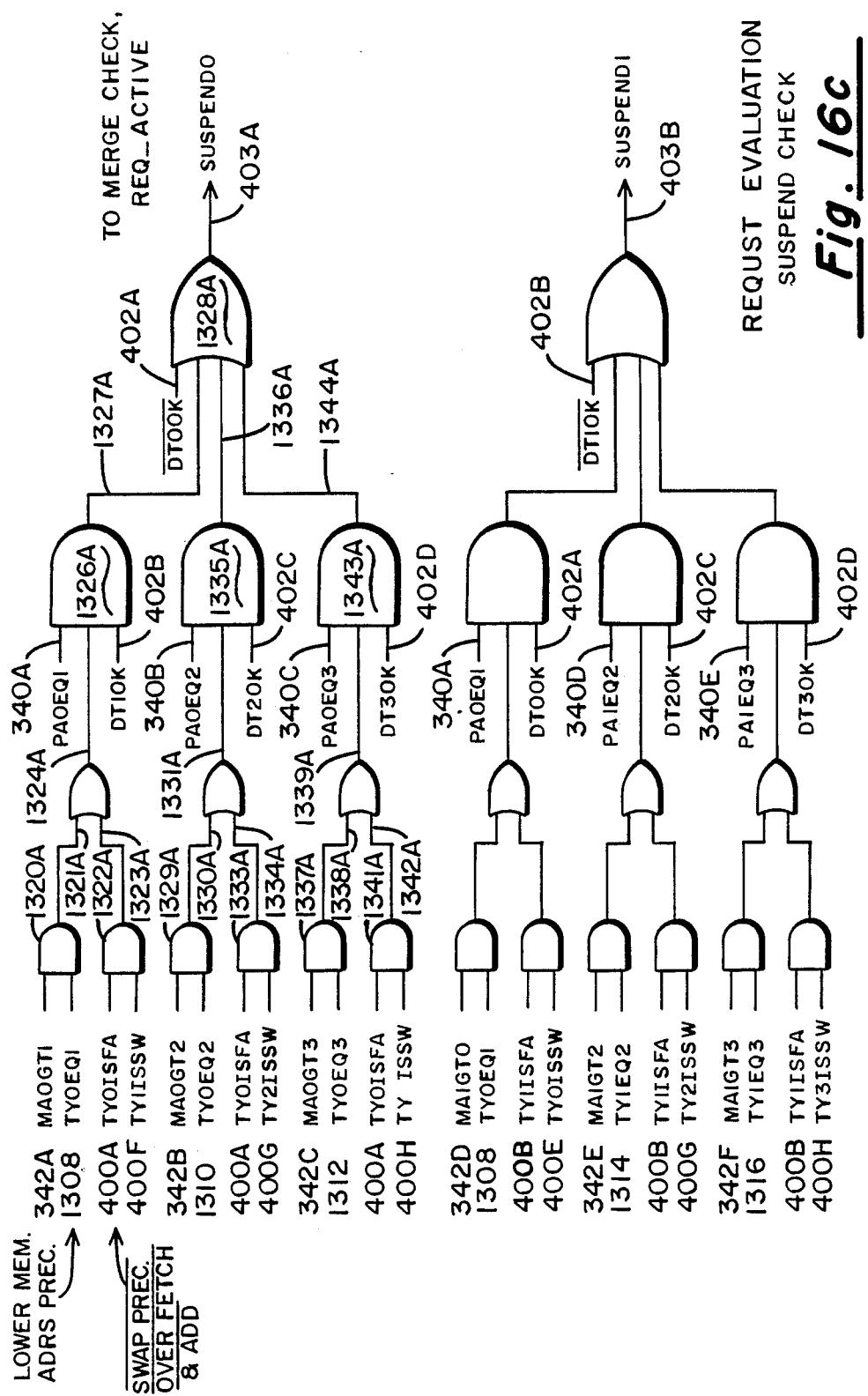
Figure 16D:
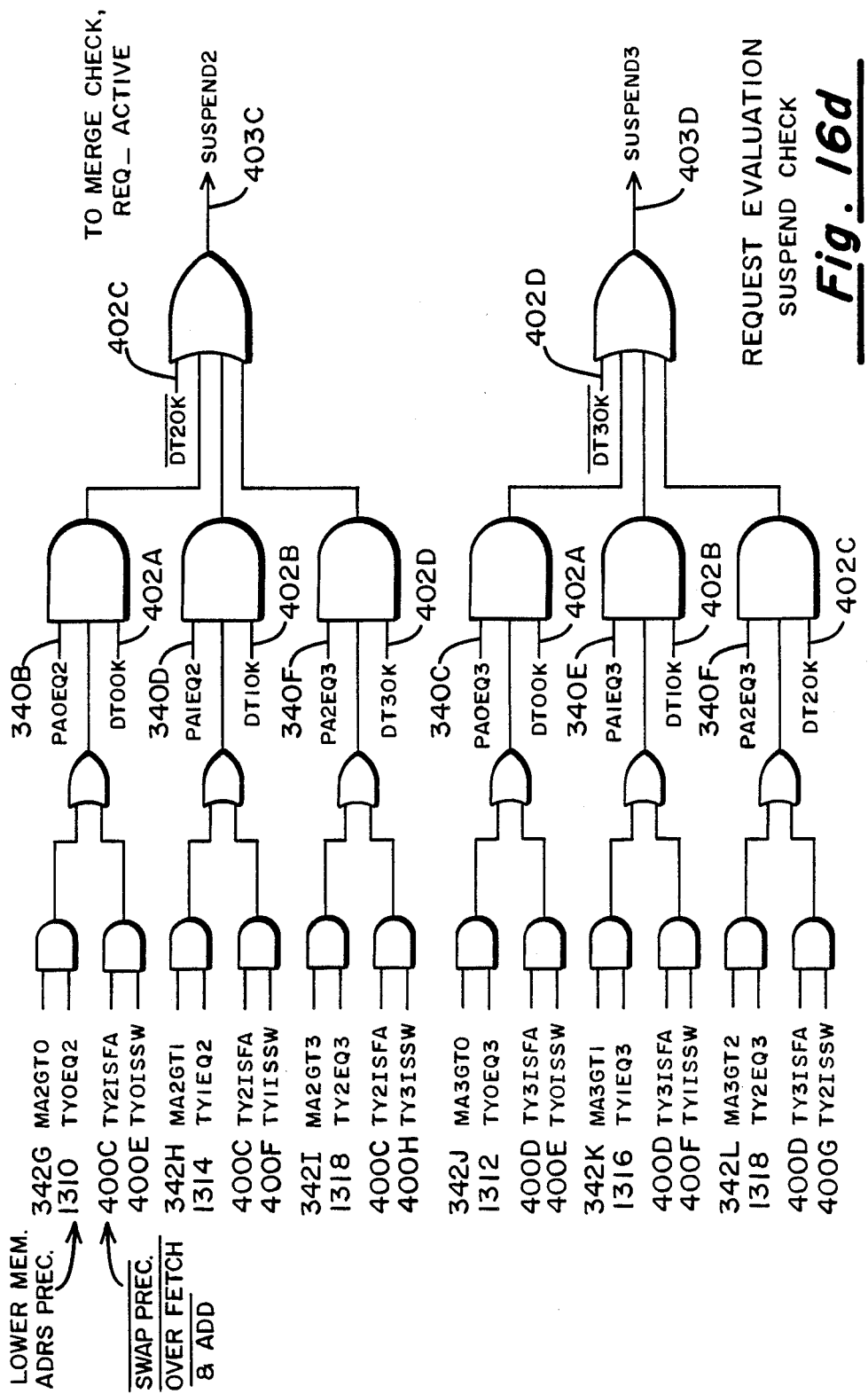

The Response Selector (104) logic is shown in FIG. 13. The data (LRSDT_, 554A-D) from the Right Hand Buffer (105) is routed to the correct left hand terminal (MUX_DT_, 704A-D) by MUX (703) based on the Reverse Switch Setting bits from the Slider (SLSS_[0..1], 629A-D). If the Force Zero Add bit (SLZE_, 628A-D) is set, then the data from the right-hand buffer (105) is ignored. The routed data (MUX_DT_, 706A-D) is added by 16 bit Adder (717) to the stored response parameter (SLDT_, 635A-D). Carries are saved between halves of the response (HCARRY_, 725A-D). The outputs of the Adders (717) are saved in register (716) and are sent to the Left Hand Buffer (100) as HRSDT_ (700-D). The check codes (LRSCC_, 555A-D) are similarly routed to the correct left hand terminal (MUX_CC_, 706A-D).

The check codes (MUX_CC_, 706A-D) are MOD 3 added to the stored check codes (SLCC_, 636A-D) and are added to the stored carry bits (HCARRY_, 725A-D). The current carry bits (CARRY_, 719A-D) are MOD 3 subtracted from the check codes. The check codes are saved in register (716) and sent to the Left Hand Buffer (100) as HRSCC_(701A-D). The Response Selector (104) also does a MOD 3 check (FIG. 15) on the incoming data paths (554A-D, 555A-D). Any error is routed to the correct left hand terminal with the Mux (731) where it forces an error response at the type routing Mux (735). The response type is routed to the correct left hand terminal with the Mux (735).

If the most significant bit of the Reverse Switch Setting lines (SLSS_[2], 629A-D) is set (indicating no response is expected) and a response was received, or a check code error occurs, then the incoming response type is ignored and an error type is sent to the Left Hand Buffer (100) on lines HRSTY_ (702A-D). If there is not an error, then the response type is routed to the proper left hand terminal completing the routing process.

What is claimed is:

1. A network interconnection system for connecting up to N responder means with up to N requestor means comprising
S stages of switch means, each having N switch means,
wherein S equals $[(\log_b N)+1]$ and b is a selected, integer logarithm base greater than one,
b times p first terminal means for each of said switch means, except for an request stage of said switch means, comprising request ports,
b times p second terminal means for each of said switch means, except for a response stage of said switch means, comprising response ports,
wherein p is a selected integer greater than one,
each switch means of said request stage of switch means has a request terminal means that is connectable to a single one of said requestor means,
each switch means of said response stage of switch means has an output terminal means that is connectable to a single one of said requestor means,
said first and second terminal means of said switch means are connectable to the output and input terminal means, respectively, of another stage such that each second terminal means that is associated with a switch means in a stage closer to said requestor means is connectable to a first terminal means that is associated with a switch means in a stage closer to said responder means, wherein said S stages of said switch means are designated as 0 to S−1, such that stage 0 is a request stage and stage S−1 is a response stage, said N switch means are designated within each stage as 0 to N−1 which is represented by a b-ary, S−1 digit, non-negative integer, said b times p first and second terminal means are each grouped into p planes which are designated as 0 to p−1 and which consist of b terminals per plane, which are designated 0 to b−1, said first and second terminal means are each represented by four parameters which respectively are a stage parameter, a switch parameter, a plane parameter and a digit parameter, wherein said switch parameters are each represented by $\log_b N$ digits and said digit parameters are each represented by a single b-ary digit and said second stage parameter represents the same stage as said first stage parameter plus one, said plane parameters represent the same plane, and said switch and digit parameters of said first stage and said second stage are determined by a predetermined relationship which results in each of said first terminals of one stage are connected at the most to only one of said second terminals of another stage.

2. A network interconnection system as claimed in claim 1 wherein $p = \log_b N$, and b and N are selected to yield an integral number for p.

3. A network interconnection system as claimed in claim 1 wherein b=2.

4. A network interconnection system for connecting up to N responder means with up to N requestor means comprising Q switch means wherein Q equals C multiplied by S, S equals $[(\log_b N) + 1]$, b is a selected logarithm base, and C is an integral number that represents the number of identical cascaded groups of switch means in said network, each group of which has S switch means, wherein said S stages of said switch means are designated as 0 to S−1, such that stage 0 is a request stage and stage S−1 is a response stage, said N switch means are designated within each stage as 0 to N−1 which is represented by a b-ary, S−1 digit, non-negative integer, said b times p first and second terminal means are each grouped into p planes which are designated as 0 to p−1 and which consist of b terminals per plane, which are designated 0 to b−1, said first and second terminal means are each represented by four parameters which respectively are a stage parameter, a switch parameter, a plane parameter and a digit parameter, wherein said switch parameters are each represented by $\text{Log}_b N$ digits and said digit parameters are each represented by a single b-ary digit and said second stage parameter represents the same stage as said first stage parameter plus one, said plane parameters represent the same plane, and said switch and digit parameters of said first stage and said second stage are determined by a predetermined relationship which results in each of said first terminals of one stage are connected at the most to only one of said second terminals of another stage.

5. A network interconnection system as claimed in claim 4 wherein $p = \text{Log}_b N$, and b and N are selected to yield an integral number for p.

6. A network interconnection system as claimed in claim 5 wherein b=2.

7. A network interconnection system as claimed in claim 6 comprising a plurality of switch means arranged in stages numbered 0 to S−1, wherein S−1 is the highest numbered stage of the system, each stage has an equal number of said switch means, each of said switch means, except said switch means of stage 0 comprises a plurality of first terminal means, said switch means in said stage 0 comprises a single first terminal means connected to a request terminal means, each of said switch means, except said switch means in stage S−1, comprises a plurality of second terminal means, and said switch means in said stage S−1 comprises a single second terminal means connected to a response terminal means, interconnect means for selectively coupling any single first terminal means of a given one of said switch means to any single second terminal means of the said same switch means, first transceiver means for receiving Request Codes and for transmitting Response Codes via said first terminal means, second transfer means for receiving Response Codes and for transmitting Request Codes via second terminal means, storage means for storing said Request and Response codes, and control means for accessing said storage means and for controlling said interconnect means according to one of the following scenarios:

(a) if a first terminal means of a certain switch means is being requested for connection to a second terminal means of a Requesting switch means of the next lower numbered stage, or if an output terminal means is being requested by a requesting switch means in stage S−1, during a predetermined time period, and if no other switch means in the same stage as said requesting switch means is requesting any first terminal means of said certain switch means, or said output terminal means, during said time period, then said requested first terminal means, or said output terminal means, will be connected to a second terminal means of the requesting switch means, or (b) if more than one of said first terminal means of said requested switch means is being requested by another switch means in the same stage as the requesting switch means, other than stage S—1, or if an output terminal means is being requested by a requesting switch means in stage S—1 during said time period, then said requested first terminal means, or said output terminal means, will be connected to a second terminal means of the requesting switch means according to a predefined Response Code priority that is derived by said control means from the Response Codes stored in said storage means during said predetermined time period.

8. A network interconnect system as defined in claim 7 wherein said priority scheme is implemented by sending Parameter Codes with said Request Codes and said storage means stores said Parameter Codes, wherein said Parameter Codes are utilized by said control means to combine said Response Codes when identified first and second terminal means, or identified first terminal means and output terminal means, of said certain switch means are associated with two or more identical Request Codes received by said first terminal means of said requested switch means, and said combined Response Codes are decombined by said control means to established said priority scheme for connecting said identified first and second terminal means, or said identified first terminal means and output terminal means.

9. A network interconnection system as defined in claim 8 wherein said priority scheme utilizes a Fetch-and-Modify operation to establish sequential priority ordering among said second terminal means of said requesting switch means when two or more Response Codes are combined for said requesting switch means, and a Swap operation to establish a reverse sequential ordering among said second terminal means of said requesting switch means.

10. A network interconnection system as defined in claim 9 wherein said control means defers one of said Fetch-and-Modify and said Swap operations in preference to the other of said operations.

11. A network interconnection system comprising,
- a plurality of switch means arranged in stages numbered 0 to S−1, wherein S−1 is the highest numbered stage of the system, each stage has an equal number of said switch means, each of said switch means, except said switch means of stage 0 comprises a plurality of first terminal means, said switch means in said stage 0 comprises a single first terminal means connected to a request terminal means, each of said switch means, except said switch means in stage S−1, comprises a plurality of second terminal means, and said switch means in said stage S−1 comprises a single second terminal means connected to a response terminal means,
- interconnect means for selectively coupling any single first terminal means of a given one of said switch means to any single second terminal means of the said same switch means,
- first transceiver means for receiving Request Codes and for transmitting Response Codes via said first terminal means,
- second transceiver means for receiving Response Codes and for transmitting Request Codes via said second terminal means,
- storage means for storing said Request and Response codes, and
- control means for accessing said storage means and for controlling said interconnecting means according to one of the following scenarios:
- (a) if a first terminal means of a certain switch means is being requested for connection to a second terminal means of a Requesting switch means of the next lower numbered stage, or if an output terminal means is being requested by a requesting switch means in stage S−1, during a predetermined time period, and if no other switch means in the same stage as said requesting switch means is requesting any first terminal means of said certain switch means, or said output terminal means, during said time period, then said requested first terminal means, or said output terminal means, will be connected to a second terminal means of the requesting switch means, or
- (b) if more than one of said first terminal means of said requested switch means is being requested by another switch means in the same stage as the requesting switch means, other than stage S−1, or if an output terminal means is being requested by a requesting switch means in stage S−1 during said time period, then said requested first terminal means, or said output terminal means, will be connected to a second terminal means of the requesting switch means according to a predefined Response Code priority that is derived by said control means from the Response Codes stored in said storage means during said predetermined time period.

12. A network interconnect system as defined in claim 11 wherein said priority scheme is implemented by sending Parameter Codes with said Request Codes and said storage means stores said Parameter Codes, wherein said Parameter Codes are utilized by said control means to combine said Response Codes when identified first and second terminal means, or identified first terminal means and output terminal means, of said certain switch means are associated with two or more identical Request Codes received by said first terminal means of said requested switch means, and said combined Response Codes are decombined by said control means to established said priority scheme for connecting said identified first and second terminal means, or said identified first terminal means and output terminal means.

13. A network interconnection system as defined in claim 12 wherein wherein said priority scheme utilizes a Fetch-and-Modify operation to establish sequential priority ordering among said second terminal means of said requesting switch means when two or more Response Codes are combined for said requesting switch means, and a Swap operation to establish a reverse sequential ordering among said second terminal means of said requesting switch means.

14. A network interconnection system as defined in claim 13 wherein said control means defers one of said Fetch-and-Modify and said Swap operations in preference to the other of said operations.

* * * * *

UNITED STATES PATENT AND TRADEMARK OFFICE
CERTIFICATE OF CORRECTION

PATENT NO. : 4,833,468
DATED : May 23, 1989
INVENTOR(S) : Brian R. Larson, Donald B. Bennett, Steven A. Murphy It is certified that error appears in the above-identified patent and that said Letters Patent is hereby corrected as shown below:

Column 42, line 24, "transfer" should be -- transceiver -- .

Column 42, line 25, after "via" insert -- said -- .

Signed and Sealed this

Twentieth Day of February, 1990

Attest:

JEFFREY M. SAMUELS

Attesting Officer     Acting Commissioner of Patents and Trademarks